United States Patent
Miyoshi

(10) Patent No.: US 8,924,624 B2
(45) Date of Patent: Dec. 30, 2014

(54) INFORMATION PROCESSING DEVICE

(75) Inventor: Takashi Miyoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 393 days.

(21) Appl. No.: 13/323,167

(22) Filed: Dec. 12, 2011

(65) Prior Publication Data

US 2012/0159101 A1    Jun. 21, 2012

(30) Foreign Application Priority Data

Dec. 17, 2010   (JP) ................................. 2010-282158

(51) Int. Cl.
*G06F 12/10* (2006.01)
*G06F 12/02* (2006.01)

(52) U.S. Cl.
CPC .......... *G06F 12/0284* (2013.01); *G06F 12/109* (2013.01); *G06F 2212/151* (2013.01)
USPC .............................................. 711/6; 711/206

(58) Field of Classification Search
None
See application file for complete search history.

(56) References Cited

U.S. PATENT DOCUMENTS

| 7,334,076 | B2 | 2/2008 | Hendel et al. | |
|---|---|---|---|---|
| 2007/0083862 | A1* | 4/2007 | Wooldridge et al. | 718/1 |
| 2009/0235249 | A1 | 9/2009 | Kobayashi et al. | |
| 2009/0327576 | A1* | 12/2009 | Oshins | 711/6 |
| 2010/0011147 | A1* | 1/2010 | Hummel et al. | 711/6 |
| 2010/0250824 | A1* | 9/2010 | Belay | 711/6 |
| 2012/0072906 | A1* | 3/2012 | Tsirkin et al. | 718/1 |

FOREIGN PATENT DOCUMENTS

| JP | 2006-252554 A | 9/2006 |
|---|---|---|
| JP | 2009-217608 A | 9/2009 |
| JP | 2010-39685 A | 2/2010 |
| WO | 2010116402 A1 | 10/2010 |

OTHER PUBLICATIONS

Japanese Office Action mailed Apr. 22, 2014 for corresponding Japanese Patent Application No. 2010-282158, with English Translation, 6 pages.

* cited by examiner

*Primary Examiner* — Gary Portka
(74) *Attorney, Agent, or Firm* — Fujitsu Patent Center

(57) ABSTRACT

An information processing device includes: a data transferring unit configured to directly transfer data to a first memory area allocated to a virtual machine from an input/output device for controlling a data input/output to/from an external device by mutually translating between an address of the first memory area allocated to the virtual machine and an address of a second memory area that is a real memory of the first memory area; a detecting unit configured to detect the data directly transferred from the input/output device to the first memory area allocated to the virtual machine; a registering unit configured to generate update information about the first memory area changed using the detected data and to store the update information in a first storing unit when the detected data satisfies a predetermined condition; and an outputting unit configured to output the update information.

14 Claims, 38 Drawing Sheets

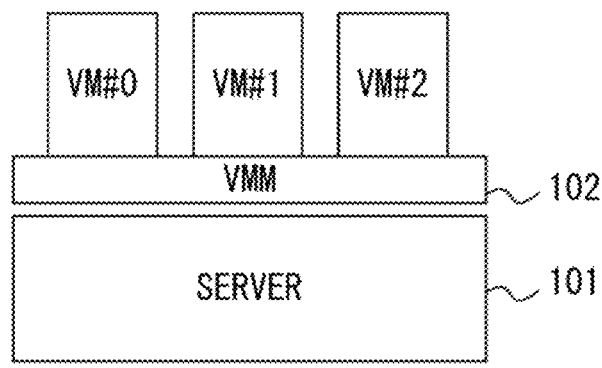
F I G. 1

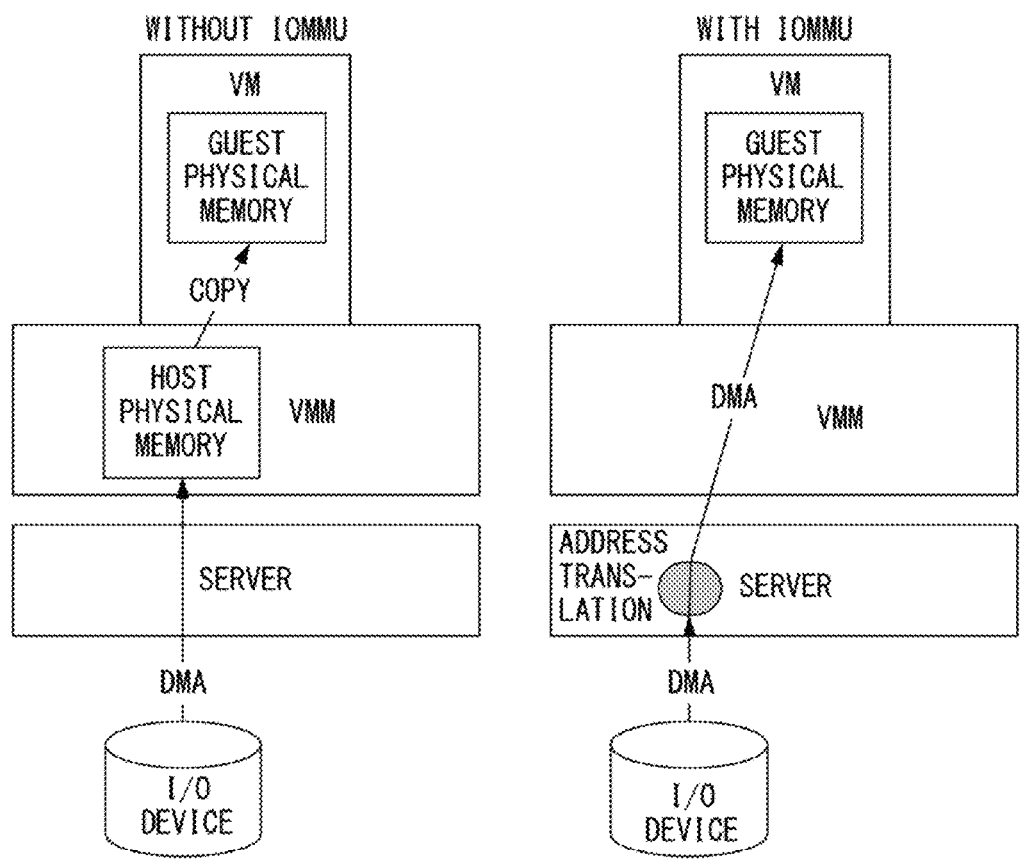
F I G. 4

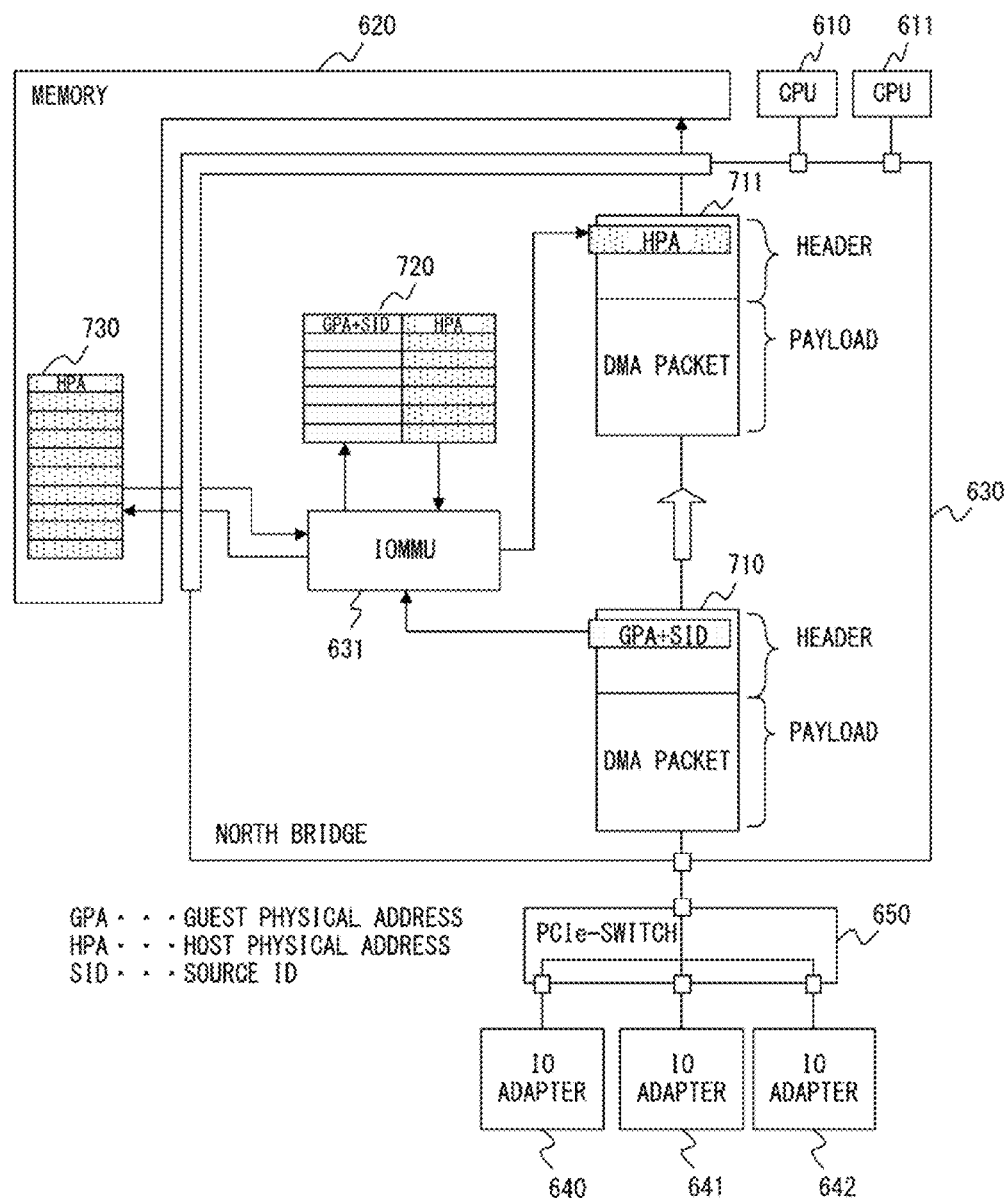
F I G. 7

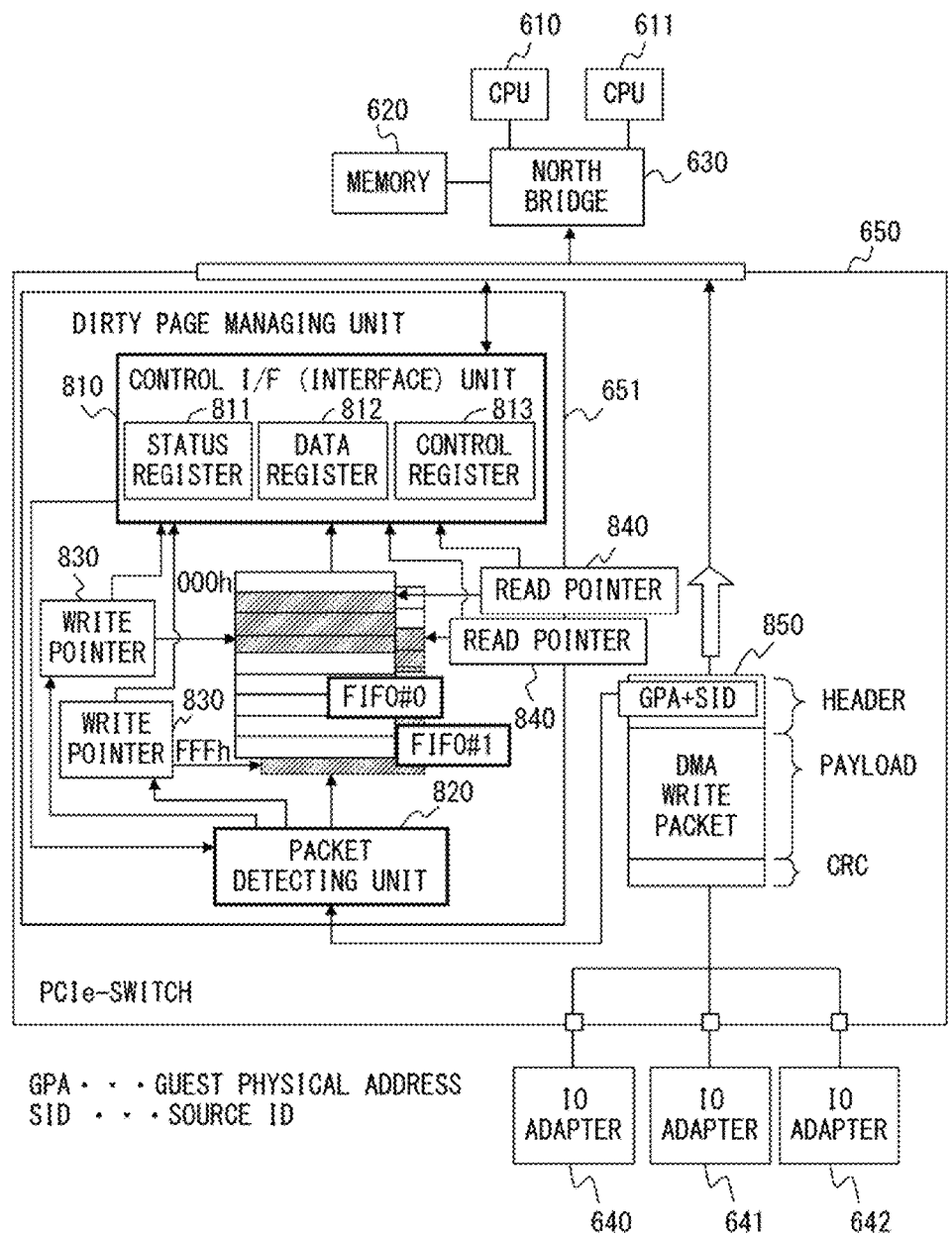
F I G. 8

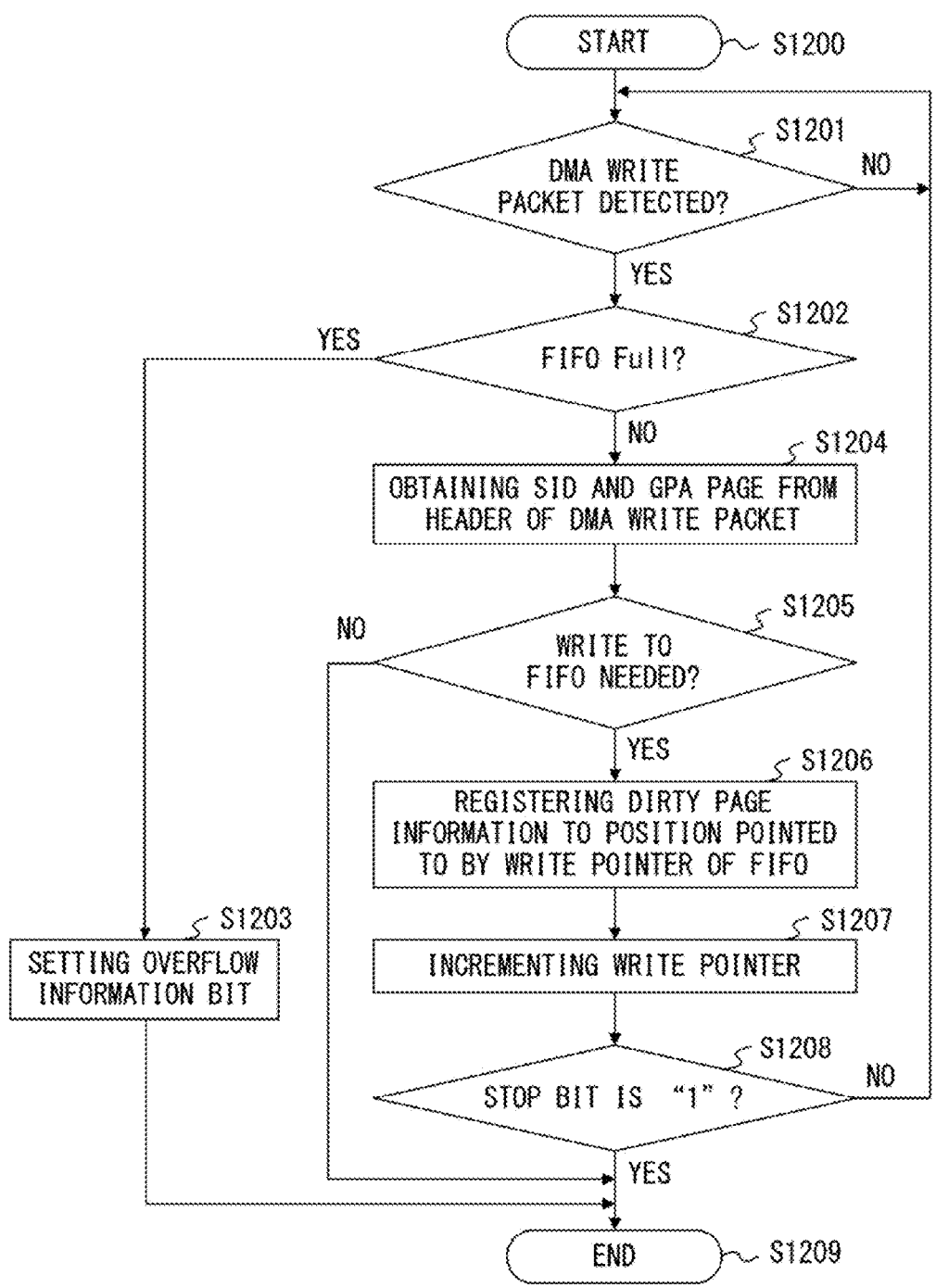
F I G. 1 2

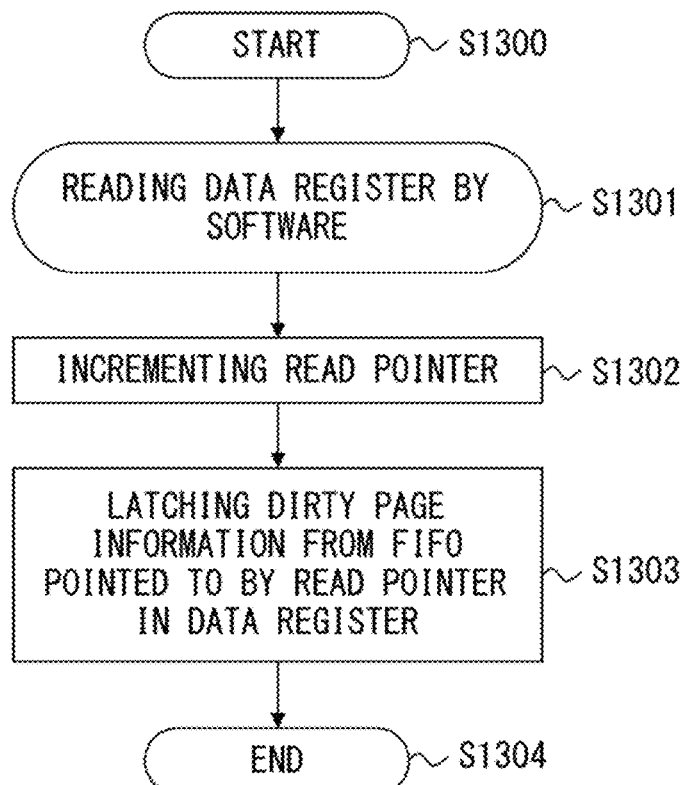
F I G. 1 3

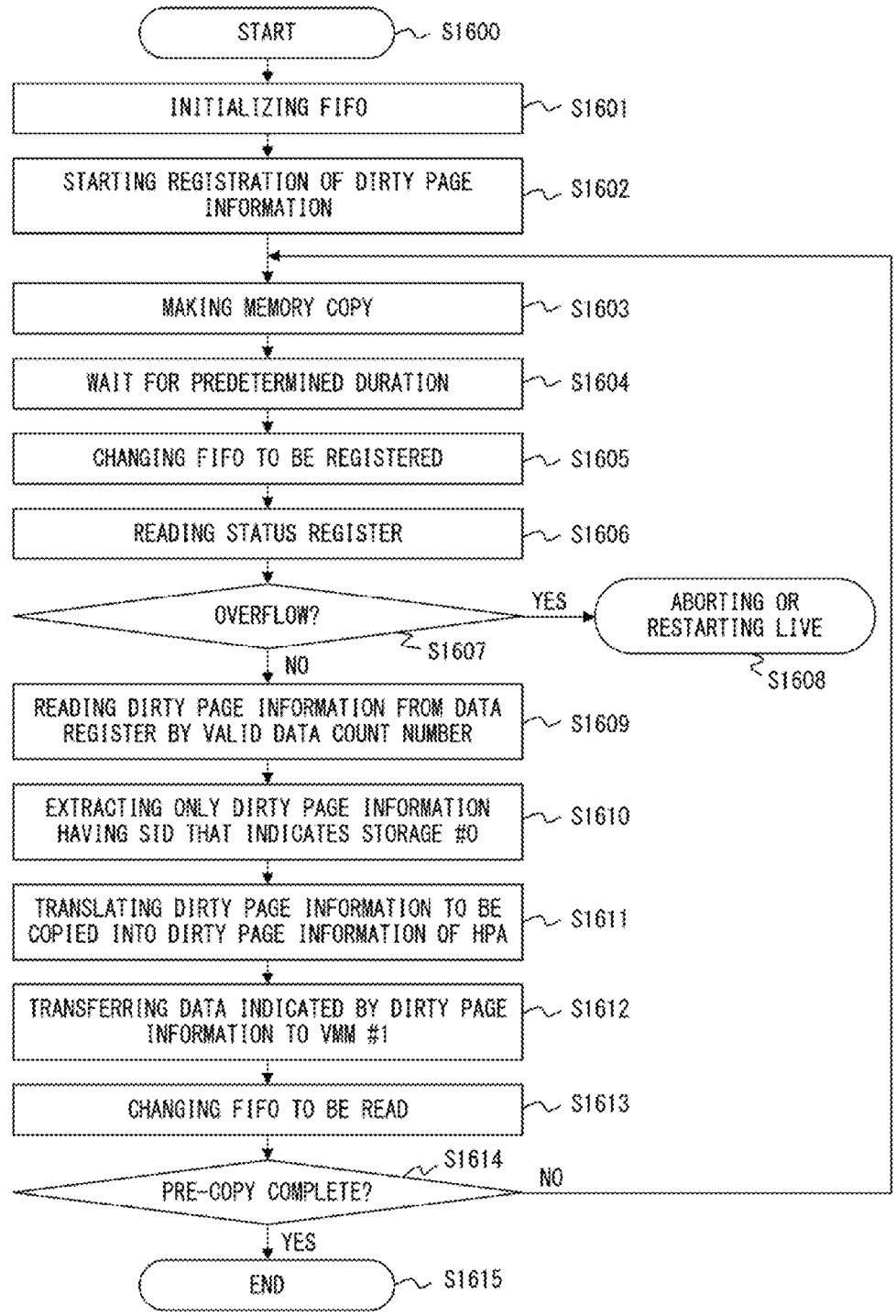
F I G. 16

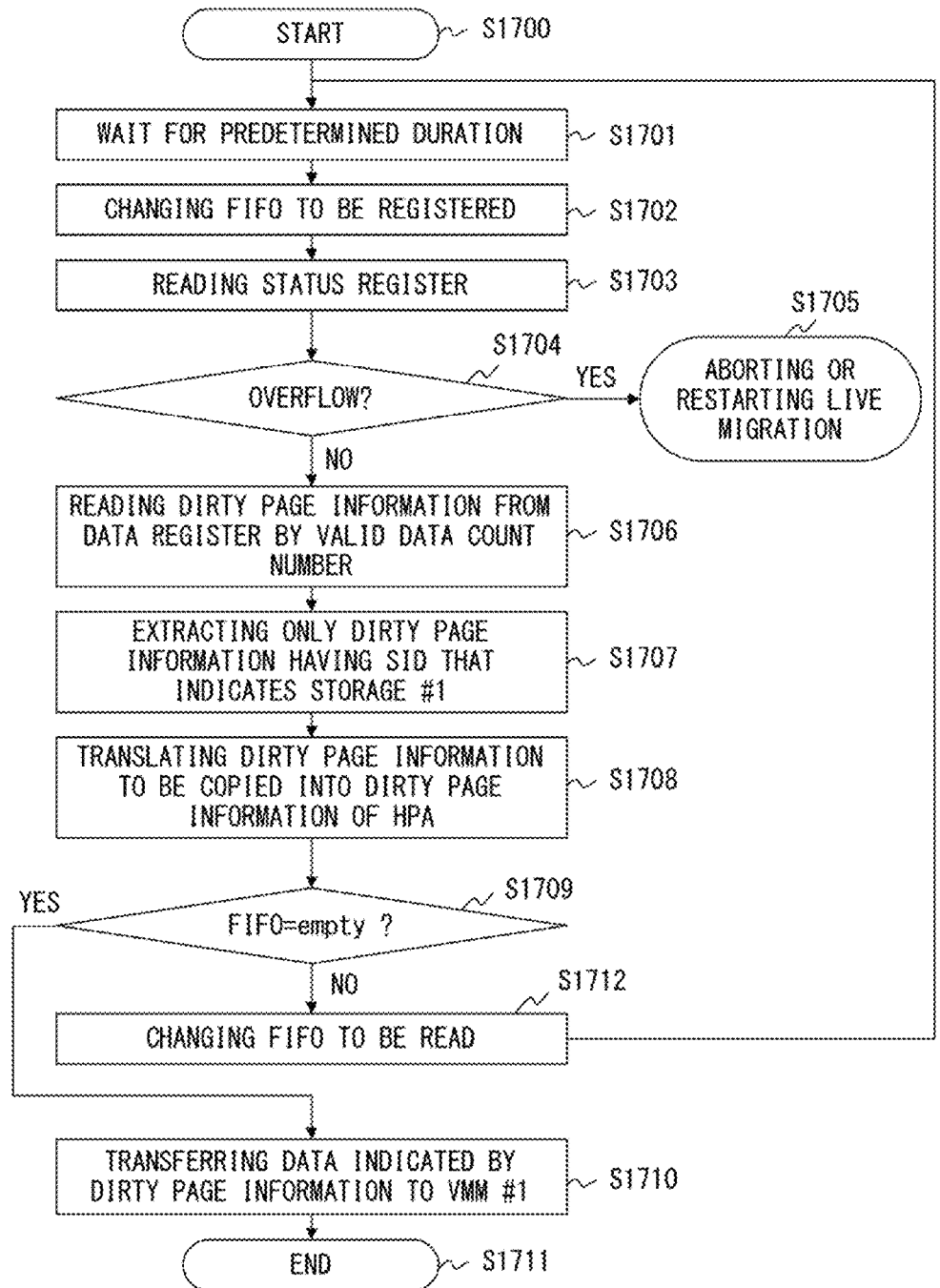
F I G. 17

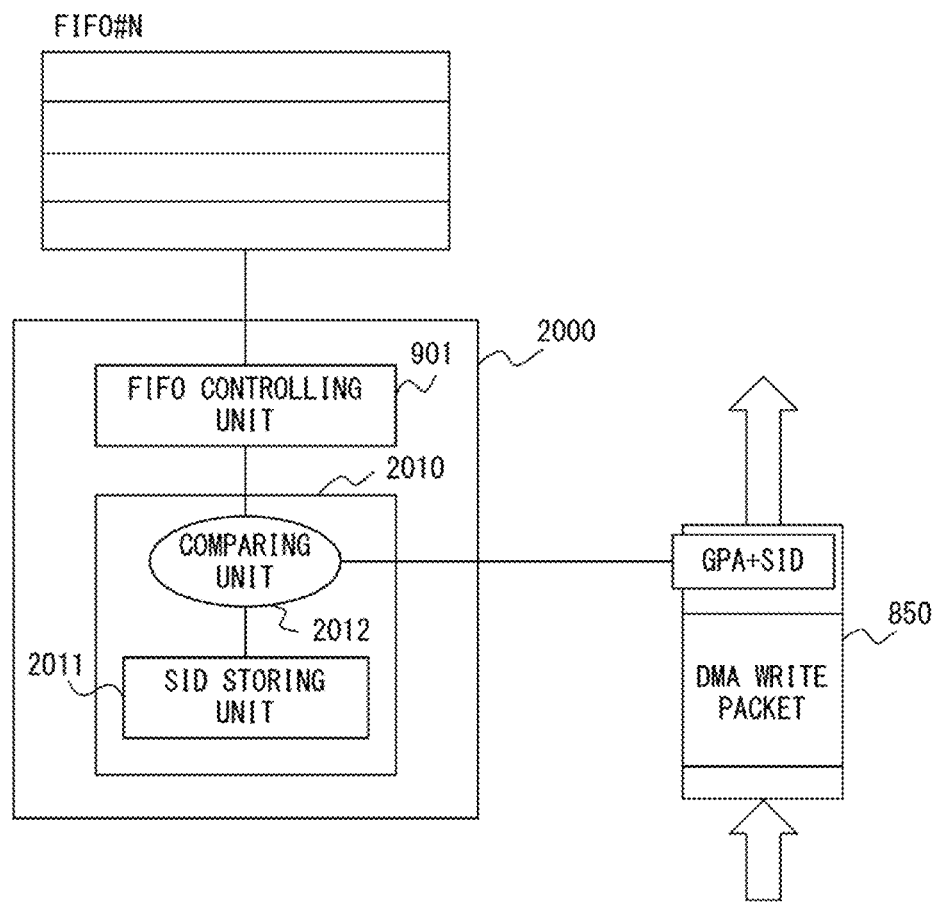
F I G. 2 0

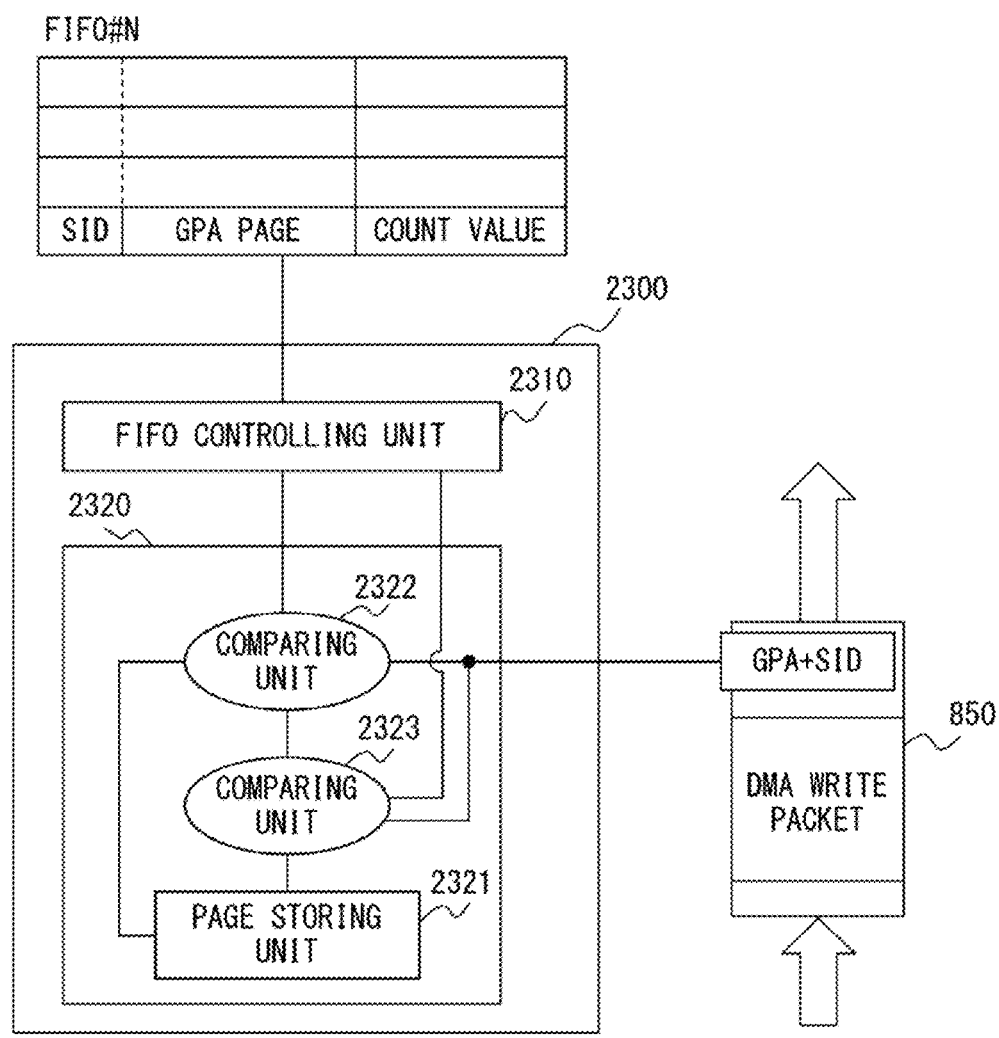
F I G. 23

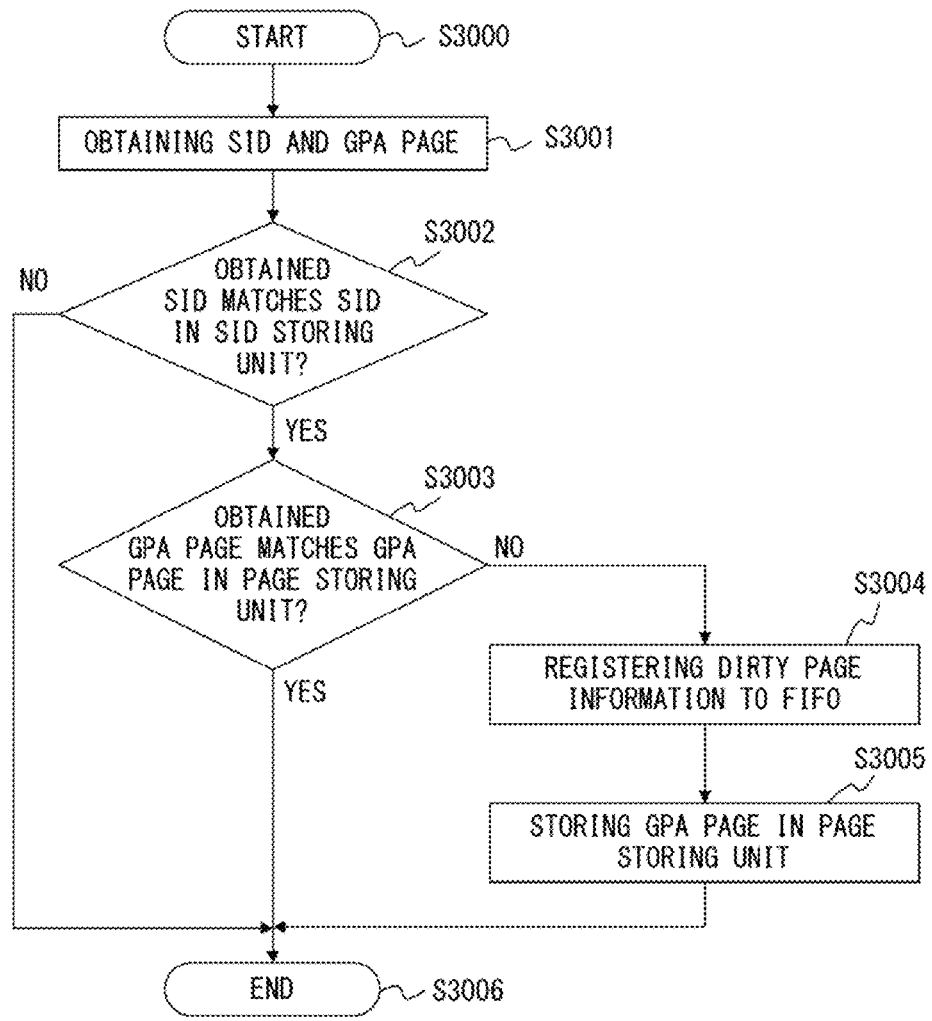
F I G. 30

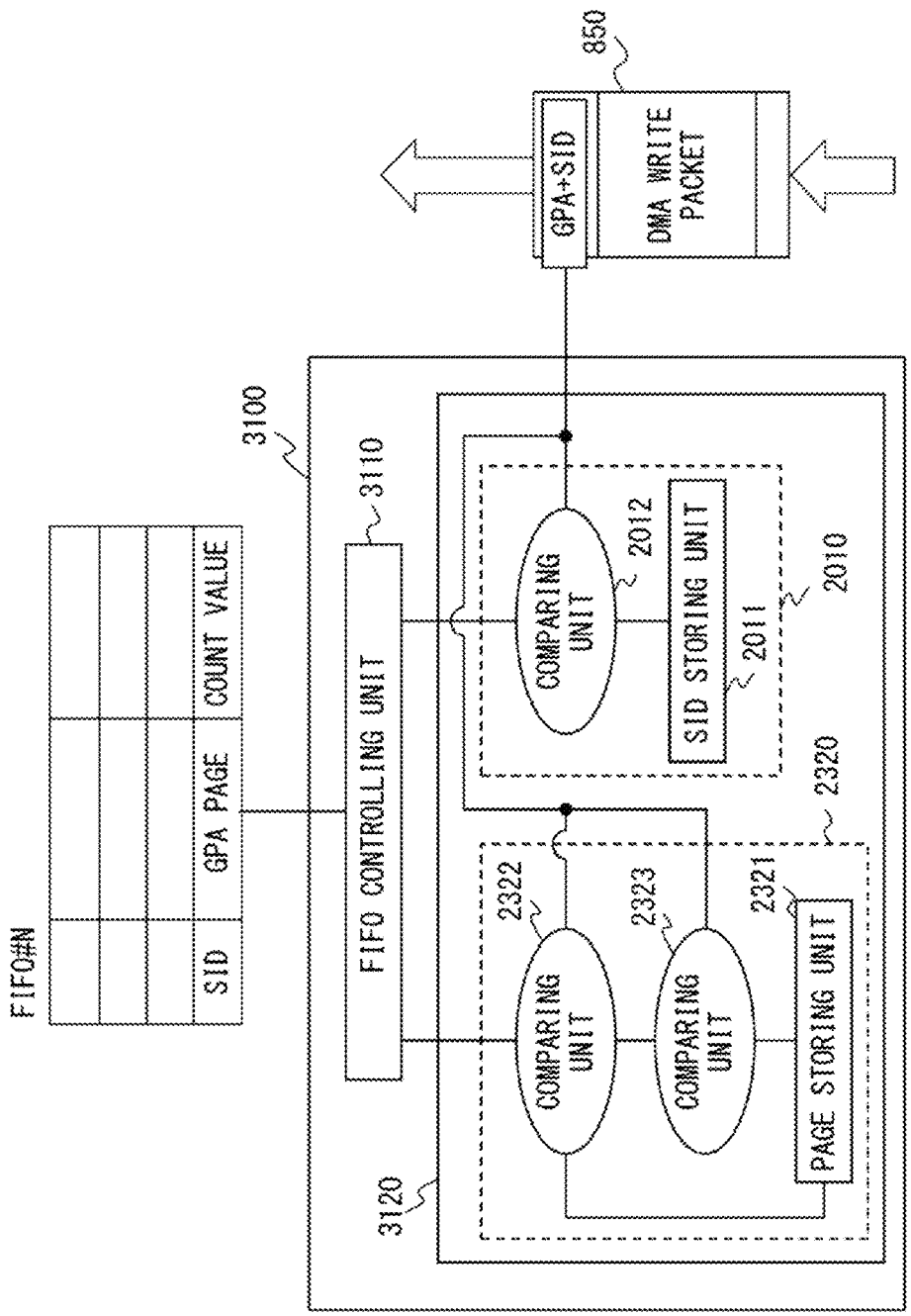
F I G. 31

| SOURCE ID | GPA PAGE | EXPANSION SIZE |
|---|---|---|
| xxx...xxx | yyy......yyy | z..z |
| ..... | ..... | ..... |
| | | |
| | | |

71  56 55  4  0
000h

FFFh

| BUS NUMBER | FUNCTION NUMBER |
|---|---|
71  64 63  56

FIG. 38

INFORMATION PROCESSING DEVICE

CROSS-REFERENCE TO RELATED APPLICATION

This application is based upon and claims the benefit of priority of the prior Japanese Patent Application No. 2010-282158, filed on Dec. 17, 2010, the entire contents of which are incorporated herein by reference.

FIELD

The embodiment discussed herein is related to an information processing device for implementing one or more virtual machines.

BACKGROUND

Conventionally, a server virtualization technique for operating a plurality of virtual servers called VMs (Virtual Machines) in a server as an information processing device is known.

FIG. 1 illustrates an outline of the server virtualization technique.

Software called VMM (Virtual Machine Monitor) 102 is operated in a server 101. The VMM 102 manages hardware resources for a memory, an IO (Input/Output) and the like of the server 101. Moreover, the VMM 102 emulates and provides each of VMs #0 to #2 with hardware resources needed by each of the VMs.

If a plurality of VMs are operated, an exclusive control for a memory is performed so that the plurality of VMs do not redundantly use a storage area of the same address in a physical memory included in the server 101. This exclusive control is performed with memory management of the VMM 102.

FIG. 2 illustrates an outline of the memory management performed by the VMM 102.

Memories respectively recognized by the VMs are called guest physical memories. These guest physical memories are grasped as continuous memory areas from the VMs. In contrast, the guest physical memories are grasped by the VMM 102 as separate memory spaces existing respectively for the VMs.

FIG. 2 illustrates the guest physical memories used when the two VMs #0 and #1 are operating in the VMM 102. In this case, there are two guest physical memories such as a guest physical memory #0 of the VM #0 and a guest physical memory #1 of the VM #1.

For example, an address X exists in each of the guest physical memories #0 and #1. If this address X is allocated to a real memory, namely, a host physical memory included in the server 101 unchanged, a memory contention occurs.

Therefore, the VMM 102 allocates the address X of the guest physical memory #0 to an address Z of the host physical memory, and also allocates the address X of the guest physical memory #1 to an address Y of the host physical memory. The VMM 102 allocates the host physical memory separately to the host physical memory in this way, thereby avoiding a memory contention.

Similar memory management is also needed when a VM executes a DMA (Direct Memory Access).

For example, a case where the VM #0 writes data to the address X of the guest physical memory #0 with a DMA transfer is considered. Writing data to a predetermined memory area with a DMA transfer is referred to as a DMA write. Moreover, a memory address that indicates a write destination of data with a DMA transfer is referred to as a DMA address.

In this case, if the VM #0 sets the address X as a DMA address in an IO adapter, a DMA write is made to the address X of the host physical memory. The address X of the host physical memory is a memory area unrelated to the address X of the guest physical memory #0. Therefore, memory corruption is caused. If the memory corruption is caused, the system panics, leading to a suspension of the system.

Accordingly, a DMA write by the VM #0 is made with the following procedures.

(1) The VM #0 requests the IO adapter to make a DM write to the address X of the guest physical memory #0.

(2) The VMM 102 traps the DMA write request made by the VM #0, and translates the address X of the guest physical memory #0 into an address W of a buffer area of the host physical memory. Then, the VMM 102 sets the translated address W in a DMA address setting register of the IO adapter.

(3) The VM #0 instructs the IO adapter to start the DMA.

(4) The IO adapter makes the DMA write to the address W.

(5) Upon completion of the DMA write, the IO adapter notifies the completion of the DMA write with a DMA completion interrupt.

(6) The VMM 102 copies data stored at the address W of the host physical memory to the address X of the guest physical memory #0.

(7) The VMM 102 notifies the VM #0 of the completion of the DMA write with a DMA completion interrupt.

(8) The VM #0 extracts the data from the address X of the guest physical memory #0.

One of the functions related to the server virtualization is a technique called live migration. Live migration is a technique for migrating a VM operating in one server to another without suspending an operation.

FIG. 3 illustrates an outline of live migration.

Live migration may be performed in an environment including two servers #0 and #1, a storage 320 shared by the servers #0 and #1, and a network 330 to which the servers #0 and #1 are connected. The live migration is performed with the following procedures.

(1) A VMM 311 operating in the migration destination server #1 prepares a VM 312.

(2) A migration source VMM 301 transfers the contents of a memory used by a migration source VM 302 to a migration destination VM 310 in a state in which the migration source VM 302 is operating. This process is called a pre-copying.

(3) The migration source VMM 301 suspends the operation of the migration source VM 302, and transfers the contents of the memory used by the migration source VM 302 to the migration destination VM 310. This process is referred to as a "stop-and-copy".

(4) The migration destination VM 312 resumes the operation according to an instruction issued from the migration destination VMM 311.

As described above, the VMM performs all memory copying such as pre-copying, stop-and-copy, and the like. The reason the VMM may perform the memory copying is that the VMM manages the host physical memory.

The VMM mediates not only a write process from a CPU (Central Processing Unit) to the host physical memory but a DMA write, and detects a changed portion of memory/data of the migration source VM.

There is a technique called an IOMMU (Input/Output Memory Management Unit) as an IO virtualization technique. The IOMMU is a technique for speeding up a memory access by reducing an overhead of the memory access by the above described mediation of a VMM.

The IOMMU is a memory management unit, connected to an IO adapter and a host physical memory, for translating between a guest physical memory address and a host physical memory address.

By mounting the IOMMU, a DMA may be directly performed from an IO device to a guest physical memory of a VM as illustrated in FIG. 4. Use of this technique eliminates the need for the mediation of a VMM when an access is made to a guest physical memory with a DMA. This technique also eliminates the need for the VMM to make a data copy between the host physical memory and the guest physical memory.

However, use of the IOMMU eliminates the need for the mediation of VMM at a DMA access as described above. In this case, the VMM may not grasp an update of the guest physical memory performed with a DMA write. Therefore, the VMM may not properly make a memory copy. For this reason, measures are taken against this problem such as making the server equipped with the IOMMU illustrated in FIG. 4 hold changed content of the guest physical memory using a DMA write.

In relation to the above described technique, a method and a system are known for enabling a physical address space to be purged from a reference table used to reference a physical address from a guest to a host while some accesses, such as a DMA or the like, to the physical address are allowed to be made between virtual machines.

[Patent Document 1] Japanese Laid-open Patent Publication No. 2006-252554

SUMMARY

According to an aspect of the embodiment, an information processing device includes the following units.

A virtual machine implementing unit implements one or more virtual machines by managing hardware resources.

A data transferring unit mutually translates between an address of a first memory area allocated to the virtual machine and an address of a second memory area that is a real memory of the first memory area. Then, the data transferring unit directly transfers data to the first memory area allocated to the virtual machine from an input/output device for controlling an input/output of data to/from an external device.

A detecting unit detects the data directly transferred from the input/output device to the first memory area allocated to the virtual machine.

A registering unit generates update information about the first memory area changed using the detected data and stores the update information in a first storing unit when the detected data satisfies a predetermined condition.

An outputting unit outputs the update information stored in the first storing unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 illustrates an outline of a server virtualization technique;

FIG. 4 is an explanatory view of an IOMMU;

FIG. 7 is an explanatory view of operations of a DMA process executed by a north bridge;

FIG. 8 is an explanatory view of operations of a DMA process executed by a PCIe-SWITCH;

FIG. 12 is a flowchart illustrating a dirty page information registration process executed by a dirty page managing unit;

FIG. 13 is a flowchart illustrating a dirty page information output process executed by the dirty page managing unit;

FIG. 16 is a flowchart illustrating a process of a pre-copying;

FIG. 17 is a flowchart illustrating a process of a stop-and-copy;

FIG. 20 illustrates an example of the packet detecting unit using a condition 2;

FIG. 23 illustrates an example of the packet detecting unit using a condition 3;

FIG. 30 is a flowchart illustrating a process executed by the packet detecting unit illustrated in FIG. 29;

FIG. 31 illustrates an example of the packet detecting unit using the conditions 2 and 3;

FIG. 38 illustrates a configuration example of a FIFO used when the packet detecting unit using the condition 5 is implemented.

DESCRIPTION OF EMBODIMENTS

To cause a server equipped with the IOMMU illustrated in FIG. 4 to hold changed content of a guest physical memory using a DMA write, a large-capacity storage device is needed to hold the changed content of the guest physical memory with the DMA write. Namely, a lot of hardware resources are needed to perform live migration in the server equipped with the IOMMU.

Embodiments is described below with reference to FIGS. 5 to 38. The embodiment described below is merely an example, and is not intended to exclude various modifications and technical applications, which are not explicitly described below. Namely, the embodiment may be implemented by being diversely modified, such as by combining implementation examples within a scope that does not depart from the gist of the embodiment.

<<An Embodiment>>

Figure 5:
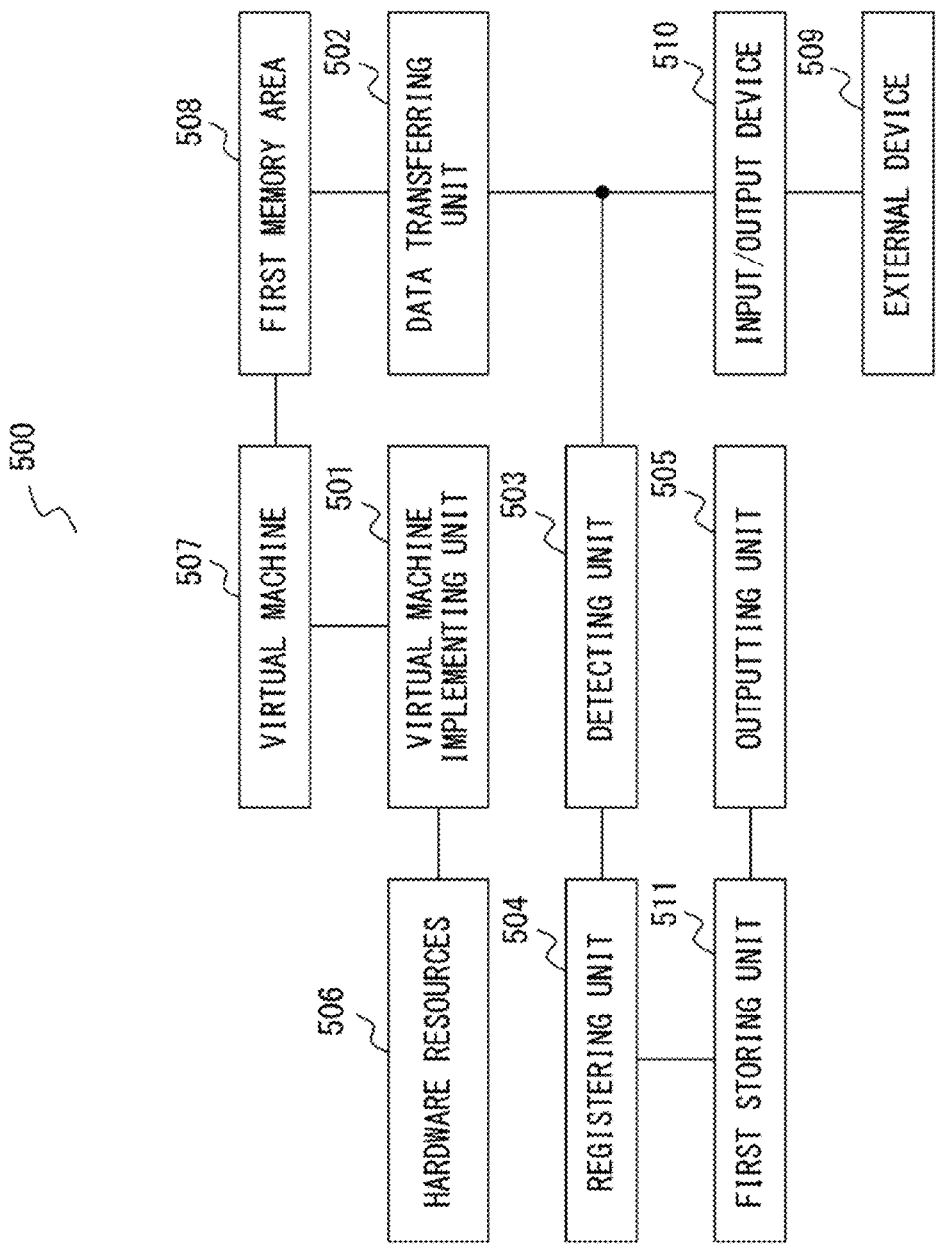
FIG. 5 is an explanatory view of an information processing device.

FIG. 5 is an explanatory view of an information processing device 500 according to the embodiment.

The information processing device 500 includes a virtual machine implementing unit 501, a data transferring unit 502, a detecting unit 503, a registering unit 504, and an outputting unit 505.

The virtual machine implementing unit 501 implements one or one or more virtual machines 507 by managing hardware resources 506. The virtual machine implementing unit 501 may be implemented by causing a CPU included in the information processing device 500 to execute a predetermined program instruction. Hardware resources 506 may include a memory included in the information processing device 500, and hardware for an I/O, and the like. In FIG. 5, a first memory area 508 and the hardware resources 506 are separately illustrated. However, the hardware resources 506 may include the first memory area 508.

The data transferring unit 502 translates between an address of the first memory area 508 allocated to the virtual machine 507 and an address of a second memory area that is a real memory of the first memory area 508. With this translation, the data transferring unit 502 transfers data directly from an input/output device 510 to the first memory area 508 allocated to the virtual machine 507. Such a data transfer may be implemented, for example, with an IOMMU or the like. Note that the input/output device 510 is a device for controlling a data input/output to/from an external device 509 communicatively connected to the information processing device 500.

The detecting unit 503 detects the data directly transferred from the input/output device 510 to the first memory area 508 allocated to the virtual machine 507.

The registering unit 504 generates update information about the first memory area 508 changed using the data detected by the detecting unit 503 and stores the generated update information in a first storing unit 511 if the data detected by the detecting unit 503 satisfies a predetermined condition. The update information may include an address of the first memory area 508 changed using the data detected by the detecting unit 503, and identification information for identifying a unit at an output source of the data.

The outputting unit 505 outputs the update information stored in the first storing unit 511.

As described above, the registering unit 504 stores the update information about the first memory area 508 changed using the data detected by the detecting unit 503 in the first storing unit 511. Then, the outputting unit 505 outputs the update information stored in the first storing unit 511.

Accordingly, the virtual machine 507 that operates in the information processing device 500 may obtain the update information of the memory area, which is directly transferred by the data transferring unit 502 from the input/output device 510 to the first memory area 508 allocated to the virtual machine 507.

As a result, even the information processing device 500 that includes the data transferring unit 502 for directly transferring data from the input/output device 510 to the first memory area 508 allocated to the virtual machine 507 may perform live migration of the virtual machine 507.

Additionally, the registering unit 504 generates update information and stores the update information in the first storing unit 511 only if the data detected by the detecting unit 503 satisfies a predetermined condition. As a result, the number of hardware resources needed to implement the first storing unit 511 may be reduced.

As described above, even the information processing device 500 that includes the data transferring unit 502 for directly transferring data from the input/output device 510 to the first memory area 508 may perform the live migration of the virtual machine 507 with a small number of hardware resources.

<<Another Embodiment>>

Figure 6:
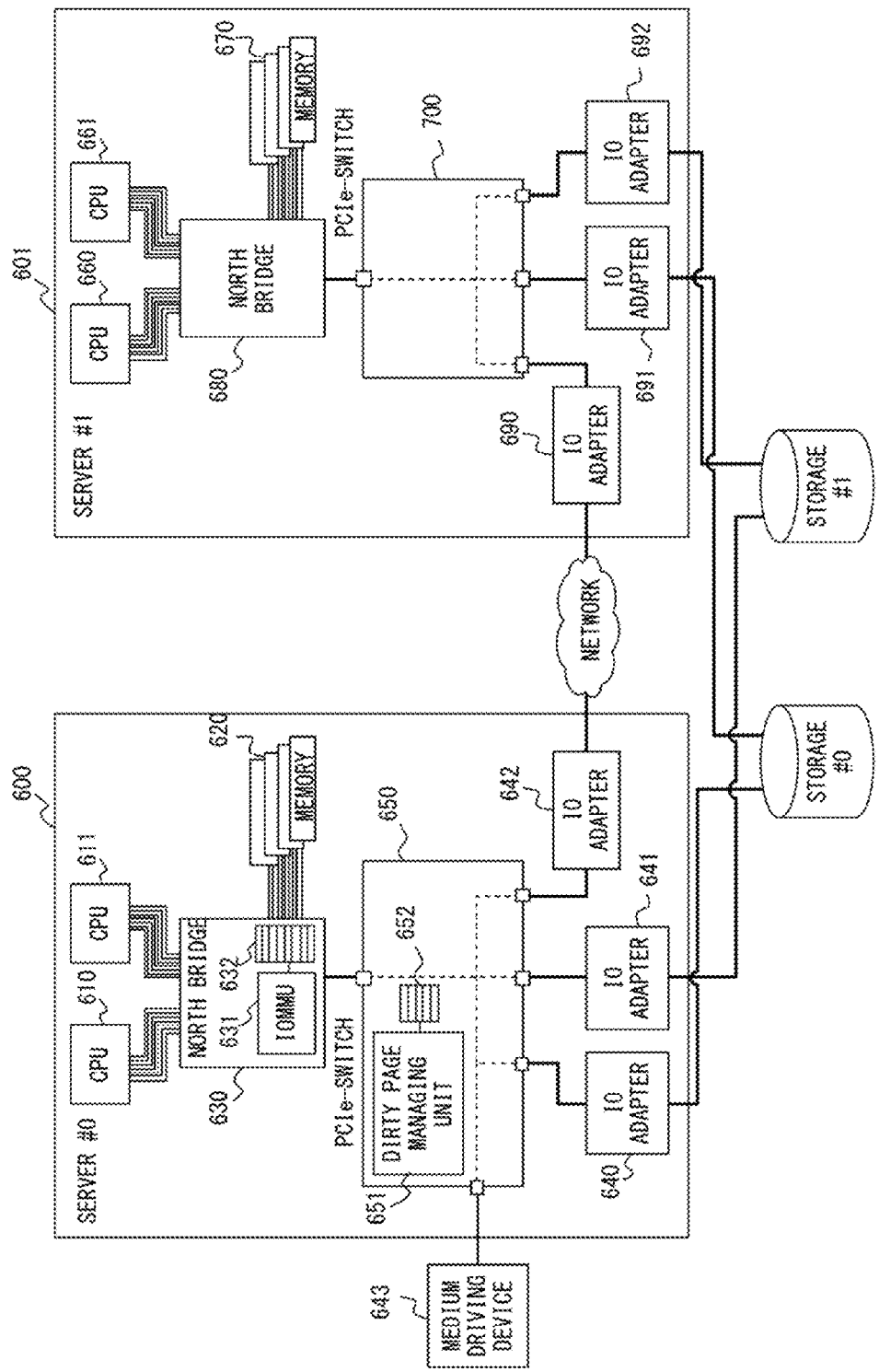
FIG. 6 illustrates a configuration example of the information processing device.

FIG. 6 illustrates a configuration example of an information processing device 600.

The information processing device 600 includes CPUs 610 and 611 as arithmetic devices, a memory 620 as a main storage device, and a north bridge 603 as a memory controlling device. The information processing device 600 also includes TO adapters 640, 641 and 642 as input/output controlling devices, and a PCIe-switch (PCI Express Switch) 650.

The CPUs 610 and 611 are arithmetic devices for respectively executing a program expanded in the memory 602. The CPUs 610 and 611 respectively implement virtualization of a server by executing a predetermined program. The CPUs 610 and 611 also implement the live migration according to the embodiment by reading and executing a predetermined program from a storage #0, #1 or the like.

Note that a conventional technique is available as a technique for managing hardware resources, management of a memory, and the like, which are needed to virtualize a server.

The memory 620 is a volatile memory for storing a program executed by the CPUs 610, 611, and data. For example, a RAM (Random Access Memory) or the like is used as the memory 620. A nonvolatile memory may be used as needed.

The north bridge 630 is connected to the CPUs 610, 611, the memory 620 and the PCIe-switch 650. The north bridge 630 controls a data transfer channel so that the CPUs 610, 611, the memory 620, and the PCIe-switch 650 may communicate with one another.

Additionally, the north bridge 630 includes an IOMMU 631, and an IO table storing unit 632.

The IOMMU 631 is a memory managing unit for performing memory management such as a translation between an address of a guest physical memory and that of a host physical memory. An address of a guest physical memory is hereinafter referred to as a guest physical address and abbreviated to GPA (Guest Physical Address). In contrast, an address of a host physical memory is hereinafter referred to as a host physical address and abbreviated to "HPA (Host Physical Address)".

The IO table storing unit 632 is a storage device for storing an IO table used when the IOMMU 631 translates between a GPA and an HPA. For example, a cache memory or the like is used as the IO table storing unit 632. The IO table will be described later with reference to FIG. 7.

Each of IO adapters 640, 641 and 642 is an interface with an IO device connected to the information processing device 600. A DMA circuit for performing a DMA is included in each of the IO adapters 640, 641 and 642. An IO device is an input/output device such as a storage #0, #1, illustrated in FIG. 6, for storing data, a network appliance for making a connections to a network, or the like.

The PCIe-switch 650 is connected to the north bridge 630, and the IO adapters 640, 641 and 642. Moreover, the PCIe-switch 650 performs a switching control of a data transfer channel that links between the north bridge 630 and the IO adapters 640, 641 and 642. The information processing device 600 uses "PCI Express 2.0" that is a standard of a serial transfer interface for a data transfer channel.

The PCIe-switch 650 also includes a dirty page managing unit 651 and a dirty page storing unit 652.

The dirty page managing unit 651 detects a packet as data transferred with a DMA write from the IO adapter 640, 641 or 642 to the memory 620. Then, the dirty page managing unit 651 stores information about the data added, changed, updated or the like with the DMA write in the dirty page storing unit 652 in units of pages.

The data added, changed, updated or the like with the DMA write in units of pages is referred to as dirty page. Moreover, information about a dirty page is referred to as dirty page information.

The dirty page storing unit 652 is a storage device for storing dirty page information. For example, a static RAM or the like is used as the dirty page storing unit 652.

The information processing device 600 is connected to the information processing device 601 via a network in order to perform live migration. Moreover, the information processing device 600 and the information processing device 601 share the storages #0 and #1.

The information processing device 601 includes CPUs 660, 661, a memory 670, a north bridge 680, IO adapters 690, 691 and 692, and a PCIe-switch 700.

The CPUs 660, 661, the memory 670 and the north bridge 680 respectively have functions similar to the CPUs 610, 611, the memory 620 and the north bridge 630. Moreover, the IO adapters 690, 691 and 692, and the PCIe-switch 700 respectively have functions similar to the IO adapters 640, 641 and 642, and the PCIe-switch 650.

However, the north bridge 680 does not need to include the IOMMU 631 and the IO table storing unit 632. Similarly, the PCIe-switch 700 does not need to include the dirty page managing unit 651 and the dirty page storing unit 652.

Figure 2:
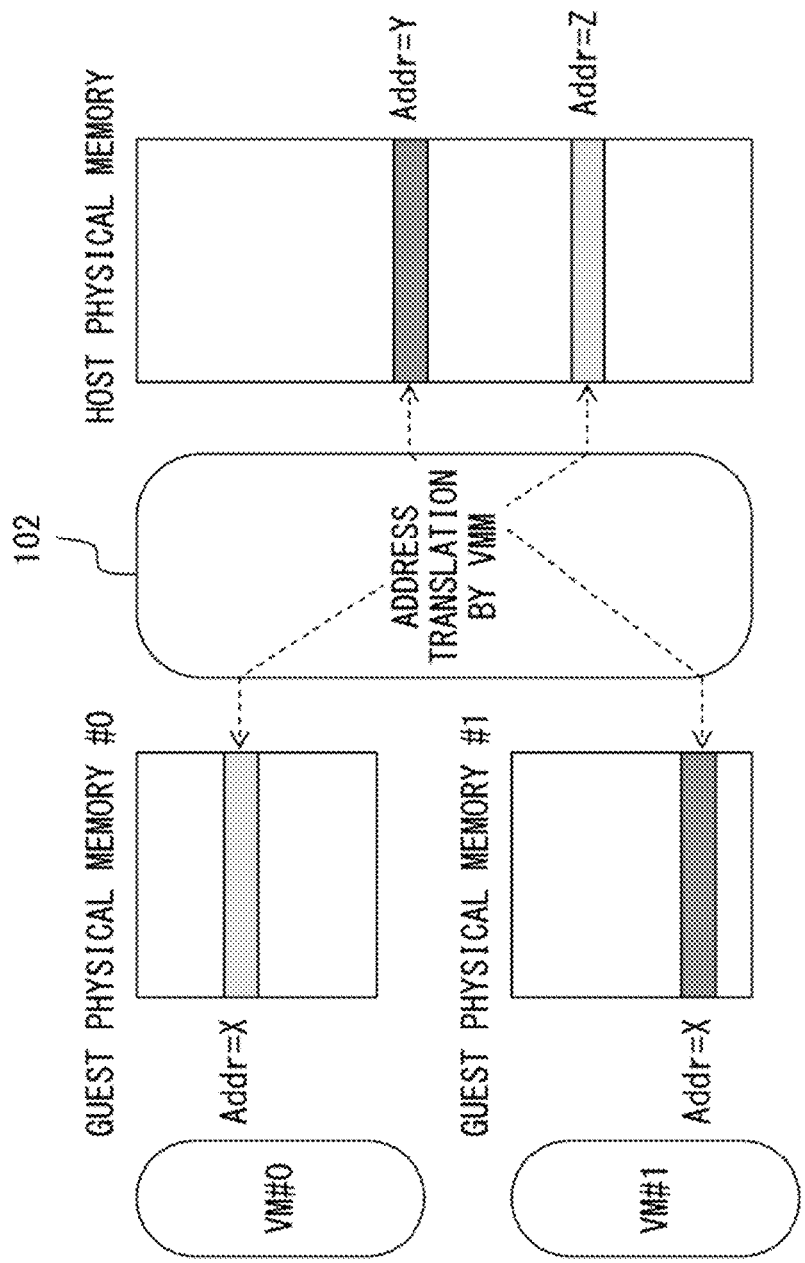
FIG. 2 illustrates an outline of memory management performed by a VMM.
Figure 3:
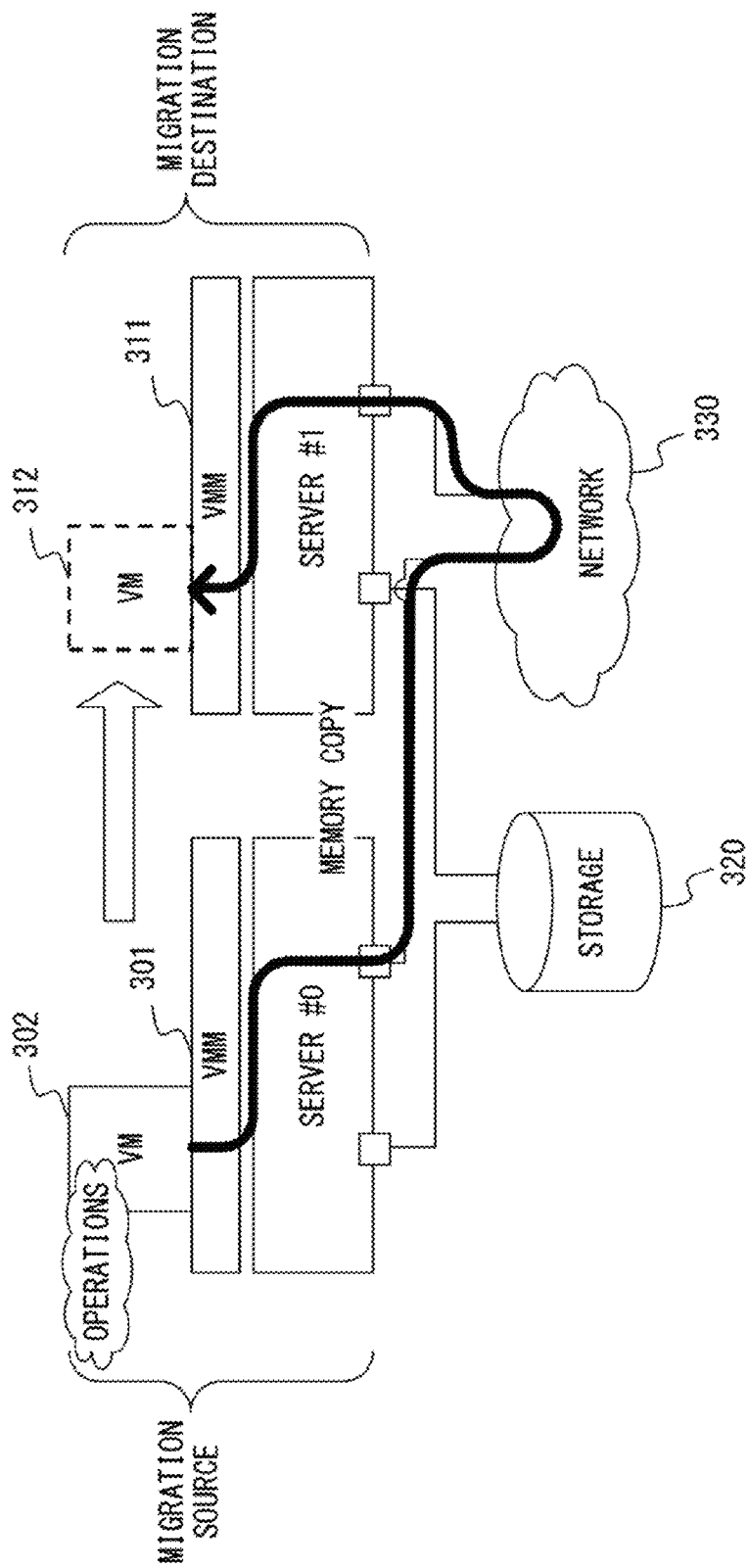
FIG. 3 illustrates an outline of live migration.

The information processing device 601 connected to the information processing device 600 may have any configuration as long as the information processing device 601 may perform the normal live migration illustrated in FIG. 3.

The configuration illustrated in FIG. 6 is one example of the information processing device 600 according to the embodiment. Therefore, the configuration of the information processing device 600 is not limited to that illustrated in FIG. 6. For example, the number of CPUs, the number of IO adapters, and the layout of units that configure the information processing device 600 are not limited to those illustrated in FIG. 6.

Additionally, the information processing device 600 may include a medium driving device 643 for driving a portable storage medium such as a CD, a DVD, and the like. If a program for the live migration according to the embodiment is stored on the portable storage medium such as a CD, a DVD, or the like, the CPUs 610, 611 implement the live migration according to the embodiment by reading and executing the program from the portable storage medium via the medium driving device 643.

FIG. 7 is an explanatory view of operations of a DMA process executed by the north bridge 630.

DMA packets 710 and 711 are packets as data transferred from the IO adapter 640, 641 or 642 to a predetermined transfer destination with the DMA process.

The IO table 720 indicates an IO table stored in the IO table storing unit 632. The IO table 720 is an address translation table between a GPA and an HPA. The IO table 720 defines an HPA corresponding to an address that includes a GPA and a source ID. The source ID is ID (Identification Data) for identifying a unit at a transfer source of a packet. The source ID is hereinafter abbreviated as SID (Source ID).

The IO table 720 caches (temporarily holds) some entries frequently used among entries of a page table 730 to be described below.

The page table 730 is an address translation table between a GPA and an HPA. The page table 730 defines an HPA corresponding to a GPA.

The IOMMU 631 obtains a GPA and an SID from a header of a detected packet 710 upon detection of the DMA packet 710.

Then, the IOMMU 631 references the IO table 720. Next, the IOMMU 631 determines whether or not an address including the GPA and the SID obtained from the DMA packet 710, is registered to the IO table 720.

If the address including the GPA and the SID obtained from the DMA packet 710 is registered, the IOMMU 631 obtains an HPA corresponding to the address including the GPA and the SID.

Then, the IOMMU 631 changes the GPA that indicates the transfer destination set in the header of the DMA packet 710 to the HPA obtained from the IO table 720.

Alternatively, if the address including the GPA and the SID obtained from the DMA packet 710 is not registered to the IO table 720, the IOMMU 631 references the page table 730 stored in the memory 620.

Then, the IOMMU 631 obtains an HPA that is an address of the page table 730 and is registered to the same address as the GPA obtained from the DMA packet 710.

Next, the IOMMU 631 changes the GPA indicating the transfer destination set in the header of the DMA packet 710 to the HPA obtained from the page table 730.

The DMA packet 711 having the transfer destination address that is translated from the GPA to the HPA in this way is output to the memory 620.

FIG. 8 is an explanatory view of operations of the DMA process executed by the PCIe-switch 650.

The dirty page managing unit 651 includes a control I/F (Interface) unit 810, a packet detecting unit 820, a write pointer 830, and a read pointer 804.

For ease of understanding of the operations of the dirty page managing unit 651, FIG. 8 illustrates a dirty page storing unit 652 within the dirty page managing unit 651.

The dirty page storing unit 652 includes memories #0 and #1 that respectively implement FIFOs (First In First Outs). The memories #0 and #1 that respectively implement the FIFOs are hereinafter referred to as a "FIFO #0" and a "FIFO #1".

The control I/F unit 810 is an interface of the dirty page managing unit 651. The VMM 102 obtains dirty page information stored in the FIFO #0 or #1 via the control I/F unit 810.

The control I/F unit 810 includes a status register 811, a data register 812, and a control register 813.

The status register 811 is a register that may be read/written by software such as the VMM 102 or the like. The status register 811 has the following status display bits.

overflow information bit #0: indicates that the FIFO #0 has overflown.

overflow information bit #1: indicates that the FIFO #1 has overflown.

valid data count #0: indicates a value obtained by dividing a difference between an address pointed to by the write pointer 830 and an address pointed to by the read pointer 840 by the size of dirty page information in the FIFO #0. Also indicates the remaining amount of dirty page information yet to be read in the FIFO #0.

valid data count #1: indicates a value obtained by dividing a difference between an address pointed to by the write pointer 830 and an address pointed to by the read pointer 840 by the size of dirty page information in the FIFO #1. Also indicates the remaining amount of dirty page information yet to be read in the FIFO #1.

The data register 812 is a register that may be read by software such as the VMM 102 or the like. This register is a register used to read data stored in the FIFO #0 or #1 by the VMM 102.

In the data register 812, dirty page information read from the FIFO #0 or #1 specified with a read select bit of the control register 813 is set. The dirty page managing unit 651 sets in the read pointer 840 an address at which the next dirty page information is stored, at the same time the dirty page information stored in the data register 812 is read.

The control register 813 is a register that may be read/written by software such as the VMM 102 or the like. The control register 813 has the following control bits.

start bit: starts registration of dirty page information to the FIFO #0 or #1.

stop bit: stops registration of dirty page information to the FIFO #0 or #1.

clear bit: clears a pointer of the FIFO #0 or #1 to zero, and makes the status of the FIFO #0 or #1 empty. The empty status is a status where there is no dirty page information registered in the FIFO.

write select bit: selects whether dirty page information is registered to either the FIFO #0 or #1.

read select bit: selects whether dirty page information is read from either the FIFO #0 or #1.

The packet detecting unit 820 detects a DMA write packet 850 input to the PCIe-switch 650 while the start bit of the control register 813 is set to "1". Then, the packet detecting unit 820 obtains a GPA and an SID from the header of the detected DMA write packet 850. Then, the packet detecting unit 820 obtains a page portion from the obtained GPA. Data of the page portion obtained from the GPA is hereinafter referred to as a GPA page. The GPA page will be described later with reference to FIG. 10. Moreover, the packet detecting unit 820 writes the data including the GPA page and the SID to the FIFO #0 or #1 currently being selected as dirty page information. At the same time, the packet detecting unit 820 sets an address of an area for storing dirty page information next in the write pointer 830.

Here, the sizes of the FIFOs #0 and #1 need to be increased in order to avoid overflow. For example, if DMA performance is 10 Gbps and a switching time between the FIFOs #0 and #1 is 1 ms, a very large FIFO that may store dirty page information of approximately tens of thousands of entries is needed. Namely, a lot of hardware resources are needed.

Additionally, if many DMA writes occur even when the sizes of the FIFOs are increased, there is a higher probability of overflow for the FIFOs. This is because the speed of a DMA transfer, namely, the speed at which the packet detecting unit 820 detects a DMA write and writes dirty page information to the FIFO, is faster than the speed at which the CPU reads dirty page information stored in the FIFO.

Accordingly, the packet detecting unit 820 according to the embodiment determines whether or not either or both of the obtained GPA page and SID satisfy a particular condition. If either or both of them satisfy the particular condition, the packet detecting unit 820 writes the data including the GPA page and the SID to the FIFO #0 or #1 currently being selected as dirty page information. At the same time, the packet detecting unit 820 sets an address of an area for storing the dirty page information next in the write pointer 830.

The write pointer 830 indicates an address of dirty page information written most recently to the FIFO #0 or #1. In the embodiment, the FIFOs #0 and #1 respectively include the write pointer 830 as illustrated in FIG. 8.

The read pointer 840 indicates an address of dirty page information read most recently from the FIFO #0 or #1. In the embodiment, the FIFOs #0 and #1 respectively include the read pointer 840 as illustrated in FIG. 8.

If the FIFO #0 is selected, a write pointer and a read pointer for the FIFO #0 are stored as the write pointer 830 and the read pointer 840.

Similarly, if the FIFO #1 is selected, a write pointer and a read pointer for the FIFO #1 are stored as the write pointer 830 and the read pointer 840.

Figure 9:
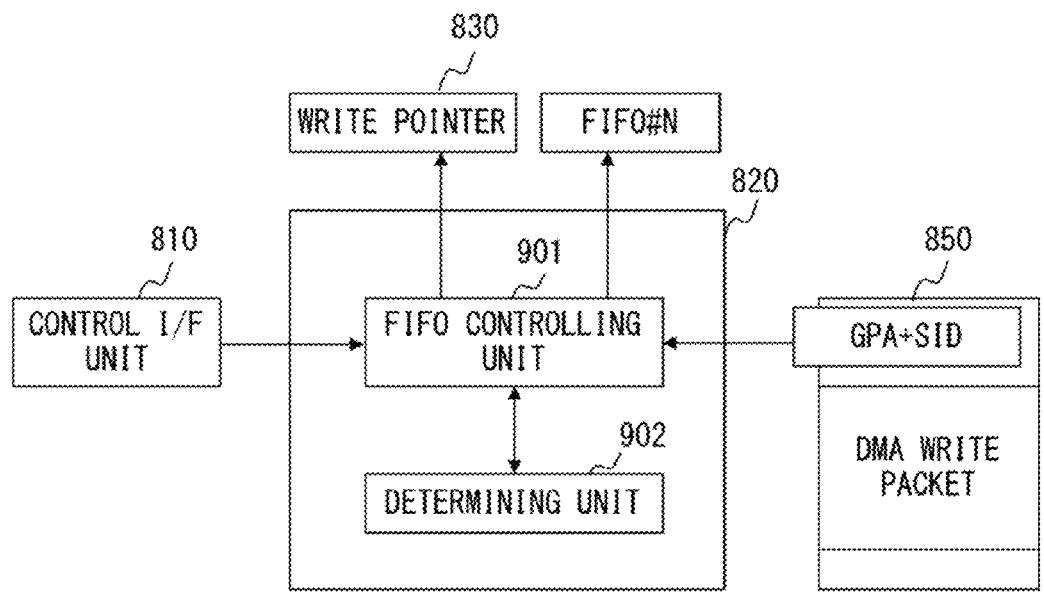
FIG. 9 illustrates a configuration example of a packet detecting unit.

FIG. 9 illustrates a configuration example of the packet detecting unit 820. A FIFO #N illustrated in FIG. 9 indicates the FIFO #0 or #1 currently being selected. Also a FIFO #N illustrated in FIGS. 18, 20, 23, 25, 27, 29, 31, 33 and 35 indicates the FIFO #0 or #1 currently being selected.

The packet detecting unit 820 includes a FIFO controlling unit 901 and a determining unit 902.

The FIFO controlling unit 901 detects a DMA write packet 850 while the start bit of the control register 813 included in the control I/F unit 810 is being set to "1". The FIFO controlling unit 901 obtains a GPA page and an SID from the header of the detected DMA write packet 850.

The FIFO controlling unit 901 obtains, from the determining unit 902, a determination result such that dirty page information needs to be written to the FIFO #0 or #1 currently being selected. In this case, the FIFO controlling unit 901 writes data including the GPA page and the SID, which are obtained from the DMA write packet 850, to the FIFO #0 or #1 currently being selected as dirty page information. At the same time, the FIFO controlling unit 901 sets an address of an area for storing dirty page information next in the write pointer 830.

Alternatively, the FIFO controlling unit 901 obtains, from the determining unit 902, a determination result such that the dirty page information does not need to be written to the FIFO #0 or #1 currently being selected. In this case, the FIFO controlling unit 901 does not write the dirty page information to the FIFO #0 or #1 currently being selected.

The determining unit 902 determines whether or not either or both of the GPA page and the SID, which are obtained from the DMA write packet 850, satisfy a particular condition. If either or both of them satisfy the particular condition, the determining unit 902 determines that the dirty page information needs to be written to the FIFO #0 or #1 currently being selected, and notifies the FIFO controlling unit 901 that the dirty page information needs to be written.

Alternatively, if either or both of them do not satisfy the particular condition, the determining unit 902 determines that the dirty page information does not need to be written to the FIFO #0 or #1 currently being selected, and notifies the FIFO controlling unit 901 that the dirty page information does not need to be written.

Diverse conditions such as the following condition 1 to condition 5, a combination of the condition 1 to the condition 5, or the like maybe used as the particular condition used by the determining unit 902.

condition 1: Writing dirty page information to the FIFO #0 or #1 currently being selected only if a DMA address obtained from the DMA write packet 850 is different from a DMA address written most recently to the FIFO #0 or #1 currently being selected. A example of the packet detecting unit 820 using the condition 1 will be described later with reference to FIGS. 18 and 19.

condition 2: Writing dirty page information to the FIFO #0 or #1 currently being selected only if a unit at a transmission source of the DMA write packet 850 is a target of the live migration. A example of the packet detecting unit 820 using the condition 2 will be described later with reference to FIGS. 20 to 22.

condition 3: Writing dirty page information to the FIFO #0 or #1 currently being selected only if a DMA write is an access that is performed by using a DMA address most recently written to the FIFO #0 or #1 currently being selected as a start address and is not a sequential access over a plurality of pages. A example of the packet detecting unit 820 using the condition 3 will be described later with reference to FIGS. 23 and 24.

condition 4: Writing dirty page information to the FIFO #0 or #1 currently being selected only if a DMA address obtained from the DMA write packet 850 is different from all of a plurality of DMA addresses written to the FIFO #0 or #1 currently being selected. A example of the packet detecting unit 820 using the condition 4 will be described later with reference to FIGS. 25 and 26.

condition 5: Writing dirty page information to the FIFO #0 or #1 currently being selected only if the DMA address obtained from the DMA write packet 850 is not within a predetermined range from all of a plurality of DMA addresses written to the FIFO #0 or #1 currently being selected. A example of the packet detecting unit 820 using the condition 5 will be described later with reference to FIGS. 27 and 28.

Additionally, a example of the packet detecting unit 820 in the case of using a combination of the above described condition 1 to condition 5 will be described later with reference to FIGS. 29 to 38.

Figure 10:
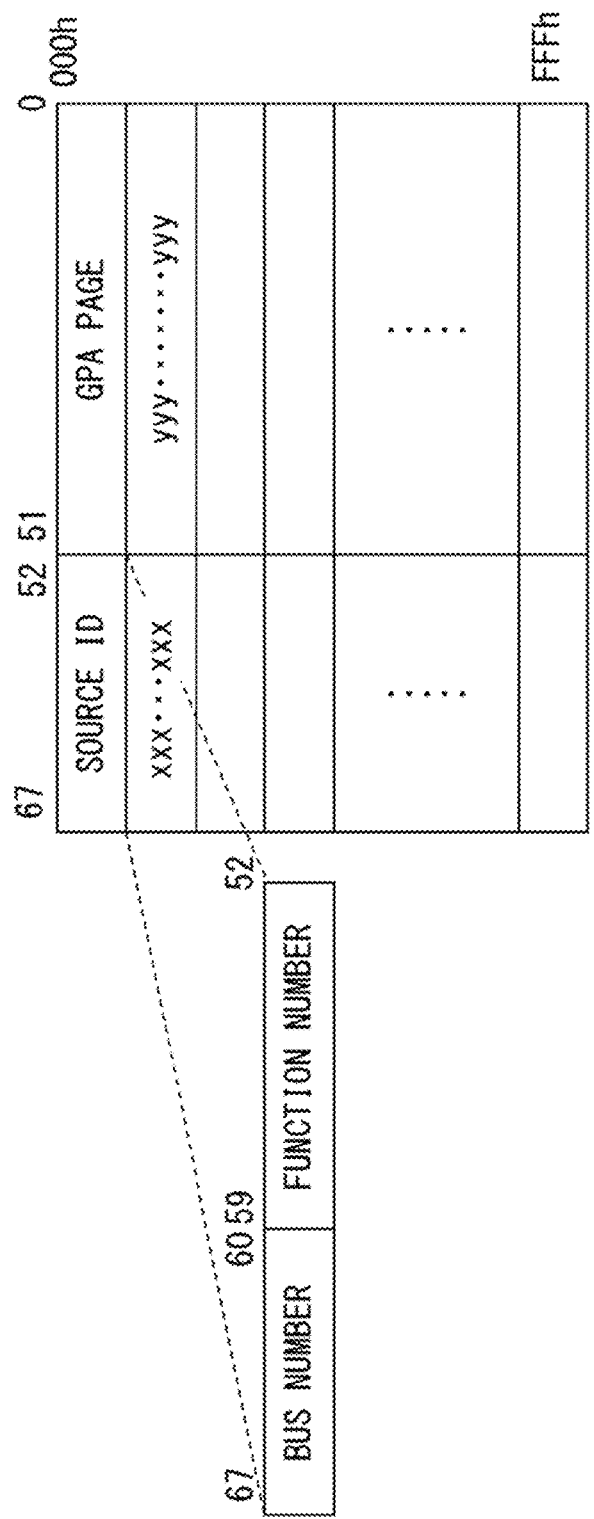
FIG. 10 illustrates a configuration example of a FIFO #0.

FIG. 10 illustrates a configuration example of the FIFO #0. FIG. 10 illustrates only the FIFO #0. However, the FIFO #1 also has a similar configuration.

The FIFO #0 includes an SID that indicates an IO adapter at a transmission source of a DMA packet, and a GPA page of a GPA that indicates a transfer destination of the DMA packet. In the case of a PCI Express, the SID includes a bus number of the transmission source of the DMA packet, and a function number of the transmission source of the DMA packet.

In the embodiment, the size of one page is assumed to be 4 KB. In this case, a low-order 12 bits of 64-bit address data represent an address within the same page. Accordingly, GPA [63:12] including data from bits 63 to 12, namely, a GPA page in the GPA, is registered to the FIFO #0 in the embodiment.

If 32-bit data is used as the GPA, a GPA page for address data having a 64-bit obtained by complementing "0" to the bits 63 to 32 of the GPA is registered to the FIFO #0.

The above described SID and GPA page may be obtained from the header of a DMA packet.

Figure 11:
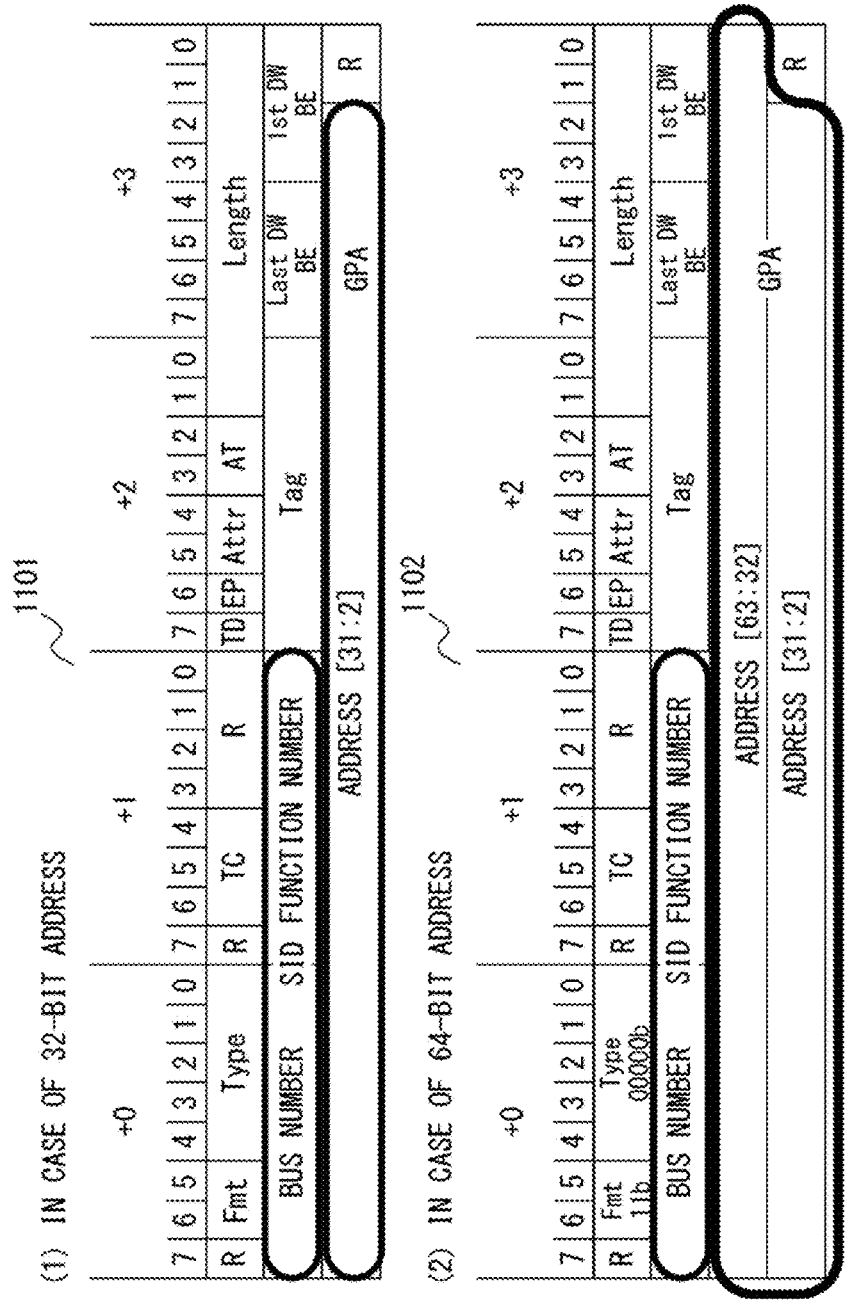
FIG. 11 illustrates a configuration example of a header of a DMA packet.

FIG. 11 illustrates configuration examples of the header of a DMA packet. Since the PCIe-switch 650 is used in the embodiment, the header of the DMA packet conforms to the standard "PCI Express 2.0".

A header 1101 of the DMA packet indicated by (1) of FIG. 11 illustrates a configuration example of the header of the DMA packet when 32-bit address data is used as a GPA. A header 1102 of a DMA packet indicated by (2) of FIG. 11 illustrates a configuration example of the header of the DMA packet when 64-bit address data is used as a GPA.

"R" is a reserved area. "0" is always set in this area.

"Fmt(Format)" is 2-bit data indicating whether or not there is data stored in a payload, and indicating a header length.

"Type" is 5-bit data indicating a type of a packet.

"TC (Transaction Class)" is 3-bit data indicating the priority of a packet.

"TD (TLP (Transaction Layer packet) Digest)" is 1-bit data indicating whether or not there is an ECRC (Extended Cyclical Redundancy Check) that is an error check code.

"EP (Error Poisoned)" is 1-bit data indicating a possibility that data stored in the payload is corrupted.

"Attr (Attributes)" is 2-bit data indicating complementary information about the order and the protocol of a packet.

"AT (Address Translation)" is 2-bit data indicating complementary information about an address translation.

"Length" is 10-bit data indicating the data length of data stored in the payload.

"bus number" is 8-bit data indicating a bus number at a transmission source of a DMA packet.

"function number" is 8-bit data indicating a function number at the transmission source of a DMA packet.

"Tag" is 8-bit data indicating a management number of a DMA packet.

"Last DW BE" is 4-bit data indicating whether Last DW Byte is either valid or invalid.

"1st DW BE" is 4-bit data indicating whether a 1st DW Byte is either valid or invalid.

"address" is 30-bit or 62-bit long address data.

FIG. 12 is a flowchart illustrating a dirty page information registration process executed by the dirty page managing unit 651. A FIFO illustrated in FIG. 12 indicates either of the FIFOs #0 and #1 set by the write select bit of the control register 813.

When software such as the VMM 102 sets the start bit of the control register 813 included in the dirty page managing unit 651 to "1", the dirty page managing unit 651 starts the dirty page information registration process (step S1200).

In step S1201, the packet detecting unit 820 references the header of a DMA packet input from the IO adapter 640, 641, 642 or the like to the PCIe-switch 650.

Then, the packet detecting unit 820 obtains "Fmt" and "Type" from the header of the DMA packet.

When the packet detecting unit 820 detects a DMA write packet which is transferred from the IO adapter to the memory 620 and in which "Fmt=10 (binary number) or Fmt=11 (binary number) and Type=00000 (binary number), the flow goes to step S1202 ("YES" in step S1201).

If Fmt=10 (binary number), this indicates that the packet is a DMA packet using 32-bit address data as a GPA. Alternatively, if Fmt=11 (binary number), the packet is a DMA packet using 64-bit address data as a GPA.

Additionally, Type=00000 (binary number) indicates that the packet is a DMA write packet.

If it is determined that the DMA packet input to the PCIe-switch 650 is not a DMA write packet, the packet detecting unit 820 re-executes step S1201 ("NO" in step S1201).

In step S1202, the packet detecting unit 820 determines whether or not the FIFO is Full by judging whether or not a difference between an address pointed to by the write pointer 830 and an address pointed to by the read pointer 840 is equal to a value obtained by dividing the size of the FIFO by the size of dirty page information.

If the difference between the address pointed to by the write pointer 830 and the address pointed to by the read pointer 840 is zero, the packet detecting unit 820 determines that the FIFO is Full ("YES" in step S1202). In this case, the flow goes to step S1203.

After the packet detecting unit 820 sets the overflow information bit of the status register 811 to "1" in step S1203, the flow goes to step S1209. Then, the dirty page managing unit 651 terminates the dirty page information registration process.

If the difference between the address pointed to by the write pointer 830 and the address pointed to by the read pointer 840 is not equal to the value obtained by dividing the size of the FIFO by the size of the dirty page information in step S1202 ("NO" in step S1202), the packet detecting unit 820 determines that the FIFO is not Full. In this case, the flow goes to step S1204.

In step S1204, the packet detecting unit 820 obtains an SID and a GPA from the header of the DMA write packet. Then, the packet detecting unit 820 obtains a GPA page from the GPA.

In step S1205, the packet detecting unit 820 determines whether or not dirty page information needs to be written to the FIFO based on either or both the SID and the GPA page, which are obtained in step S1204. If the packet detecting unit 820 determines that the dirty page information does not need to be written to the FIFO ("NO" in step S1205), the packet detecting unit 820 terminates the dirty page information registration process (step S1209).

Alternatively, if the packet detecting unit 820 determines that the dirty page information needs to be written to the FIFO ("YES" in step S1205), the flow goes to step S1206. In this case, the packet detecting unit 820 registers data including the SID and the GPA page, which are obtained in step S1204, to the address of the FIFO pointed to by the write pointer 830 as dirty page information.

In step S1207, the packet detecting unit 820 increments the address stored in the write pointer 830 by the size of an area for storing the dirty page information.

In step S1208, the packet detecting unit 820 references the control register 813 included in the control I/F unit 810. If a stop bit of the control register 813 is set to "1" ("YES" in step S1208), the flow goes to step S1209. Then, the dirty page managing unit 651 terminates the dirty page information registration process.

If the stop bit of the control register 813 is not set to "1" in step S1208 ("NO" in step S1208), the flow goes to step S1201.

FIG. 13 is a flowchart illustrating a dirty page information output process executed by the dirty page managing unit 651. A FIFO illustrated in FIG. 13 indicates either of the FIFOs #0 and #1 set by the read select bit of the control register 813.

After software such as the VMM 102 or the like reads dirty page information from the data register 812 included in the dirty page managing unit 651 in step S1301, the flow goes to step S1302.

In step S1302, the control I/F unit 810 increments an address stored in the read pointer 840 by the size of an area for storing dirty page information.

In step S1303, the control I/F unit 810 obtains the dirty page information from the address of the FIFO pointed to by the read pointer 840, and latches the obtained information in the data register 812.

Upon termination of the above described process, the flow goes to step S1304. Then, the control I/F unit 810 terminates the dirty page information output process.

Figure 14:
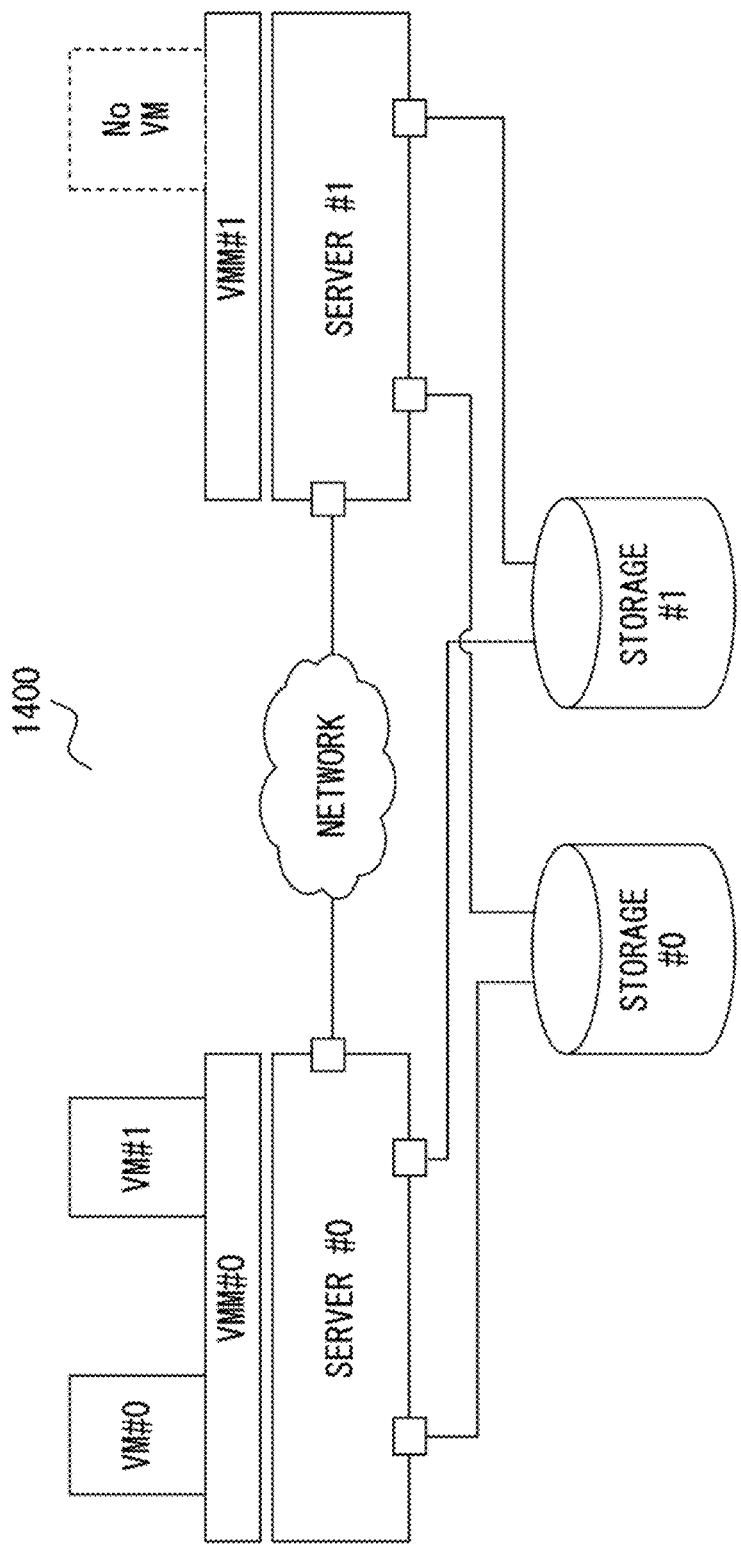
FIG. 14 is an explanatory view of an outline of live migration according to the embodiment.

FIG. 14 is an explanatory view of an outline of the live migration according to the embodiment.

An information processing system 1400 illustrated in FIG. 14 includes a server #0, a server #1 communicatively coupled to the server #0 via a network, and storages #0 and #1 shared by the server #0 and the server #1.

The server #0 is the information processing device 600 illustrated in FIG. 6. The server #1 is the information processing device 601 illustrated in FIG. 6.

VMM #0 operates in the server #0. The VMM #0 implements VM #0 and VM #1. In the meantime, VMM #1 operates in the server #1. Moreover, the VM #0 exclusively occupies the storage #0, whereas the VM #1 exclusively occupies the storage #1.

A case of performing the live migration for migrating the VM #0 implemented by the VMM #0 that operates in the server #0 to the VMM #1 that operates in the server #1 in the above described state is described below.

Figure 15:
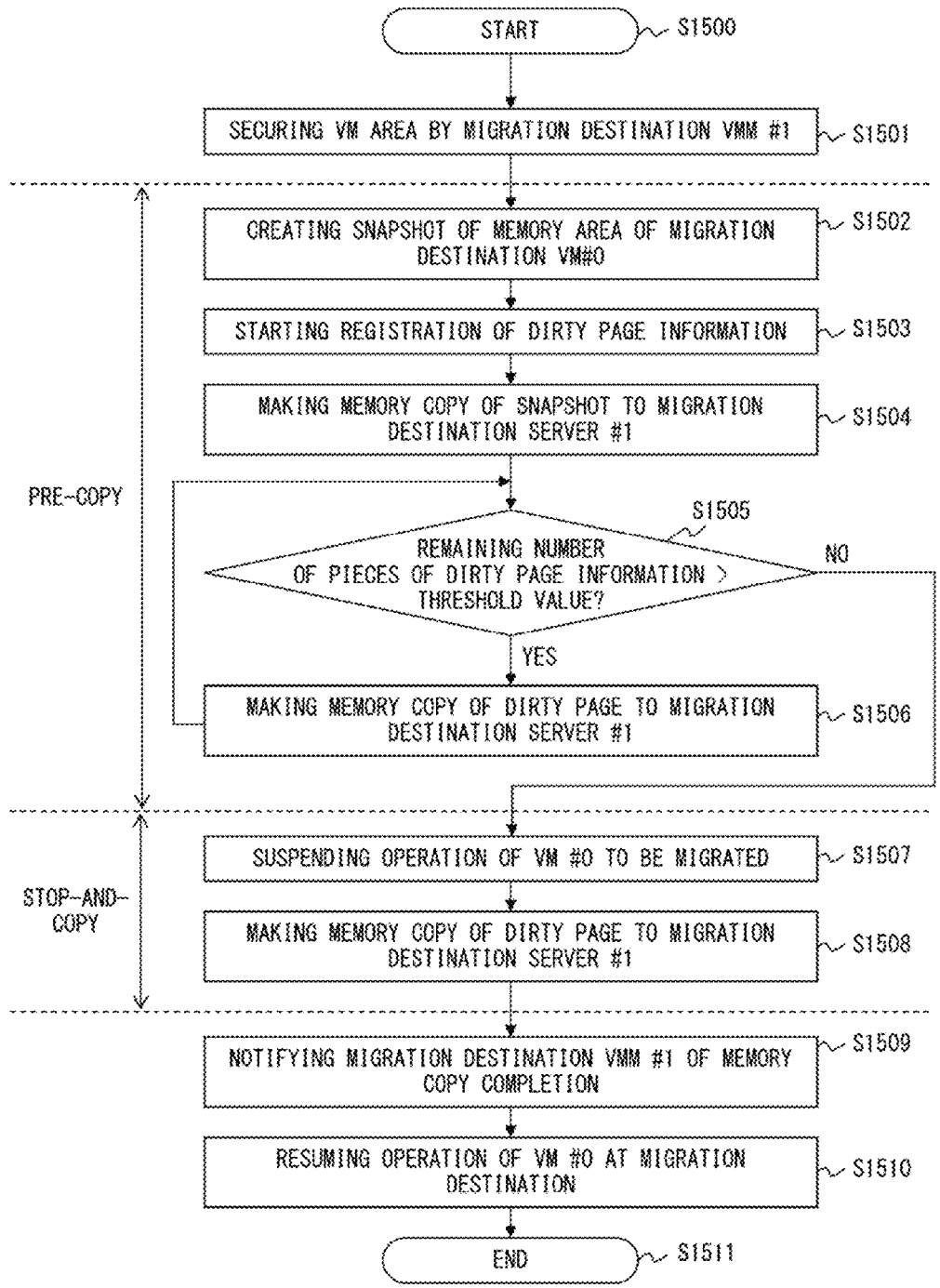
FIG. 15 is a flowchart illustrating the outline of the live migration according to the embodiment.

FIG. 15 is a flowchart illustrating an outline of the live migration according to the embodiment.

In step S1501, the VMM #0 requests the VMM #1, which is a migration destination of the VM #0, to secure a memory allocated to a new VM. A memory area allocated to a VM is hereinafter referred to as a VM area.

In the meantime, upon receipt of the request to secure a VM area from the VMM #0, the VMM #1 secures a VM area in a predetermined area of the memory included in the server #1. Then, the server #1 notifies the server #0 that the VM area has been secured.

Upon receipt of the notification that the VM. area has been secured from the server #1, the flow goes to step S1502.

In step S1502, the VMM #0 obtains data stored in an area of the host physical memory allocated to the VM #0 to be migrated at a certain point in time. The data stored in the area of the host physical memory allocated to the VM at the certain point in time (checkpoint) is referred to as a snapshot.

In step S1503, the VMM #0 sets the start bit of the control register 813 within the dirty page managing unit 651 to "1", and starts to register dirty page information.

In step S1504, the VMM #0 makes a memory copy of the snapshot obtained in step S1502 to the VM area that is the predetermined area of the memory included in the server #1 at the migration destination of the VM #0, and is secured in step S1501.

In step S1505, the VMM #0 obtains the remaining number of pieces of dirty page information from the dirty page managing unit 651 through a valid data count of the status register 811 of the control I/F unit 810. Then, the VMM #0 makes a comparison between the remaining number of pieces of dirty page information and a predetermined threshold value.

If the number of pieces of remaining dirty page information is larger than the threshold value ("YES" in step S1505), the flow goes to step S1506. Alternatively, if the remaining number of pieces of dirty page information is equal to or smaller than the threshold value ("NO" in step S1505), the flow goes to step S1507.

In step S1506, the VMM #0 obtains, from the dirty page managing unit 651, all the pieces of dirty page information registered so far to the dirty page storing unit 652 via the data register 812 of the control I/F unit 810.

Then, the VMM #0 translates each GPA page included in the obtained dirty page information into an HPA.

Then, the VMM #0 obtains data stored at the translated HPA from the memory included in the server #0. The VMM #0 makes a memory copy of the obtained data to the VM area that is an area of the memory included in the server #1 at the migration destination of the VM #0 and is secured in step S1501.

After the memory copy is made, the flow goes to step S1505.

The above described processes in steps S1502 to S1506 are the pre-copying. The pre-copying is made while the VM #0 is operating. Accordingly, the VMM #0 also executes a read/write process from/to the storage #0 via the IOMMU 631 during the pre-copying. Therefore, the following stop-and-copy is needed.

In step S1507, the VMM #0 stops the operation of the VM #0.

In step S1508, the VMM #0 executes a process similar to step S1506.

The above described processes in steps S1507 to S1508 are the stop-and-copy.

In step S1509, the VMM #0 notifies the VMM #1 that is operating in the server #1 at the migration destination of the VM #0 of the memory copy completion.

In step S1510, upon receipt of the memory copy completion notification from the VMM #0, the VMM #1 causes the VM#0 to start the operation in the VMM #1. When the VM #0 resumes the operation in the VMM #1, the flow goes to step S1511. Then, the VMMs #0 and #1 terminate the live migration.

FIG. 16 is a flowchart illustrating a process of the pre-copying.

In step S1601, the VMM #0 initializes the FIFOs #0 and #1 by setting, to "1", the clear bit of the control register 813 included in the control I/F unit 810.

Additionally, the VMM #0 sets the FIFO #0 as a FIFO to which dirty page information is registered by setting, to "0", the write select bit of the control register 813. Similarly, the VMM #0 sets the FIFO #0 as a FIFO from which the dirty page information is read by setting, to "0", the read select bit of the control register 813.

In step S1602, the VMM #0 starts to register the dirty page information by setting, to "1", the start bit of the control register 813 included in the dirty page managing unit 651.

In step S1603, the VMM #0 makes a memory copy. In this step 1603, the memory copy process described in steps S1502 to S1504 illustrated in FIG. 15 is executed.

In step S1604, the VMM #0 makes a transition to a wait state for a predetermined duration. After the predetermined duration elapses, the flow goes to step S1605.

In step S1605, the VMM #0 changes the FIFO to which the dirty page information is recorded by setting, to "0" or "1", the write select bit of the control register 813 included in the control I/F unit 810.

For example, if the FIFO currently being selected is the FIFO #0, the VMM #0 changes the FIFO to which the dirty page information is recorded to the FIFO #1 by setting, to "1", the write select bit of the control register 813.

Similarly, if the FIFO currently being selected is the FIFO #1, the VMM #0 changes the FIFO to which the dirty page information is recorded to the FIFO #0 by setting, to "0", the write select bit of the control register 813.

In step S1606, the VMM #0 reads the status register 811 included in the control I/F unit 810.

In step S1607, the VMM #0 determines whether or not the overflow information bit of the FIFO currently being selected is set to "1".

If the overflow information bit of the FIFO currently being selected is set to "1" ("YES" in step S1607), the flow goes to step S1608. In this case, the VMM #0 aborts or restarts the live migration being executed.

If the overflow information bit of the FIFO currently being selected is set to "0" in step S1607 ("NO" in step S1607), the flow goes to step S1609.

In step S1609, the VMM #0 reads the data register 812 by a number set in the valid data count of the status register 811 to obtain dirty page information.

In step S1610, the VMM #0 extracts only dirty page information in which an SID indicates the storage #0 from among the dirty page information read in step S1609. The dirty page information extracted with the process of step S1610 or S1707 to be described later is referred to as "dirty page information to be copied".

In step S1611, the VMM #0 translates each GPA page included in the dirty page information to be copied into an HPA according to the page table 730. This translated HPA also indicates a page. The unit of a page is the same as that of a GPA page.

As will be described later with reference to FIG. 23, when implementing the packet detecting unit 820 using the condition 3, the dirty page information includes a count value. In this case, assuming that the GPA page included in the dirty page information to be copied is X, the VMM #0 translates each of the GPA pages from X to X+count value into an HPA. For example, if the GPA page included in the dirty page information to be copied is 0x100 and the count value is 2, the VMM #0 translates each of the GPA pages 0x100, 0x101 and 0x102 into an HPA.

As will be described later with reference to FIG. 27, when implementing the packet detecting unit 820 using the condition 5, the dirty page information includes an expansion size. In this case, the VMM. #0 translates the GPA page included in the dirty page information to be copied into a page unit indicated by the expansion size. Then, the VMM #0 further translates the translated value into an HPA. For example, if the expansion size of the GPA page included in the dirty page information to be copied is 8 KB, the VMM #0 translates a value obtained by masking a low-order 0 to 12 bits of the GPA page into an HPA.

In step S1612, the VMM #0 obtains, from the memory 620 included in the server #0, data stored in the range of pages indicated by the HPA translated in step S1611. Then, the VMM #0 transfers the obtained data to the VMM #1, which is a migration destination of the VM #0.

In the meantime, upon receipt of the data from the VMM #0, the VMM #1 stores the received data in the VM area secured with the process of step S1501 illustrated in FIG. 15.

In step S1613, the VMM #0 changes the FIFO from which the dirty page information is read by setting, to "0" or "1", the read select bit of the control register 813 included in the control I/F unit 810.

For example, if the FIFO currently being selected is the FIFO #0, the VMM #0 changes the FIFO from which the dirty page information is read to the FIFO #1 by setting, to "1", the read select bit of the control register 813.

Similarly, if the FIFO currently being selected is the FIFO #1, the VMM #0 changes the FIFO from which the dirty page information is read to the FIFO #0 by setting, to "0", the read select bit of the control register 813.

In step S1614, the VMM #0 determines whether or not a pre-copying completion condition is satisfied. In the process of step S1614, the process of step S1505 illustrated in FIG. 15 is executed.

If the VMM #0 determines that the pre-copying completion condition is satisfied ("YES" in step S1614), the flow goes to step S1615. In this case, the VMM #0 terminates the pre-copying.

Alternatively, if the VMM #0 determines that the pre-copying completion condition is not satisfied ("NO" instep S1614), the flow goes to step S1604.

FIG. 17 is a flowchart illustrating a process of the stop-and-copy.

Upon completion of the pre-copying illustrated in FIG. 16, the VMM #0 starts the stop-and-copy process. After the operation of the VM #0 is stopped, the flow goes to step S1701 (step S1700).

In step S1701, the VMM #0 makes a transition to the wait state for a predetermined duration to wait for the complete stop of the DMA write process. After the predetermined duration elapses, the flow goes to step S1702.

In step S1702, the VMM #0 changes the FIFO to which the dirty page information is recorded by setting, to "0" or "1", the write select bit of the control register 813 included in the control I/F unit 810.

For example, if the FIFO currently being selected is the FIFO #0, the VMM #0 changes the FIFO to which the dirty page information is recorded to the FIFO #1 by setting, to "1", the write select bit of the control register 813.

Similarly, if the FIFO currently being selected is the FIFO #1, the VMM #0 changes the FIFO to which the dirty page information is recorded to the FIFO #0 by setting, to "0", the write select bit of the control register 813.

In step S1703, the VMM #0 reads the status register 811 included in the control I/F unit 810. Then, the VMM #0 determines whether or not the overflow information bit of the FIFO currently being selected is set to "1".

If the overflow information bit of the FIFO currently being selected is set to "1" instep S1704 ("YES" in step S1704), the flow goes to step S1705. In this case, the VMM #0 aborts or restarts the live migration.

If the overflow information bit of the FIFO currently being selected is set to "0" in step S1704 ("NO" in step S1704), the flow goes to step S1706.

In step S1706, the VMM #0 reads the data register 812 by a number set in the valid data count of the status register 811 to obtain dirty page information.

In step S1707, the VMM #0 extracts dirty page information to be copied including an SID that indicates the storage #0 from among the dirty page information read in step S1706.

In step S1708, the VMM #0 translates a GPA page included in the dirty page information to be copied into an HPA according to the page table 730, similarly to step S1611. Also the translated HPA indicates a page. The unit of a page is the same as that of a GPA page.

In step S1709, the VMM #0 determines whether or not there is data page information in the FIFO based on the valid data count bit of the status register 811 included in the control I/F unit 810.

If the valid data count of the status register 811 is "0" ("YES" in step S1709), the VMM #0 determines that the FIFO is empty. Then, the flow goes to step S1710.

In step S1710, the VMM #0 obtains data stored in the range of pages indicated by the HPA translated in step S1708 from the memory 620 included in the server #0. Then, the VMM #0 transfers the obtained data to the VMM #1 that is the migration destination of the VM #0.

In the meantime, upon receipt of the data from the VMM #0, the VMM #1 stores the received data in the VM area secured with the process of step S1501 illustrated in FIG. 15.

Upon completion of the data transfer to the VMM #1, the flow goes to step S1711. Then, the VMM #0 terminates the stop-and-copy (step S1711).

If the valid data count of the status register 811 is not "0" in step S1709 ("NO" in step S1709), the VMM #0 determines that the FIFO is not empty. Then, the flow goes to step S1712.

In step S1712, the VMM #0 changes the FIFO from which the dirty page information is read by setting, to "0" or "1", the read select bit of the control register 813 included in the control I/F unit 810.

For example, if the FIFO currently being selected is the FIFO #0, the VMM #0 changes the FIFO from which the dirty page information is read to the FIFO #1 by setting, to "1", the read select bit of the control register 813.

Similarly, if the FIFO currently being selected is the FIFO #1, the VMM #0 changes the FIFO from which the dirty page information is read to the FIFO #0 by setting, to "0", the read select bit of the control register 813.

After the FIFO from which the dirty page information is read is changed, the flow goes to step S1701.

(example of the packet detecting unit 820)

Figure 18:
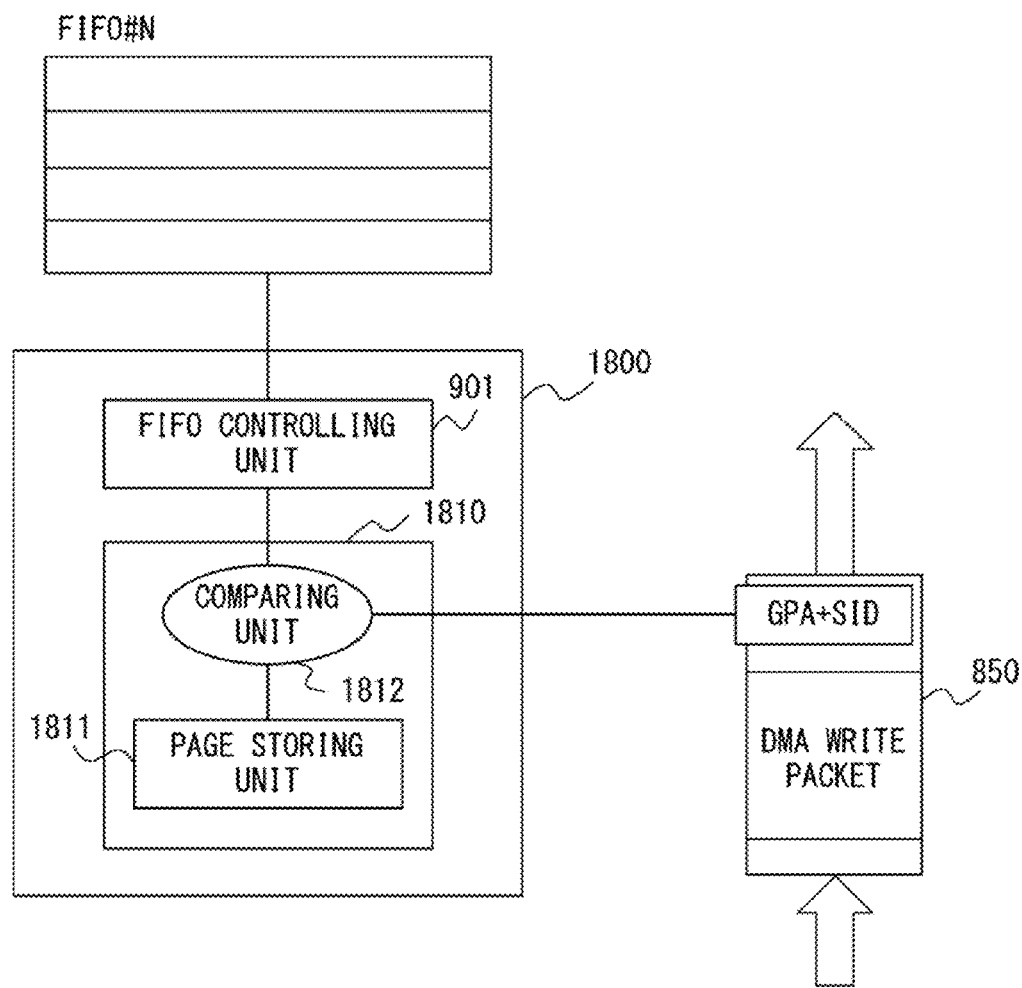
FIG. 18 illustrates an example of the packet detecting unit using a condition 1.

FIG. 18 illustrates a example of the packet detecting unit 820 using the condition 1. The packet detecting unit 820 using the condition 1 is hereinafter referred to as a packet detecting unit 1800.

The packet detecting unit 1800 includes the FIFO controlling unit 901 and a determining unit 1810.

The determining unit 1810 includes a page storing unit 1811 and a comparing unit 1812.

The page storing unit 1811 is a register for storing a GPA page obtained from the header of a DMA write packet 850. The comparing unit 1812 makes a comparison between a GPA page obtained from the header of the DMA write packet 850 and a GPA page stored in the page storing unit 1811.

If the GPA page obtained from the header of the DMA write packet 850 and a GPA page stored in the page storing unit 1811 do not match, the comparing unit 1812 determines that dirty page information needs to be registered to the FIFO. In this case, the comparing unit 1812 notifies the FIFO controlling unit 901 that the dirty page information needs to be registered to the FIFO. Then, the comparing unit 1812 stores the GPA page obtained from the header of the DMA write packet 850 in the page storing unit 1811.

If the GPA page obtained from the header of the DMA write packet 850 and the GPA page stored in the page storing unit 1811 match, the comparing unit 1812 determines that the dirty page information does not need to be registered to the FIFO. In this case, the comparing unit 1812 notifies the FIFO controlling unit 901 that the dirty page information does not need to be registered to the FIFO.

Figure 19:
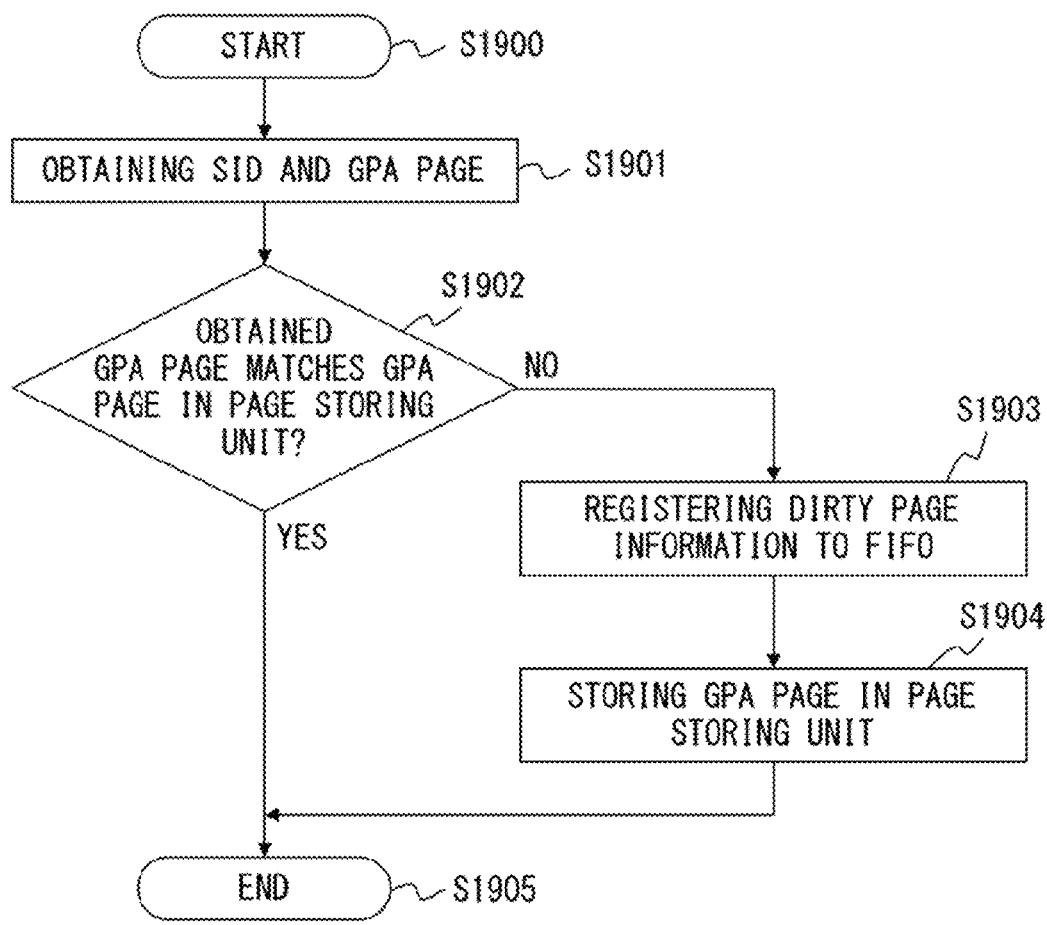
FIG. 19 is a flowchart illustrating a process executed by the packet detecting unit illustrated in FIG. 18.

FIG. 19 is a flowchart illustrating a process of the packet detecting unit 1800. The process illustrated in FIG. 19 corresponds to steps S1204 to S1206 illustrated in FIG. 12.

When the flow goes to step S1204 illustrated in FIG. 12, the packet detecting unit 1800 starts the following process (step S1900).

In step S1901, the packet detecting unit 1800 obtains an SID and a GPA from the header of the DMA write packet 850. Then, the packet detecting unit 1800 obtains a GPA page from the GPA.

In step S1902, the packet detecting unit 1800 makes a comparison between the GPA page obtained in step S1901 and a GPA page stored in the page storing unit 1811.

If the GPA page obtained in step S1901 and the GPA page stored in the page storing unit 1811 match ("YES" in step S1902), the flow goes to step S1905 without registering dirty page information to the FIFO by the packet detecting unit 1800.

Alternatively, if the GPA page obtained in step S1901 and the GPA page stored in the page storing unit 1811 do not match ("NO" in step S1902), the flow goes to step S1903. In this case, the packet detecting unit 1800 registers the dirty page information including the SID and the GPA page, which are obtained in step S1901, to the FIFO (step S1903).

In step S1904, the packet detecting unit 1800 stores the GPA page obtained in step S1901 in the page storing unit 1811. Then, the flow goes to step S1905.

Upon termination of the above described process, the packet detecting unit 1800 starts the process at step S1207 illustrated in FIG. 12.

(another example of the packet detecting unit 820)

FIG. 20 illustrates a example of the packet detecting unit 820 using the condition 2. The packet detecting unit 820 using the condition 2 is hereinafter referred to as a packet detecting unit 2000.

The packet detecting unit 2000 includes the FIFO controlling unit 901 and a determining unit 2010.

The determining unit 2010 includes an SID storing unit 2011 and a comparing unit 2012.

The SID storing unit 2011 is a register for storing an SID of a unit to be live-migrated.

When a predetermined value is input to the control register 813 of the control I/F unit 810, the FIFO controlling unit 901 stores an SID stored in the data register 812 in the SID storing unit 2011. In this way, the SID may be prestored in the SID storing unit 2011.

The comparing unit 2012 makes a comparison between an SID obtained from the header of the DMA write packet 850 and the SID stored in the SID storing unit 2011.

If the SID obtained from the header of the DMA write packet 850 and the SID stored in the SID storing unit 2011 do not match, the comparing unit 2012 determines that dirty page information needs to be registered to the FIFO. In this case, the comparing unit 2012 notifies the FIFO controlling unit 901 that the dirty page information needs to be registered. Then, the comparing unit 2012 stores the SID obtained from the header of the DMA write packet 850 in the SID storing unit 2011.

Alternatively, if the SID obtained from the header of the DMA write packet 850 and the SID stored in the SID storing unit 2011 match, the comparing unit 2012 determines that the dirty page information does not need to be registered to the FIFO. In this case, the comparing unit 2012 notifies the FIFO controlling unit 901 that the dirty page information does not need to be registered to the FIFO.

Figure 21:
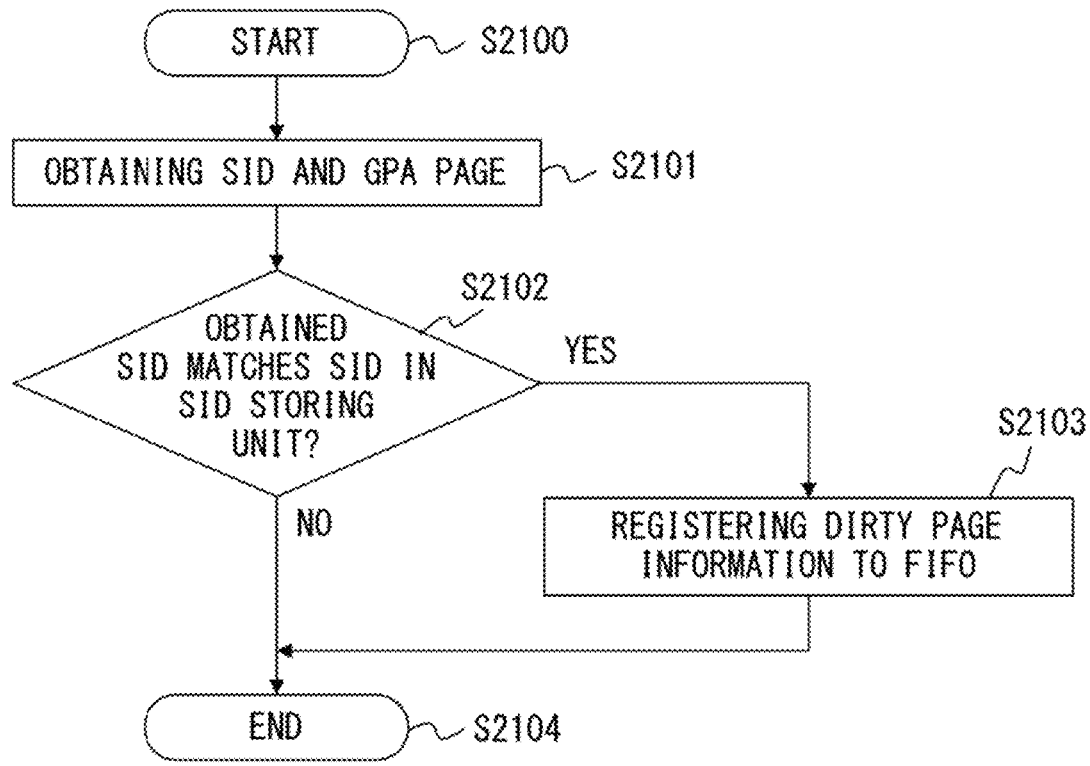
FIG. 21 is a flowchart illustrating a process executed by the packet detecting unit illustrated in FIG. 20.

FIG. 21 is a flowchart illustrating a process of the packet detecting unit 2000. The process illustrated in FIG. 21 corresponds to steps S1204 to S1206 illustrated in FIG. 12.

When the flow goes to step S1204 illustrated in FIG. 12, the packet detecting unit 2000 starts the following process (step S2100).

In step S2101, the packet detecting unit 2000 obtains an SID and a GPA from the header of the DMA write packet. Moreover, the packet detecting unit 2000 obtains a GPA page from the GPA.

In step S2102, the packet detecting unit 2000 makes a comparison between the SID obtained in step S2101 and an SID stored in the SID storing unit 2011.

If the SID obtained in step S2101 and the SID stored in the SID storing unit 2011 do not match ("NO" in step S2102), the flow goes to step S2104 without registering dirty page information to the FIFO by the packet detecting unit 2000.

Alternatively, if the SID obtained in step S2101 and the SID stored in the SID storing unit 2011 match ("YES" instep S2101), the flow goes to step S2103. In this case, the packet detecting unit 2000 registers the dirty page information including the SID and the GPA page which are obtained in step S2101 to the FIFO (step S2103) . Then, the flow goes to step S2104.

Upon termination of the above described process, the packet detecting unit 2000 starts the process at step S1207 illustrated in FIG. 12.

Figure 22:
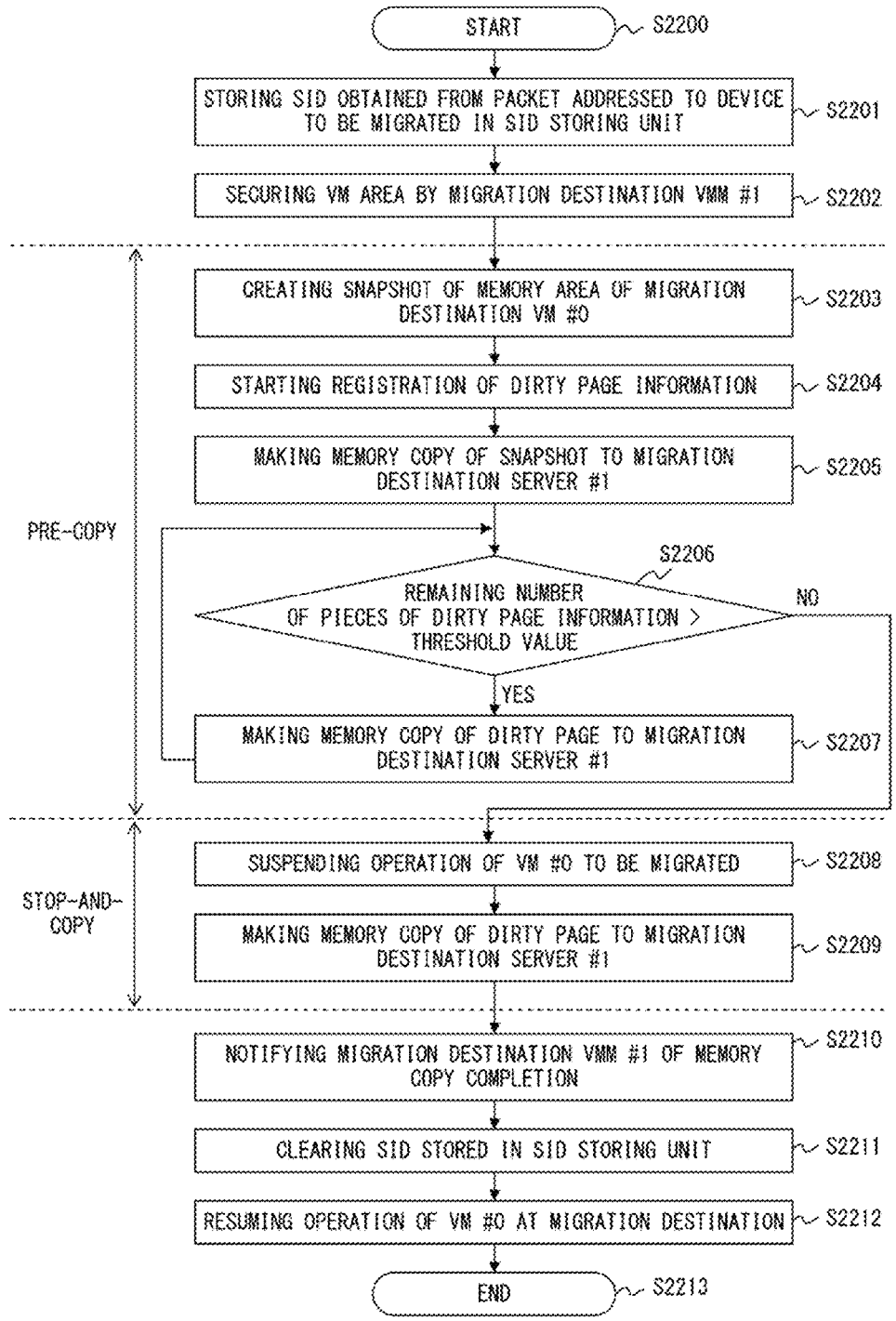
FIG. 22 is a flowchart illustrating a process for setting an SID in an SID storing unit at the time of the live migration.

FIG. 22 is a flowchart illustrating a process for setting an SID in the SID storing unit 2011 at the time of live migration. Steps S2202 to S2210 illustrated in FIG. 22 are similar to steps S1501 to S1509 illustrated in FIG. 15. Therefore, their descriptions are omitted.

In step S2201, upon receipt of an instruction for live migration, the VMM #0 stores an SID of a device connected to the VM #0 to be live-migrated, namely, an SID of a device to be migrated in the SID storing unit 2011.

The VMM #0 stores the SID of the device to be migrated in the SID storing unit 2011 as follows, for example.

Initially, the VMM #0 sets the SID in the data register 812 of the control I/F unit 810. Then, the VMM #0 inputs a predetermined value to the control register 813. Then, the FIFO controlling unit 901 stores the SID stored in the data register 812 in the SID storing unit 2011.

Upon completion of the processes in steps S2201 to S2210, the VMM #0 clears the SID stored in the SID storing unit 2011 with the process of step S2201. In this case, for example, the VMM #0 inputs a predetermined value to the control register 813, so that the FIFO controlling unit 901 may clear the SID stored in the data register 812.

In step S2212, the VMM #1 causes the VM #0 to start the operation in the VMM #1 upon receipt of a memory copy completion notification from the VMM #0. When the VM #0 resumes the operation in the VMM #1, the flow goes to step S2213. Then, the VMs #0 and #1 terminate the live migration.

(another example of the packet detecting unit 820)

FIG. 23 illustrates a example of the packet detecting unit 820 using the condition 3. The packet detecting unit 820 using the condition 3 is hereinafter referred to as a packet detecting unit 2300.

To implement the packet detecting unit 2300, dirty page information including an SID, a GPA page, and a count value needs to be used as dirty page information registered to a FIFO. The count value is a value that indicates the number of GPA pages sequentially accessed starting at the GPA page included in the dirty page information. By using the count value, sequential accesses made over a plurality of pages may be stored in the FIFO as one entry.

The packet detecting unit 2300 includes a FIFO controlling unit 2301 and a determining unit 2320.

The FIFO controlling unit 2310 updates the count value included in dirty page information most recently registered to the FIFO to a value obtained by incrementing the count value by 1 according to an instruction of the determining unit 2310, in addition to the function described with reference to FIG. 9.

The determining unit 2320 includes a page storing unit 2321, a comparing unit 2322, and a comparing unit 2323.

The page storing unit 2321 is a register for storing a GPA page obtained from the header of the DMA write packet 850.

The comparing unit 2322 makes a comparison between the GPA page obtained from the header of the DMA write packet 850 and a GPA page stored in the page storing unit 2321.

If the GPA page obtained from the header of the DMA write packet 850 and the GPA page stored in the page storing unit 2321 match, the comparing unit 2322 determines that the dirty page information does not need to be registered to the FIFO. In this case, the comparing unit 2322 notifies the FIFO controlling unit 2310 that the dirty page information does not need to be registered to the FIFO.

Alternatively, if the GPA page obtained from the header of the DMA write packet 850 and the GPA page stored in the page storing unit 2321 do not match, the comparing unit 2322 notifies the comparing unit 2323 that the GPA pages do not match.

The comparing unit 2323 makes a comparison between the GPA page obtained from the header of the DMA write packet 850 and a value obtained by incrementing the GPA page stored in the page storing unit 2321 by 1.

If the GPA page obtained from the header of the DMA write packet 850 and the value obtained by incrementing the GPA page stored in the page storing unit 2321 by 1 match, the comparing unit 2323 determines that the dirty page information registered to the FIFO needs to be updated. The update in this case is an incrementing by 1 of the count value included in the dirty page information most recently registered to the FIFO.

The comparing unit 2323 instructs the FIFO controlling unit 2310 to update the dirty page information registered to the FIFO. Then, the comparing unit 2323 stores the GPA page obtained from the header of the DMA write packet 850 in the page storing unit 2321.

Alternatively, if the GPA page obtained from the header of the DMA write packet 850 and the value obtained by incrementing the GPA page stored in the page storing unit 2321 by 1 do not match, the comparing unit 2323 determines that the dirty page information needs to be registered to the FIFO. However, this determination is made only if a notification that the GPA page obtained from the header of the DMA write packet 850 and the GPA page stored in the page storing unit 2321 do not match is made from the comparing unit 2322. In this case, the comparing unit 2323 notifies the FIFO controlling unit 2310 that the dirty page information needs to be registered to the FIFO. Moreover, the comparing unit 2323 stores the GPA page obtained from the header of the DMA write packet 850 in the page storing unit 2321.

Figure 24:
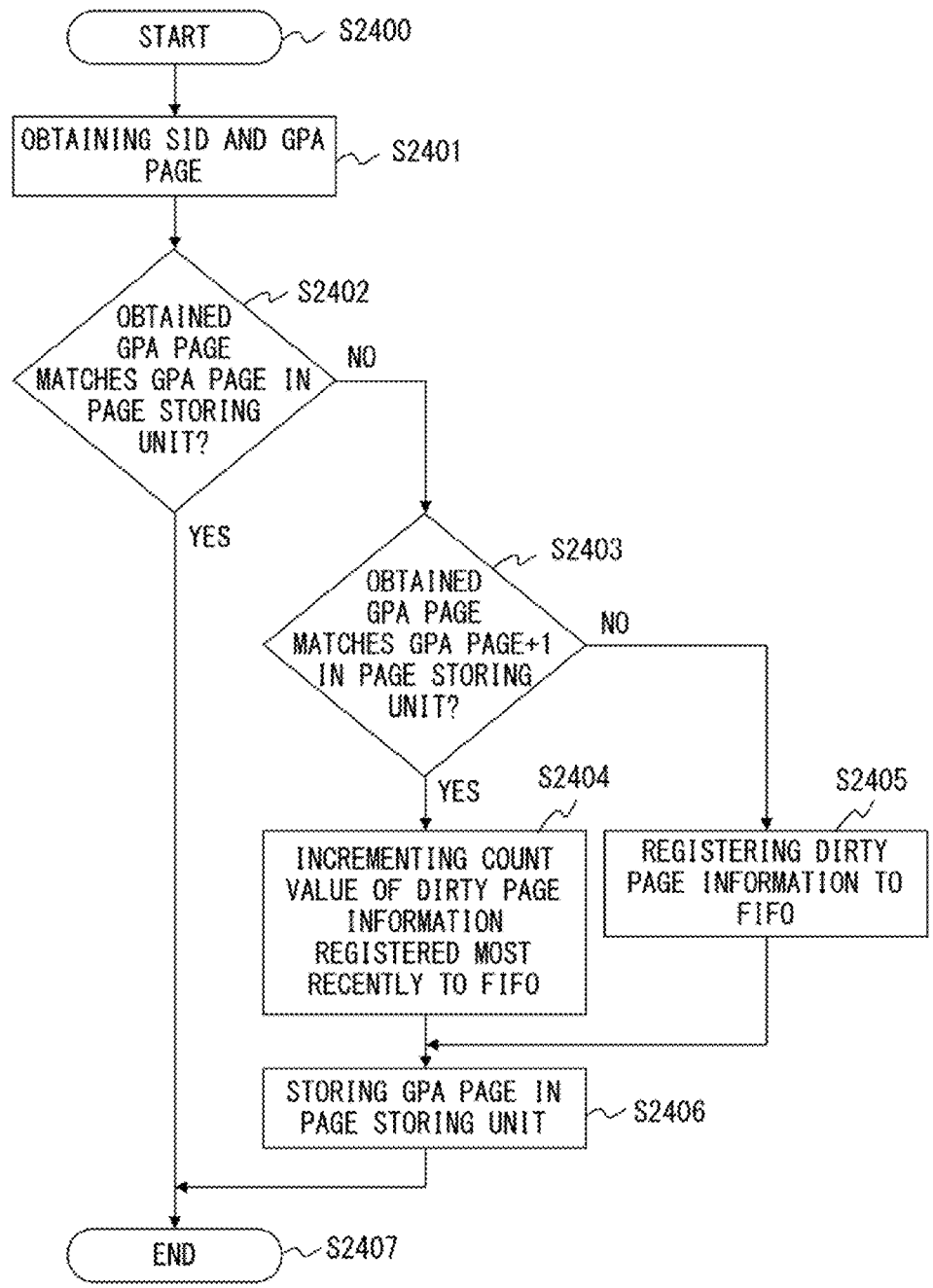
FIG. 24 is a flowchart illustrating a process executed by the packet detecting unit illustrated in FIG. 23.

FIG. 24 is a flowchart illustrating a process of the packet detecting unit 2300. The process illustrated in FIG. 24 corresponds to steps S1204 to S1206 illustrated in FIG. 12.

When the flow goes to step S1204 illustrated in FIG. 12, the packet detecting unit 2300 starts the following process (step S2400).

In step S2401, the packet detecting unit 2300 obtains an SID and a GPA from the header of the DMA write packet 850. Then, the packet detecting unit 2300 obtains a GPA page from the GPA.

In step S2402, the packet detecting unit 2300 makes a comparison between the GPA page obtained in step S2401 and a GPA page stored in the page storing unit 2321.

If the GPA page obtained in step S2401 and the GPA page stored in the page storing unit 2321 match ("YES" in step S2402), the flow goes to step S2407 without registering of dirty page information to the FIFO by the packet detecting unit 2300.

Alternatively, if the GPA page obtained in step S2401 and the GPA page stored in the page storing unit 2321 do not match ("NO" in step S2402), the flow goes to step S2403. In this case, the packet detecting unit 2300 makes a comparison between the GPA page obtained in step S2401 and a value obtained by incrementing the GPA page stored in the page storing unit 2321 by 1.

If the GPA page obtained in step S2401 and the value obtained by incrementing by 1 the GPA page stored in the page storing unit 2321 match ("YES" in step S2403), the flow goes to step S2404. In this case, the packet detecting unit 2300 increments by 1 the count value included in the dirty page information registered most recently to the FIFO (step S2404). Then, the flow goes to step S2406.

Alternatively, if the GPA page obtained in step S2401 and the value obtained by incrementing the GPA page stored in the page storing unit 2321 by 1 do not match ("NO" in step S2403), the flow goes to step S2405. In this case, the packet detecting unit 2300 registers, to the FIFO, the dirty page information including the SID and the GPA page, which are obtained in step S2401, and the count value initialized to 0 (step S2405). Then, the flow goes to step S2406.

In step S2406, the packet detecting unit 2300 stores the GPA page obtained in step S2401 in the page storing unit 2321. Then, the flow goes to step S2407.

Upon termination of the above described process, the packet detecting unit 2300 starts the process at step S1207 illustrated in FIG. 12.

(another example of the packet detecting unit 820)

Figure 25:
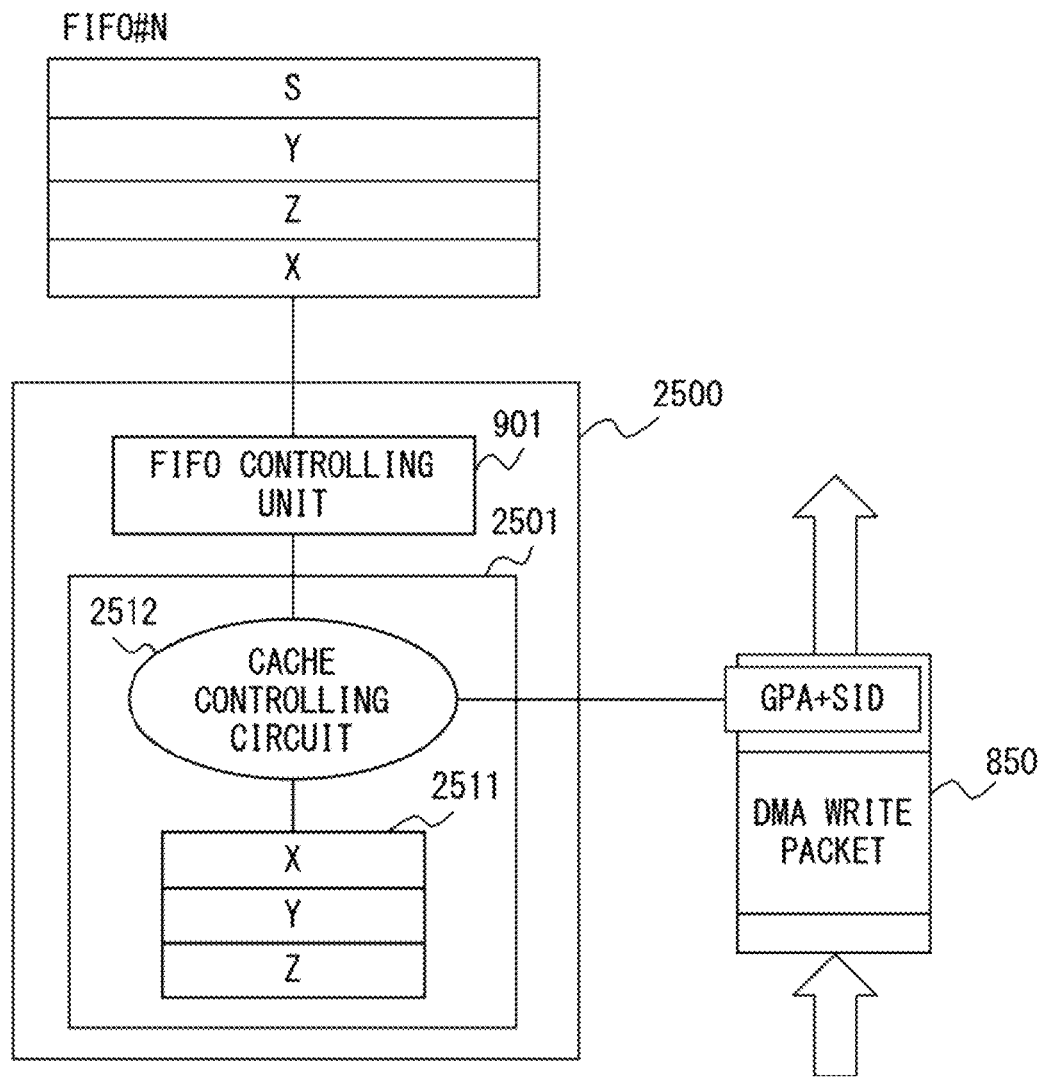
FIG. 25 illustrates an example of the packet detecting unit using a condition 4.

FIG. 25 illustrates a example of the packet detecting unit 820 using the condition 4. The packet detecting unit 820 using the condition 4 is hereinafter referred to as a packet detecting unit 2500. FIG. 25 only illustrates a GPA page in the FIFO #N for convenience of explanation. However, the configuration of the FIFO #N is not limited to that illustrated in FIG. 25.

The packet detecting unit 2500 includes the FIFO controlling unit 901 and a determining unit 2510.

The determining unit 2510 includes a cache memory 2511 and a cache controlling circuit 2512.

The cache memory 2511 is a cache memory for storing a GPA page obtained from the header of the DMA write packet 850. In the cache memory 2511, a plurality of GPA pages maybe stored. A cache memory for storing three GPA pages X, Y and Z is illustrated as the cache memory 2511 of FIG. 25. However, the configuration of the cache memory 2511 is not limited to that illustrated in FIG. 25.

The cache controlling circuit 2512 references the cache memory 2511, and searches for a GPA page that matches the GPA page obtained from the header of the DMA write packet 850.

Upon detection of a GPA page that matches the GPA page obtained from the header of the DMA write packet 850, the cache controlling circuit 2512 determines that dirty page information does not need to be registered to the FIFO. In this case, the cache controlling circuit 2512 notifies the FIFO controlling unit 901 that the dirty page information does not need to be registered to the FIFO.

If the GPA page that matches the GPA page obtained from the header of the DMA write packet 850 is not detected, the cache controlling circuit 2512 determines that the dirty page information needs to be registered to the FIFO. In this case, the cache controlling circuit 2512 notifies the FIFO controlling unit 901 that the dirty page information needs to be registered to the FIFO. If there is an empty entry in the cache memory 2511, the cache controlling circuit 2512 stores the GPA page obtained from the header of the DMA write packet 850 in the empty entry. Alternatively, if there is no empty entry in the cache memory 2511, the cache controlling circuit 2512 stores the GPA page obtained from the header of the DMA write packet 850 in the entry that has not been referenced for the longest duration.

Figure 26:
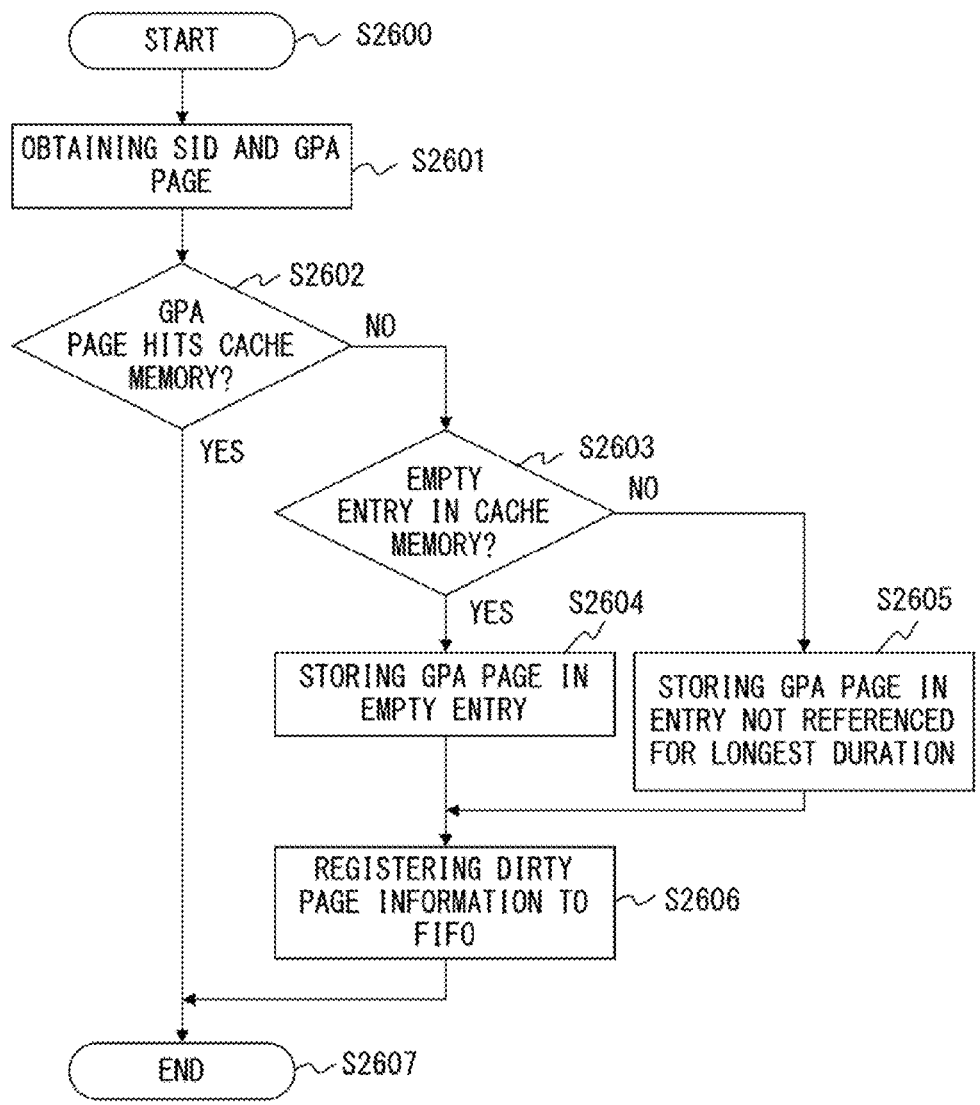
FIG. 26 is a flowchart illustrating a process executed by the packet detecting unit illustrated in FIG. 25.

FIG. 26 is a flowchart illustrating a process of the packet detecting unit 2500. The process illustrated in FIG. 26 corresponds to steps S1204 to S1206 illustrated in FIG. 12.

When the flow goes to step S1204 illustrated in FIG. 12, the packet detecting unit 2500 starts the following process (step S2600).

In step 2601, the packet detecting unit 2500 obtains an SID and a GPA from the header of the DMA write packet 850. Then, the packet detecting unit 2500 obtains a GPA page from the GPA.

In step S2602, the packet detecting unit 2500 references the cache memory 2511, and searches a GPA page that matches the GPA page obtained in step S2601.

If the GPA page that matches the GPA page obtained in step S2601 is detected ("YES" in step S2602), the flow goes to step S2607 without registering dirty page information to the FIFO by the packet detecting unit 2500.

Alternatively, if the GPA page that matches the GPA page obtained in step S2601 is not detected ("NO" in step S2602), the flow goes to step S2603. In this case, the packet detecting unit 2500 determines whether or not there is an empty entry in the cache memory 2511 (step S2603).

If there is an empty entry in the cache memory 2511 ("YES" in step S2603), the packet detecting unit 2500 stores the GPA page obtained in step S2601 in the empty entry (step S2604). Then, the flow goes to step S2606.

If there is no empty entry in the cache memory 2511 ("NO" in step S2603), the flow goes to step S2605. In this case, the packet detecting unit 2500 stores the GPA page obtained in step S2601 in the entry that has not been referenced for the longest duration from among entries included in the cache memory 2511 (step S2604). Then, the flow goes to step S2606.

In step S2606, the packet detecting unit 2500 registers the dirty page information to the FIFO. Then, the flow goes to step S2607.

Upon termination of the above described process, the packet detecting unit 2500 starts the process at step S1207 illustrated in FIG. 12.

(another example of the packet detecting unit 820)

Figure 27:
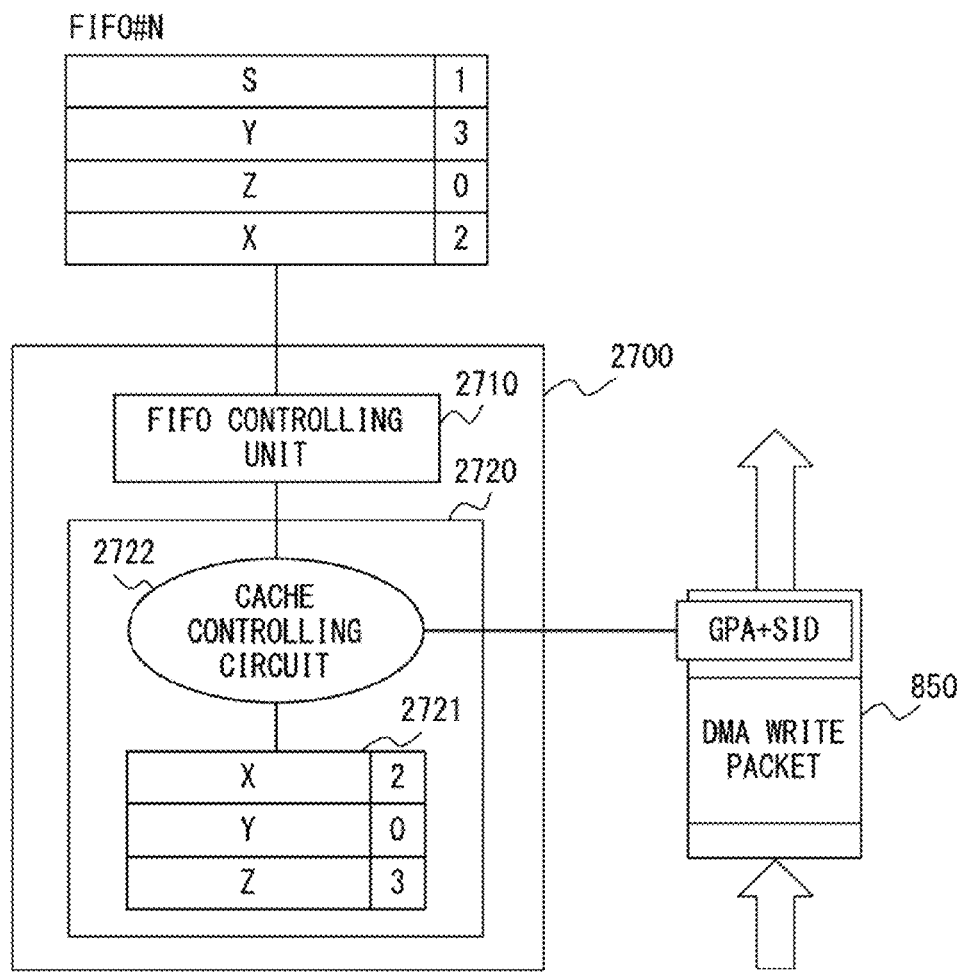
FIG. 27 illustrates an example of the packet detecting unit using a condition 5.

FIG. 27 illustrates a example of the packet detecting unit 820 using the condition 5. The packet detecting unit 820 using the condition 5 is hereinafter referred to as a packet detecting unit 2700. In FIG. 27, an SID is not illustrated in the FIFO #N for convenience of explanation. However, the configuration of the FIFO #N is not limited to that illustrated in FIG. 27.

To implement the packet detecting unit 2700, dirty page information including an SID, a GPA page, and an expansion size is used as dirty page information registered to the FIFO. The expansion size is information used to expand the page size of a GPA page included in dirty page information. By expanding the page size of a GPA page, one piece of dirty page information may include a memory area changed to a wider range. Accordingly, this is not the expansion of a page size used in a memory system such as the management of the memory 620 illustrated in FIG. 7. A numerical value such as "0", "1", "2", . . . or the like may be used to specify the expansion size. In this case, "0" indicates that the page size of a GPA page included in dirty page information is expanded to 4 KB. Similarly, "1" and "2" indicate that the page size of the GPA page included in the dirty page information is expanded to 8 KB and 16 KB, respectively.

The packet detecting unit 2700 includes a FIFO controlling unit 2710 and a determining unit 2720.

The FIFO controlling unit 2710 changes the expansion size included in the dirty page information registered to the FIFO according to an instruction of the determining unit 2720 in addition to the function described with reference to FIG. 9.

The determining unit 2720 includes a cache memory 2721 and a cache controlling circuit 2722.

The cache memory 2721 is a cache memory for storing a GPA page obtained from the header of the DMA write packet 850 along with its expansion size. In the cache memory 2721, a plurality of GPA pages may be stored. For example, a GPA page "X" is stored in the cache memory 2721 along with a setting value "2" of the expansion size in FIG. 27. This indicates that the page size of the GPA page "X" is expanded to 8 KB.

A cache memory for storing the three GPA pages such as X, Y and Z is illustrated as the cache memory 2721 illustrated in FIG. 27. However, the configuration of the cache memory 2721 is not limited to that illustrated in FIG. 27.

The cache controlling circuit 2722 references the cache memory 2721. Then, the cache controlling circuit 2722 makes a comparison between a value obtained by masking low-order n bits of the GPA page obtained from the header of the DMA write packet 850 and a value obtained by masking low-order n bits of a GPA page stored in the cache memory 2721. Then, the cache controlling circuit 2722 detects a GPA page having the value that is obtained by masking the low-order n bits of the GPA page obtained from the header of the DMA write packet 850 and matches the value obtained by masking the low-order n bits of the GPA page stored in the cache memory 2721. At this time, the cache controlling circuit 2722 determines that the GPA page obtained from the header of the DMA write packet 850 hits the cache memory 2721. By increasing n, the range of the GPA page determined to hit the cache memory 2721 grows. Note that n is an integer equal to or larger than 1. n may be decided in consideration of a relationship with the expansion size. For example, if 4 KB, 8 KB, or 16 KB is used as the expansion size, n may be set to "2" or the like.

If the GPA page obtained from the header of the DMA write packet 850 hits the cache memory 2721, the cache controlling circuit 2722 obtains a difference between the GPA page obtained from the header of the DMA write packet 850 and the GPA page that hits the cache memory 2721. If the obtained difference is equal to or larger than the expansion size of the GPA page that hits the cache memory 2721, the cache controlling circuit 2722 updates the expansion size of the GPA page that hits the cache memory 2721 to a larger page size. Similarly, the cache controlling circuit 2722 also updates the expansion size of the dirty page information that is stored in the FIFO and includes the GPA page that hits the cache memory 2721.

Alternatively, if the GPA page obtained from the header of the DMA write packet 850 miss-hits the cache memory 2721, the cache controlling circuit 2722 stores the GPA page obtained from the header of the DMA write packet 850 in the cache memory 2721. At this time, the cache controlling circuit 2722 associates the GPA page obtained from the header of the DMA write packet 850 with the expansion size, and stores them. Since 4 KB is used as an initial value of the expansion size in the embodiment, the value of the expansion size is set to "0".

Figure 28:
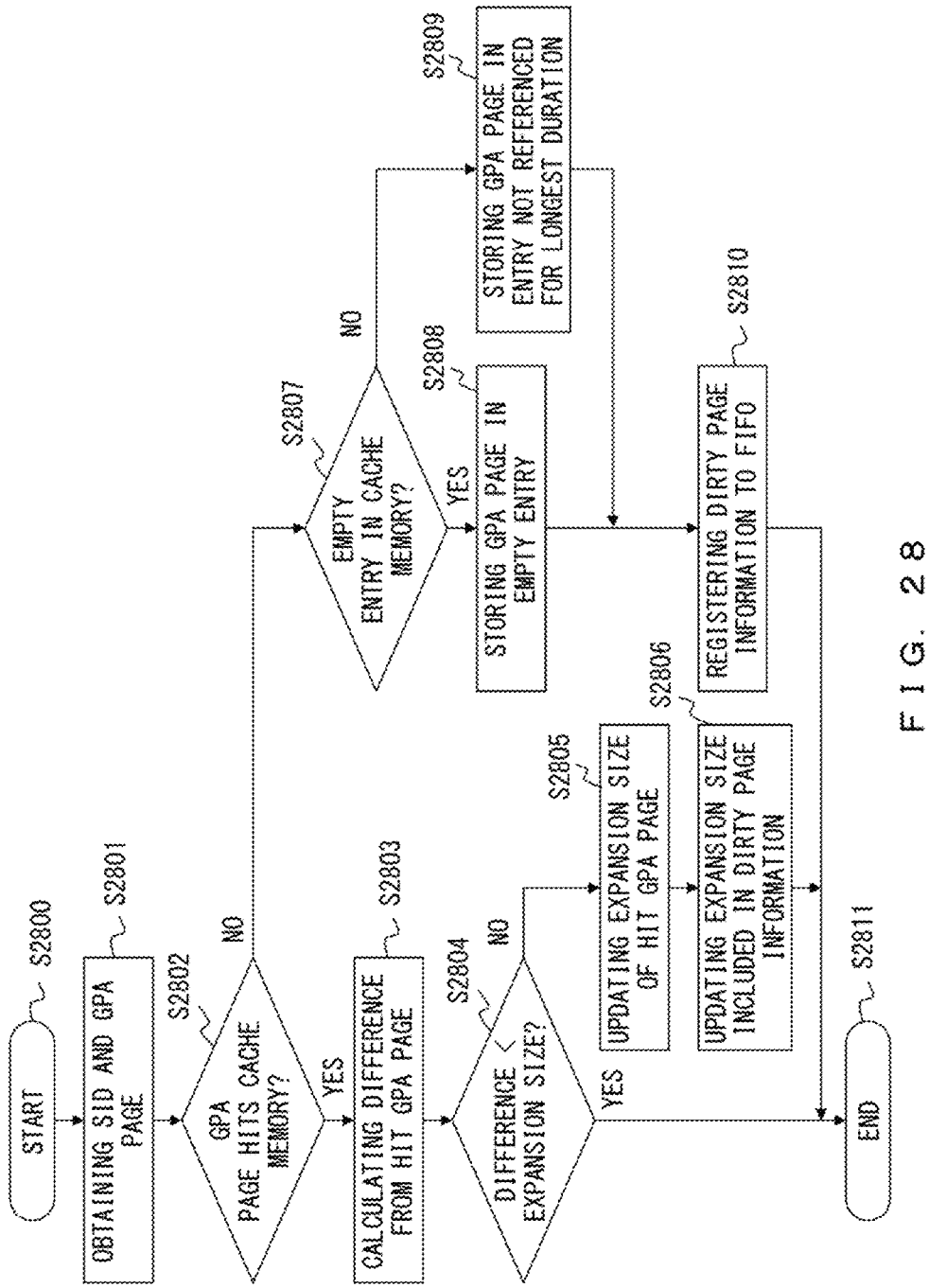
FIG. 28 is a flowchart illustrating a process executed by the packet detecting unit illustrated in FIG. 27.

FIG. 28 is a flowchart illustrating a process of the packet detecting unit 2700. The process illustrated in FIG. 28 corresponds to steps S1204 to S1206 illustrated in FIG. 12.

When the flow goes to step S1204 illustrated in FIG. 12, the packet detecting unit 2700 starts the following process (step S2800).

In step S2801, the packet detecting unit 2700 obtains an SID and a GPA from the header of the DMA write packet 850. Then, the packet detecting unit 2700 obtains a GPA page from the GPA.

In step S2802, the packet detecting unit 2700 makes a comparison between a value obtained by masking low-order n bits of the GPA page obtained in step S2801 and a value obtained by masking low-order n bits of a GPA page stored in the cache memory 2721. Then, the packet detecting unit 2700 detects a GPA page having the value that is obtained by masking the low-order n bits of the GPA page obtained in step S2801 and matches the value obtained by masking the low-order n bits of the GPA page stored in the cache memory 2721. At this time, the packet detecting unit 2700 determines that the GPA page obtained in step S2801 has hit the cache memory 2721.

If the GPA page obtained in step S2801 hits the cache memory 2721 ("YES" in step S2802), the flow goes to step S2803. In this case, the packet detecting unit 2700 calculates a difference between the GPA page obtained in step S2801 and the GPA page that hits the cache memory 2721 (step S2803).

If the difference between the GPA page obtained in step S2801 and the GPA page that hits the cache memory 2721 is smaller than the expansion size of the GPA page that hits the cache memory 2721 ("YES" in step S2804), the flow goes to step S2811.

If the difference between the GPA page obtained in step S2801 and the GPA page that hits the cache memory 2721 is equal to or larger than the expansion size of the GPA page that hits the cache memory 2721 ("NO" in step S2804), the flow goes to step S2805. In this case, the packet detecting unit 2700 updates the expansion size that is associated with the hit GPA page and is stored in the cache memory 2721 to an expansion size larger than the difference calculated in step S2803 (step S2805). In the embodiment, 4 KB, 8 KB, 16 KB, . . . is used as the expansion size. Accordingly, for example, if the difference calculated in step S2803 is 7 KB, the expansion size is updated to 8 KB.

In step S2806, the packet detecting unit 2700 updates the expansion size included in the dirty page information that is stored in the FIFO and includes the GPA page that hits the cache memory 2721 in the same expansion size as that updated in step S2805. Then, the flow goes to step S2811.

Alternatively, if the GPA page obtained in step S2801 miss-hits the cache memory 2721 ("NO" in step S2802), the flow goes to step S2807. In this case, the packet detecting unit 2700 determines whether or not there is an empty entry in the cache memory 2721 (step S2807).

If there is an empty entry in the cache memory 2721 ("YES" in step S2807), the packet detecting unit 2700 stores the GPA page obtained in step S2801 in the empty entry (step S2808). At this time, the packet detecting unit 2700 associates the GPA page obtained in step S2801 with the expansion size set to 4 KB as an initial value, and stores them. Then, the flow goes to step S2810.

Alternatively, if there is no empty entry in the cache memory 2721 ("NO" in step S2807), the flow goes to step S2809. In this case, the packet detecting unit 2700 stores the GPA page obtained in step S2801 in the entry that has not been referenced for the longest duration from among entries included in the cache memory 2721 (step S2809). Also in this case, the packet detecting unit 2700 associates the GPA page obtained in step S2801 with the expansion size set to 4 KB as an initial value, and stores them. Then, the flow goes to step S2810.

In step S2810, the packet detecting unit 2700 registers dirty page information to the FIFO. At this time, the packet detecting unit 2700 sets the expansion size included in the dirty page information to 4 KB as an initial value. Then, the flow goes to step S2811.

Upon termination of the above described process, the packet detecting unit 2700 starts the process at step S1207 illustrated in FIG. 12.

(another example of the packet detecting unit 820)

Figure 29:
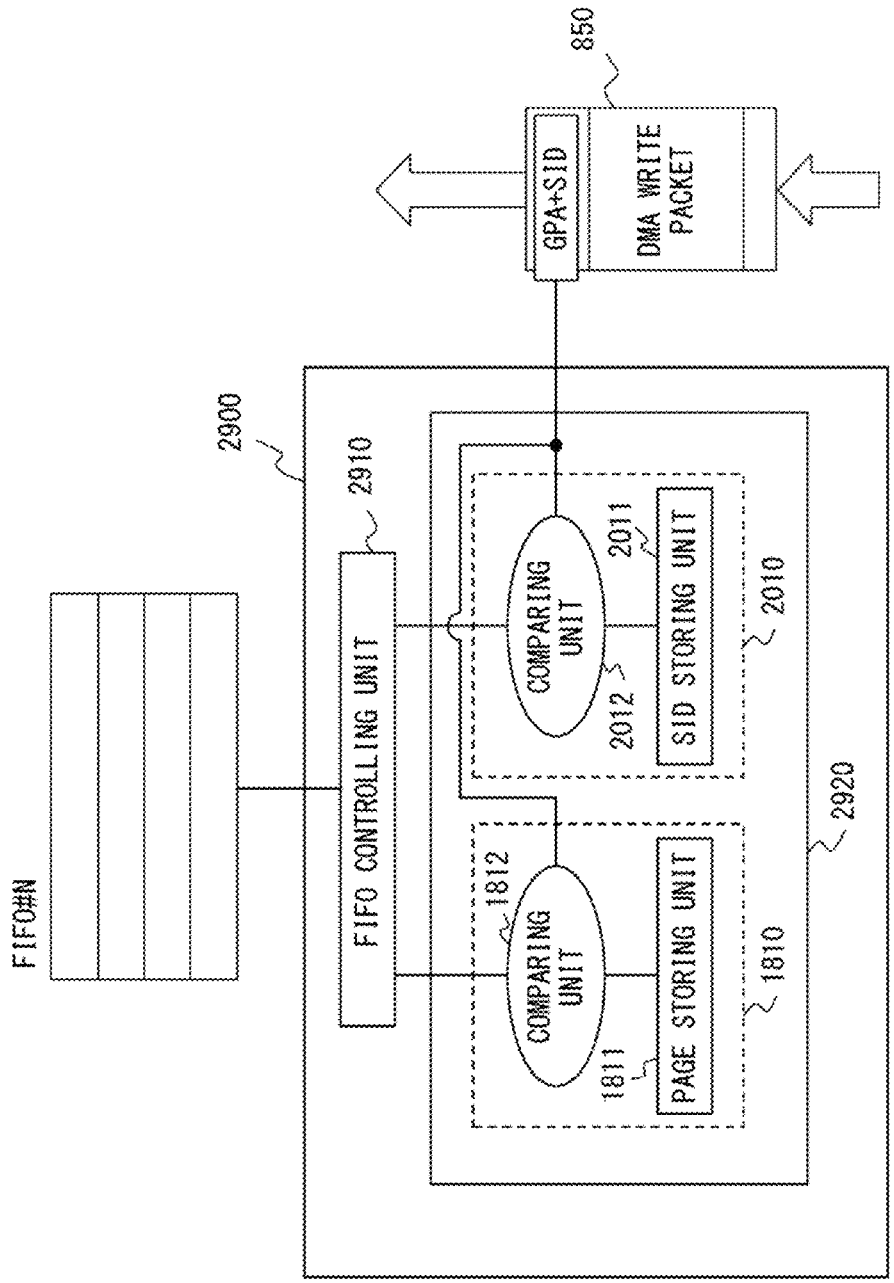
FIG. 29 illustrates an example of the packet detecting unit using the conditions 1 and 2.

FIG. 29 illustrates a example of the packet detecting unit 820 using the conditions 1 and 2. The packet detecting unit 820 using the conditions 1 and 2 is hereinafter referred to as a packet detecting unit 2900.

The packet detecting unit 2900 includes a FIFO controlling unit 2910 and a determining unit 2920. The determining unit 2920 includes the determining unit 1810 illustrated in FIG. 18, and the determining unit 2010 illustrated in FIG. 20.

The FIFO controlling unit 2910 receives, from the determining unit 2010, a notification that the SID obtained from the header of the DMA write packet 850 and an SID stored in the SID storing unit 2011 do not match. In this case, the FIFO controlling unit 2910 registers dirty page information to the FIFO according to a determination result of the determining unit 1810 as described earlier with reference to FIG. 18.

FIG. 30 is a flowchart illustrating a process of the packet detecting unit 2900. The process illustrated in FIG. 30 corresponds to steps S1204 to S1206 illustrated in FIG. 12.

When the flow goes to step S1204 illustrated in FIG. 12, the packet detecting unit 2900 starts the following process (step S3000).

In step S3001, the packet detecting unit 2900 obtains an SID and a GPA from the header of the DMA write packet 850. Then, the packet detecting unit 2900 obtains a GPA page from the GPA.

In step S3002, the packet detecting unit 2900 makes a comparison between the SID obtained in step S3001 and an SID stored in the SID storing unit 2011.

If the SID obtained in step S3001 and the SID stored in the SID storing unit 2011 do not match ("NO" in step S3002), the flow goes to step S3006 without registering dirty page information to the FIFO by the packet detecting unit 2900.

Alternatively, if the SID obtained in step S3001 and the SID stored in the SID storing unit 2011 match ("YES" instep S3002), the flow goes to step S3003. Since processes in steps S3003 to S3006 are the same as those of steps S1902 to S1905 illustrated in FIG. 19, their descriptions are omitted.

Upon termination of the above described process, the packet detecting unit 2900 starts the process at step S1207 illustrated in FIG. 12.

(another example of the packet detecting unit 820)

FIG. 31 illustrates a example of the packet detecting unit 820 using the conditions 2 and 3. The packet detecting unit 820 using the conditions 2 and 3 is hereinafter referred to as a packet detecting unit 3100.

The packet detecting unit 3100 includes a FIFO controlling unit 3110 and a determining unit 3120. The determining unit 3120 includes the determining unit 2010 illustrated in FIG. 20, and the determining unit 2320 illustrated in FIG. 23.

The FIFO controlling unit 3110 receives, from the determining unit 2010, a notification that an SID obtained from the header of the DMA write packet 850 and an SID stored in the SID storing unit 2011 do not match. In this case, the FIFO controlling unit 3110 registers dirty page information to the FIFO according to a determination result of the determining unit 2320 as described earlier with reference to FIG. 23.

Figure 32:
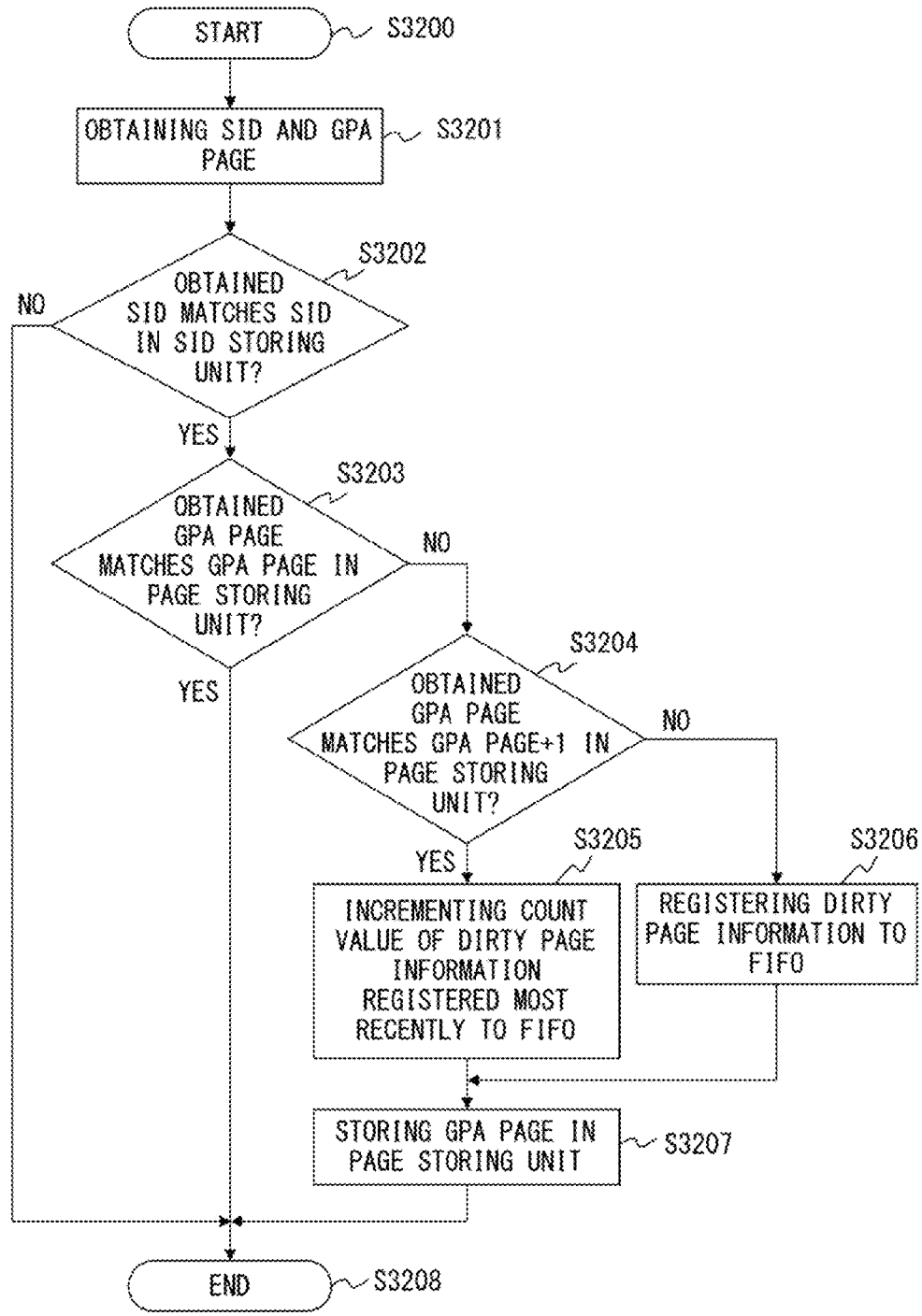
FIG. 32 is a flowchart illustrating a process executed by the packet detecting unit illustrated in FIG. 31.

FIG. 32 is a flowchart illustrating a process of the packet detecting unit 3100. The process illustrated in FIG. 32 corresponds to steps S1204 to S1206 illustrated in FIG. 12.

When the flow goes to step S1204 illustrated in FIG. 12, the packet detecting unit 3100 starts the following process (step S3200).

In step S3201, the packet detecting unit 3100 obtains an SID and a GPA from the header of the DMA write packet 850. Then, the packet detecting unit 3100 obtains a GPA page from the GPA.

In step S3202, the packet detecting unit 3100 makes a comparison between the SID obtained in step S3201 and an SID stored in the SID storing unit 2011.

If the SID obtained in step S3201 and the SID stored in the SID storing unit 2011 do not match ("NO" in step S3202), the flow goes to step S3208 without registering dirty page information to the FIFO by the packet detecting unit 3100.

Alternatively, if the SID obtained in step S3201 and the SID stored in the SID storing unit 2011 match ("YES" instep S3202), the flow goes to step S3203. Processes in steps S3203 to S3208 are the same as those of steps S2402 to S2407 illustrated in FIG. 24. Therefore, their descriptions are omitted.

Upon termination of the above described process, the packet detecting unit 3100 starts the process at step S1207 illustrated in FIG. 12.

(another example of the packet detecting unit 820)

Figure 33:
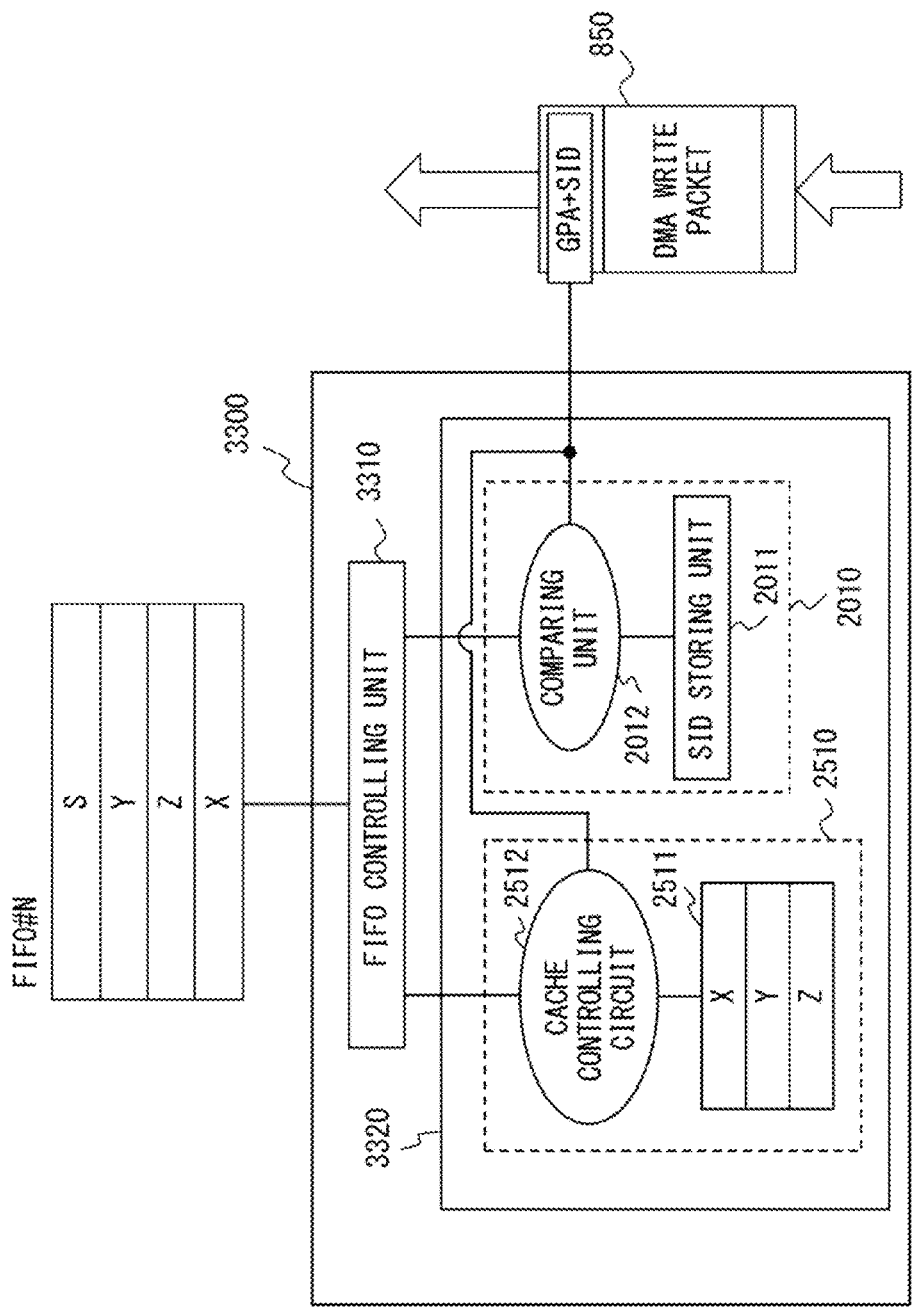
FIG. 33 illustrates an example of the packet detecting unit using the conditions 2 and 4.

FIG. 33 illustrates a example of the packet detecting unit 820 using the conditions 2 and 4. The packet detecting unit 820 using the conditions 2 and 4 is hereinafter referred to as a packet detecting unit 3300.

The packet detecting unit 3300 includes a FIFO controlling unit 3310 and a determining unit 3320. The determining unit 3320 includes the determining unit 2010 illustrated in FIG. 20, and the determining unit 2510 illustrated in FIG. 25.

The FIFO controlling unit 3310 receives, from the determining unit 2010, a notification that an SID obtained from the header of the DMA write packet 850 and an SID stored in the SID storing unit 2011 do not match. In this case, the FIFO controlling unit 3310 registers dirty page information to the FIFO according to a determination result of the determining unit 2510 as described earlier with reference to FIG. 25.

Figure 34:
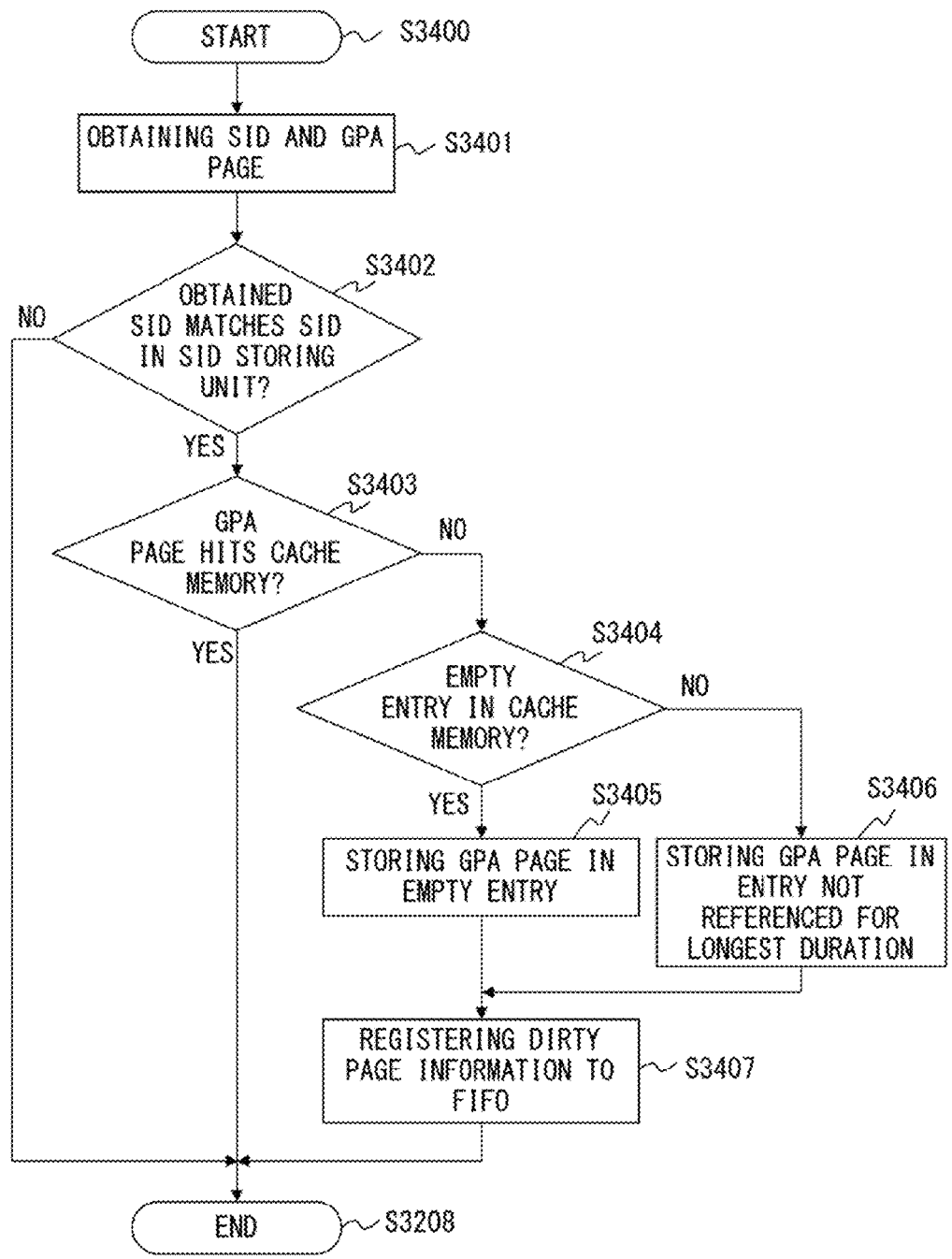
FIG. 34 is a flowchart illustrating a process executed by the packet detecting unit illustrated in FIG. 33.

FIG. 34 is a flowchart illustrating a process of the packet detecting unit 3300. The process illustrated in FIG. 34 corresponds to steps S1204 to S1206 illustrated in FIG. 12.

When the flow goes to step S1204 illustrated in FIG. 12, the packet detecting unit 3300 starts the following process (step S3400).

In step S3401, the packet detecting unit 3300 obtains an SID and a GPA from the header of the DMA write packet 850. Then, the packet detecting unit 3300 obtains a GPA page from the GPA.

In step S3402, the packet detecting unit 3300 makes a comparison between the SID obtained in step S3401 and an SID stored in the SID storing unit 2011.

If the SID obtained in step S3401 and the SID stored in the SID storing unit 2011 do not match ("NO" in step S3402), the flow goes to step S3408 without registering dirty page information to the FIFO by the packet detecting unit 3300.

Alternatively, if the SID obtained in step S3401 and the SID stored in the SID storing unit 2011 match ("YES" instep S3402), the flow goes to step S3403. Processes in steps S3403 to S3408 are the same as those of steps S2602 to S2607 illustrated in FIG. 26. Therefore, their descriptions are omitted.

Upon termination of the above described process, the packet detecting unit 3300 starts the process at step S1207 illustrated in FIG. 12.

(another example of the packet detecting unit 820)

Figure 35:
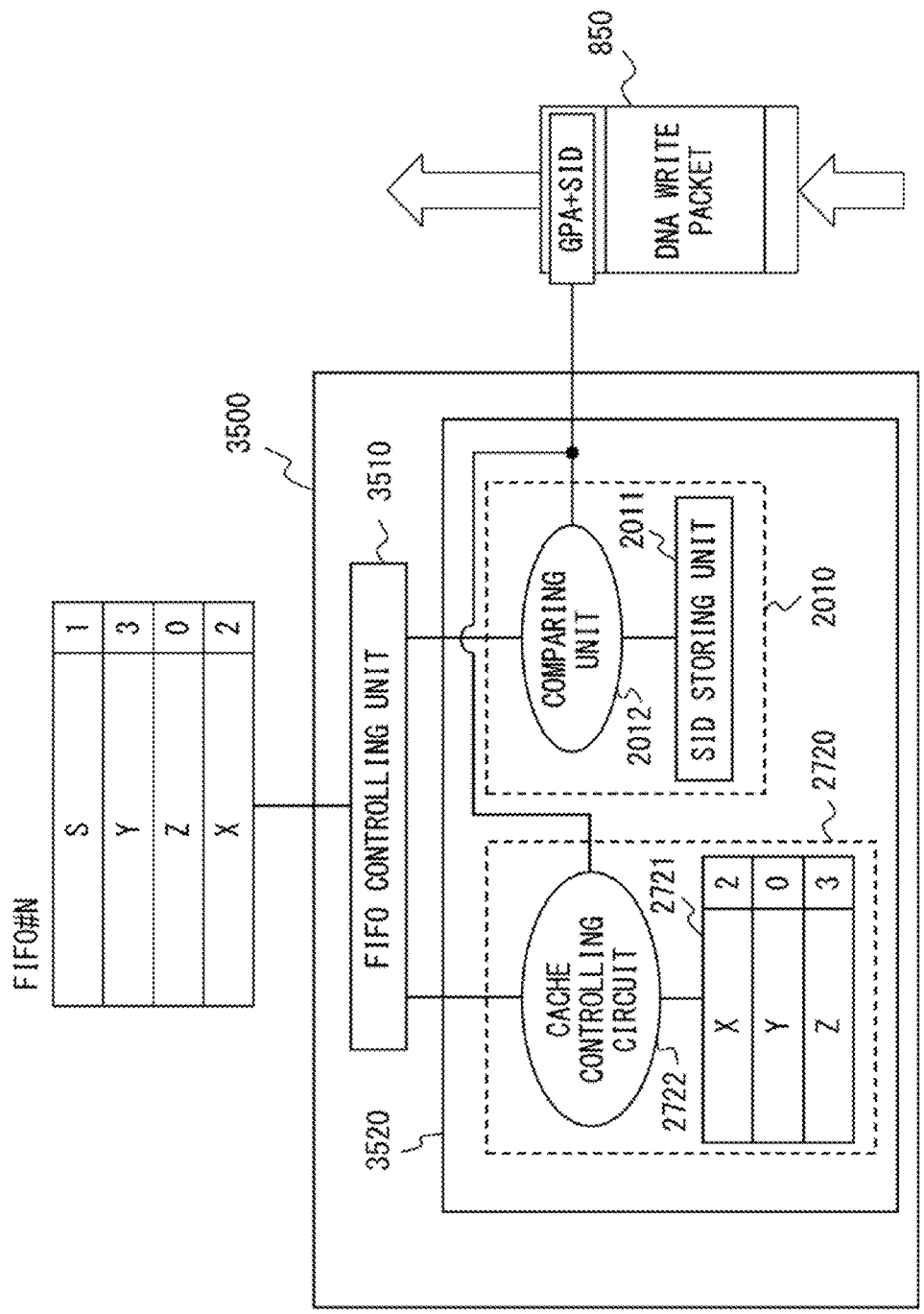
FIG. 35 illustrates an example of the packet detecting unit using the conditions 2 and 5.

FIG. 35 illustrates a example of the packet detecting unit 820 using the conditions 2 and 5. The packet detecting unit 820 using the conditions 2 and 5 is hereinafter referred to as a packet detecting unit 3500. In FIG. 35, an SID is omitted in a FIFO #N for ease of explanation. However, the configuration of the FIFO #N is not limited to that illustrated in FIG. 35.

The packet detecting unit 3500 includes a FIFO controlling unit 3510 and a determining unit 3520. The determining unit 3520 includes the determining unit 2010 illustrated in FIG. 20, and the determining unit 2720 illustrated in FIG. 27.

The FIFO controlling unit 3510 receives, from the determining unit 2010, a notification that an SID obtained from the header of the DMA write packet 850 and an SID stored in the SID storing unit 2011 do not match. In this case, the FIFO controlling unit 3510 registers dirty page information to the FIFO according to a determination result of the determining unit 2720 as described earlier with reference to FIG. 27.

Figure 36:
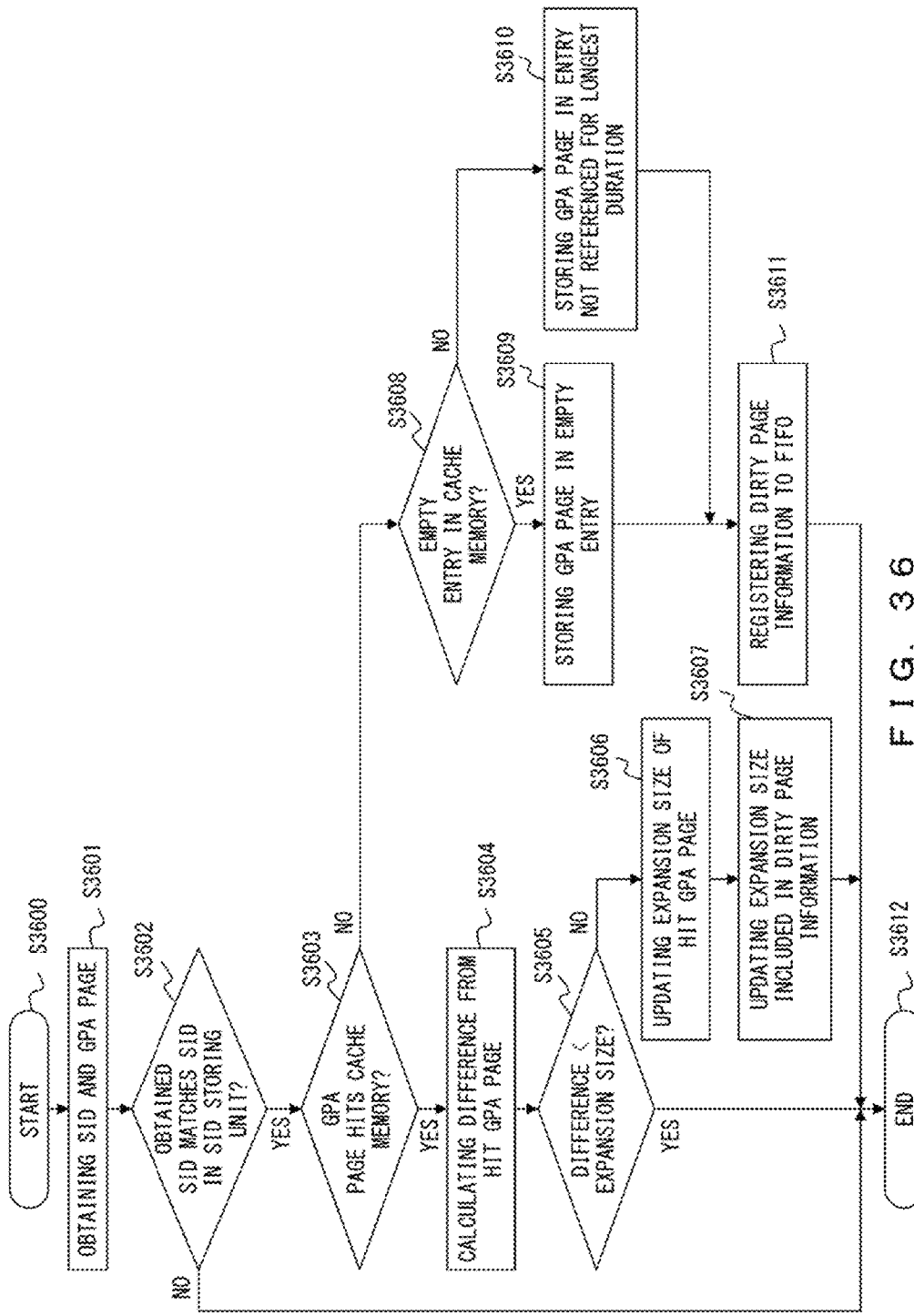
FIG. 36 is a flowchart illustrating a process executed by the packet detecting unit illustrated in FIG. 35.

FIG. 36 is a flowchart illustrating a process of the packet detecting unit 3500. The process illustrated in FIG. 36 corresponds to steps S1204 to S1206 illustrated in FIG. 12.

When the flow goes to step S1204, the packet detecting unit 3500 starts the following process (step S3600).

Instep S3601, the packet detecting unit 3500 obtains an SID and a GPA from the header of the DMA write packet 850. Then, the packet detecting unit 3500 obtains a GPA page from the GPA.

In step S3602, the packet detecting unit 3500 makes a comparison between the SID obtained in step S3601 and an SID stored in the SID storing unit 2011.

If the SID obtained in step S3601 and the SID stored in the SID storing unit 2011 do not match ("NO" in sep S3602), the flow goes to step S3612 without registering dirty page information to the FIFO by the packet detecting unit 3500.

Alternatively, if the SID obtained in step S3601 and the SID stored in the SID storing unit 2011 match ("YES" in step S3602), the flow goes to step S3603. Since processes in steps S3603 to S3612 are the same as those of steps S2802 to S2811 illustrated in FIG. 28, their descriptions are omitted.

Upon termination of the above described process, the packet detecting unit 3500 starts the process at step S1207 illustrated in FIG. 12.

Figure 37:
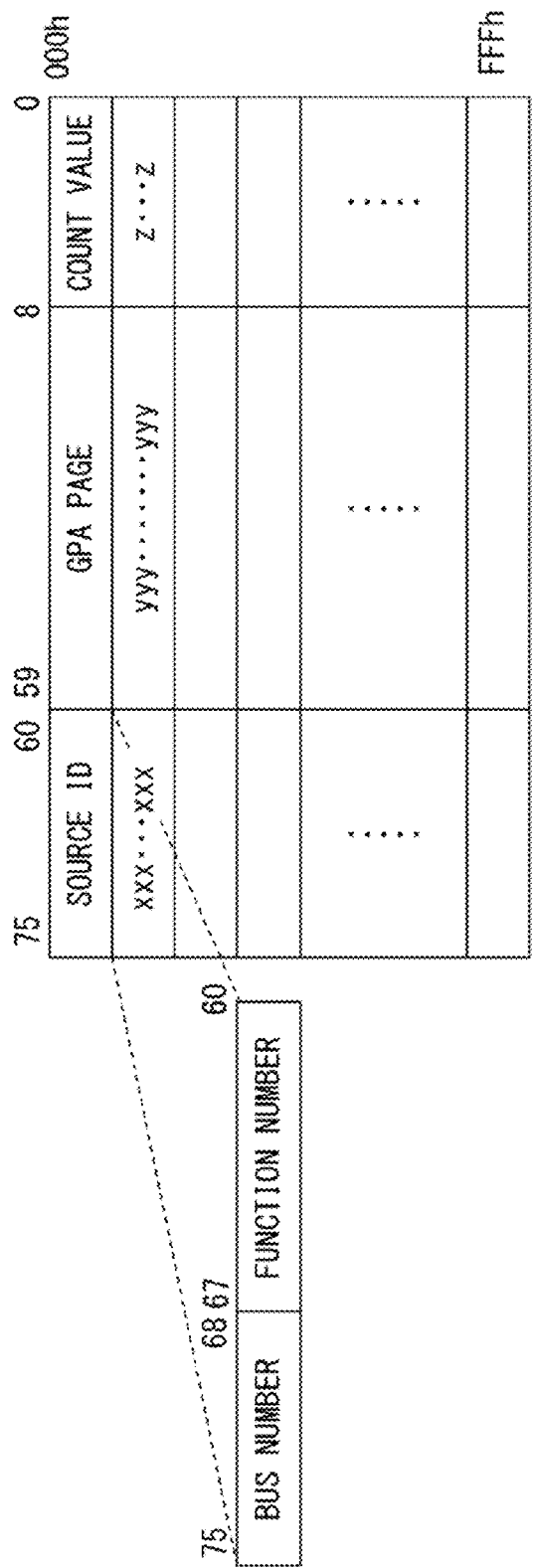
FIG. 37 illustrates a configuration example of a FIFO used when the packet detecting unit using the condition 3 is implemented.

To implement the packet detecting unit 820, such as the packet detecting unit 2300 or the packet detecting unit 3100, using the condition 3, a FIFO having a configuration illustrated in FIG. 37 may be used as the FIFO. The FIFO illustrated in FIG. 37 is implemented by adding an 8-bit area for storing a count value to each entry included in the FIFO illustrated in FIG. 10. However, the configuration of the FIFO illustrated in FIG. 37 is merely one example. The configuration of the FIFO is not limited to that illustrated in FIG. 37.

Additionally, to implement the packet detecting unit 820, such as the packet detecting unit 2700 or the packet detecting unit 3500, using the condition 5, a FIFO having a configuration illustrated in FIG. 38 may be used as the FIFO. The FIFO illustrated in FIG. 38 is implemented by adding a 4-bit area for storing an expansion size to each entry included in the FIFO illustrated in FIG. 10. However, the configuration of the FIFO illustrated in FIG. 38 is merely one example. The configuration of the FIFO is not limited to that illustrated in FIG. 38.

As described above, the dirty page managing unit 651 detects a DMA packet with the packet detecting unit 820 when the DMA packet transferred from the IO adapter 640, 641 or 642 to the memory 620 passes through the PCIe-switch 650.

If the detected DMA packet is a DMA write packet, the dirty page managing unit 651 obtains a guest physical address and an SID from the header of the DMA packet, and registers the obtained information to the FIFO #0 or #1 as dirty page information.

Additionally, the dirty page managing unit 651 includes the control I/F unit 810 with the CPU 610 or 611, namely, a VMM implemented by the CPU 610 or 611, and outputs dirty page information registered to the FIFO #0 or #1 according to a request from the VMM.

As a result, the VMM operating in the information processing device 600 may obtain, from the dirty page information, data in the memory 620, which is added, changed, updated or the like with a DMA write using the IOMMU 631.

Furthermore, data in the memory 620, which is added, changed, updated or the like with the DMA write, may be obtained, whereby the pre-copying and the stop-and-copy, which are illustrated in FIGS. 15 to 17, may be performed. Consequently, even if an IOMMU is used, the live migration may be performed.

Still further, the information processing device 600 includes two FIFOs such as the FIFOs #0 and #1 as the dirty page storing unit 652. By using one of the FIFOs as a FIFO to be read if the other is used as a FIFO to be written, a conflict between a read process and a write process from/to one FIFO may be avoided. As a result, the process for registering dirty page information to the FIFO, and the process for reading dirty page information from the FIFO, may be efficiently executed.

Still further, the packet detecting unit 1800 holds, in the page storing unit 1811, a GPA page that is included in the dirty page information and is stored most recently in the FIFO. Then, the packet detecting unit 1800 stores dirty page information in the FIFO only if a GPA page that does not match the GPA page stored in the page storing unit 1811 is obtained from the DMA write packet 850.

As a result, the packet detecting unit 1800 may reduce the consumption of FIFOs while DMA writes are sequentially made to the same page.

For example, with a large-capacity data transfer, a plurality of DMA accesses are made to successive addresses. In this case, since the range of the DMA accesses is normally smaller than a page size, the DMA accesses to the same page sequentially occur. Even in such a case, the packet detecting unit 1800 may reduce the consumption of FIFOs.

Additionally, the packet detecting unit 2000 holds an SID of a unit to be live-migrated in the SID storing unit 2011. Then, the packet detecting unit 2000 stores dirty page information in a FIFO only if a DMA packet where an SID that matches the SID stored in the SID storing unit 2011 is set is detected.

In this way, the packet detecting unit 2000 may extract only a DMA access from the unit to be live-migrated even when DMA accesses are simultaneously made from a plurality of units. As a result, the packet detecting unit 2000 may store only dirty page information about a DMA access made from the unit to be live-migrated in a FIFO. In this case, the packet detecting unit 2000 does not consume the FIFOs if a DMA access from a unit other than the unit to be live-migrated is made.

Furthermore, the packet detecting unit 2300 stores dirty page information including an SID, a GPA page, and a count value that indicates the number of GPA pages to which DMA accesses are sequentially made starting at the GPA page.

Then, the packet detecting unit 2300 detects a DMA access made to a page next to the page obtained by adding the count value to the GPA page included in the dirty page information stored most recently in the FIFO. In this case, the packet detecting unit 2300 increments the count value included in the dirty page information without storing new dirty page information in the FIFO.

As a result, the packet detecting unit 2300 may reduce the consumption of FIFOs even if DMA write accesses are sequentially made over a plurality of page boundaries.

For example, a DMA space in a memory, which is allocated to an I/O adapter, is normally allocated to a plurality of successive pages. Even if sequential accesses are made over a plurality of page boundaries in such a DMA space, the packet detecting unit 2300 may reduce the consumption of FIFOs.

Furthermore, the packet detecting unit 2500 holds GPA pages respectively included in a plurality of pieces of dirty page information stored in a FIFO. Then, the packet detecting unit 2500 stores the dirty page information in the FIFO only if a GPA page that matches none of the GPA pages stored in the cache memory 2511 is obtained from the DMA write packet 850.

As a result, the packet detecting unit 2500 may reduce the consumption of FIFOs for each of a plurality of DMA accesses while DMA writes are sequentially made to the same page even if the plurality of DMA accesses are made via a plurality of I/O adapters.

A DMA access has locality. Particularly, with a memory transfer using a processor such as a GPGPU (General Purpose computing on Graphics Processing Unit) or the like, the locality becomes noticeable depending on the nature of a program in many cases. Even when a plurality of units such as a GPGPU and the like make DMA accesses via I/O adapters connected to the respective units, the packet detecting unit 2500 may reduce the consumption of FIFOs for each of the DMA accesses while DMA writes are sequentially made to the same page.

Additionally, if the GPA page obtained from the DMA write packet 850 is within a predetermined range from a GPA page stored in the cache memory 2721, the packet detecting unit 2700 does not store dirty page information in the FIFO.

However, the packet detecting unit 2700 detects a case where a difference between the GPA page obtained from the DMA write packet 850 and the GPA page stored in the cache memory 2721 is equal to or larger than the expansion size of the GPA page stored in the cache memory 2721. In this case, the packet detecting unit 2700 updates the expansion size of the GPA page stored in the cache memory 2721 to a size that include the GPA page obtained from the DMA write packet 850. The packet detecting unit 2700 reflects this update of the expansion size also on dirty page information stored in the FIFO.

As described above, the packet detecting unit 2700 does not store dirty page information in the FIFO if a GPA page obtained from the DMA write packet 850 is within a predetermined range from a GPA page included in the dirty page information stored in the FIFO. In consequence, the packet detecting unit 2700 may reduce the consumption of FIFOs when a DMA write is made in a predetermined range including the GPA page included in the dirty page information stored in the FIFO.

Additionally, the expansion size is updated according to a difference between the GPA page obtained from the DMA write packet 850 and a GPA page stored in the cache memory 2721. As a result, the consumption of FIFOs may be reduced even if DMA accesses by a GPGPU or the like are made in an irregular access pattern.

Furthermore, the packet detecting unit 2900 stores only dirty page information about a DMA access made from a unit to be live-migrated as information to be stored in a FIFO. Then, the packet detecting unit 2900 stores the dirty page information in the FIFO only if a GPA page that does not match a GPA page stored in the page storing unit 1811 is obtained from the DMA write packet 850.

As a result, when a DMA write from a unit other than the unit to be live-migrated is made, the packet detecting unit 2900 may reduce the consumption of FIFOs. Moreover, the packet detecting unit 2900 may reduce the consumption of FIFOs while DMA writes from the unit to be live-migrated are not sequentially made to the same page.

Still further, the packet detecting unit 3100 stores only dirty page information about a DMA access made from the unit to be live-migrated as information to be stored in the FIFO. However, the packet detecting unit 3100 detects a DMA access made to a page next to the page obtained by adding the count value to the GPA page included in the dirty page information stored most recently in the FIFO. At this time, the packet detecting unit 3100 increments the count value included in the dirty page information without storing new dirty page information in the FIFO.

As a result, when a DMA write from a unit other than the unit to be live-migrated is made, the packet detecting unit 3100 may reduce the consumption of FIFOs. Moreover, when DMA write accesses are sequentially made from the unit to be live-migrated over a plurality of page boundaries, the packet detecting unit 3100 may reduce the consumption of FIFOs.

Still further, the packet detecting unit 3300 stores only dirty page information about a DMA access made from a unit to be live-migrated as information to be stored in the FIFO. Then, the packet detecting unit 3300 stores the dirty page information in the FIFO only if a GPA page that matches none of GPA pages stored in the cache memory 2511 is obtained from the DMA write packet 850.

As a result, when a DMA write from a unit other than the unit to be live-migrated is made, the packet detecting unit 3300 may reduce the consumption of FIFOs. Moreover, even when a plurality of DMA accesses are made from a plurality of units to be live-migrated, the packet detecting unit 3300 may reduce the consumption of FIFOs for each of the DMA accesses while DMA writes are sequentially made to the same page.

Additionally, the packet detecting unit 3500 stores only dirty page information about a DMA access made from a unit to be live-migrated as information to be stored in the FIFO. However, if a GPA page obtained from the DMA write packet 850 is within a predetermined range from a GPA page stored in the cache memory 2721, the packet detecting unit 3500 does not store the dirty page information in the FIFO.

As a result, when a DMA write from a unit other than the unit to be live-migrated is made, the packet detecting unit 3500 may reduce the consumption of FIFOs. Moreover, when a DMA write from the unit to be live-migrated is made within a predetermined range including the GPA page included in the dirty page information stored in the FIFO, the packet detecting unit 3500 may reduce the consumption of FIFOs.

As described above, with the packet detecting unit 820 according to the embodiment, the information processing device 600 may perform the live migration with a small amount of hardware resources even if an IOMMU is used.

As described above, with the disclosed information processing device, the live migration may be performed with a small amount of hardware resources.

The process procedures represented with the flowcharts illustrated in FIGS. 12 to 13, 15 to 17, 19, 21 to 22, 24, 26, 28, 30, 32, 34 and 36 are not intended to limit the order of processes. Accordingly, the order of the processes may be naturally changed if possible.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device, comprising:
 a virtual machine implementing unit configured to implement a virtual machine by using hardware resources;
 a memory configured to include a first memory area allocated to the virtual machine;
 a data transferring unit configured to directly transfer data to the first memory area from an input/output device for controlling a data input/output to/from an external device by mutually translating between a guest physical address of the first memory area and a host physical address of the first memory area;
 a detecting unit configured to detect the data directly transferred from the input/output device to the first memory area allocated to the virtual machine;
 a registering unit configured to generate update information about the first memory area changed using the detected data when the detected data satisfies a predetermined condition, and to store the update information in a first storing unit; and
 an outputting unit configured to output the update information stored in the first storing unit, wherein
 only when the first memory area changed using the detected data and the first memory area stored in a second storing unit for storing the first memory area changed most recently are different, the update information is generated and stored in the first storing unit, and the changed first memory area is stored in the second storing unit.

2. The information processing device according to claim 1, wherein when a page including the first memory area changed using the data detected by the detecting unit and a page next to the page including the first memory area stored in the second storing unit are different, the registering unit generates the update information, stores the update information in the first storing unit, and stores the changed first memory area in the second storing unit.

3. The information processing device according to claim 1, wherein:
 the update information includes count information obtained by counting the number of pages of the first memory area changed using the data detected by the detecting unit; and
 when a page including the first memory area changed using the data detected by the detecting unit and a page next to the page including the first memory area stored in the second storing unit are the same, the registering unit increments a count value indicated by the count information included in the update information by 1, and stores the changed first memory area in the second storing unit.

4. The information processing device according to claim 1, wherein the registering unit stores a plurality of first memory areas changed in the past in the second storing unit, generates the update information, stores the update information in the first storing unit, and stores the changed first memory area in the second storing unit when the first memory area changed using the data detected by the detecting unit is different from all the plurality of first memory areas stored in the second storing unit.

5. The information processing device according to claim 4, wherein when a memory area within a predetermined range from the first memory area changed using the detected data is not included in the second storing unit, the update information is generated and stored in the first storing unit, and the changed first memory area is stored in the second storing unit.

6. The information processing device according to claim 4, wherein:
the update information includes expansion information about an expansion of a size of a page including the changed first memory area; and
when a memory area within a predetermined range from the first memory area changed using the detected data is included in the second storing unit, expansion information of the update information about the first memory area included in the second storing unit is updated to a size of the page including the first memory area changed using the data detected by the detecting unit.

7. The information processing device according to claim 1, wherein the data detected by the detecting unit is directly transferred from the input/output device to the first memory area allocated to the virtual machine according to an instruction from the virtual machine, and written to the first memory area.

8. The information processing device according to claim 1, wherein the update information is information including identification information for identifying the input/output device that transfers the data, and an address of the first memory area, which is a transfer destination of the data.

9. The information processing device according to claim 1, wherein the first storing unit comprises a first storing means and a second storing means, which store or read update information mutually independently.

10. A virtualization method for use in an information processing device comprising a memory including a first memory area allocated to a virtual machine, the virtualization method comprising:
implementing the virtual machine by managing hardware resources;
directly transferring data to the first memory area from an input/output device for controlling a data input/output to/from an external device by mutually translating between a guest physical address of the first memory area and a host physical address of the first memory area;
detecting the data directly transferred from the input/output device to the first memory area that are allocated to the virtual machine;
generating update information about the first memory area changed using the detected data and of storing the update information in a first storing unit when the detected data satisfies a predetermined condition; and
outputting the update information stored in the first storing unit, wherein
only when the first memory area changed using the detected data and the first memory area stored in a second storing unit for storing the first memory area changed most recently are different, the update information is generated and stored in the first storing unit, and the changed first memory area is stored in the second storing unit.

11. An information processing device comprising:
a virtual machine implementing unit configured to implement a virtual machine by using hardware resources;
a memory configured to include a first memory area allocated to the virtual machine;
a data transferring unit configured to directly transfer data to the first memory area from an input/output device for controlling a data input/output to/from an external device by mutually translating between a guest physical address of the first memory area and a host physical address of the first memory area;
a memory area transferring unit configured to obtain data stored in the first memory area allocated to the virtual machine to be migrated, and to transfer the data to a migration destination;
a detecting unit configured to detect the data directly transferred from the input/output device to the first memory area allocated to the virtual machine;
a registering unit configured to generate update information about the first memory area changed using the detected data and to store the update information in a first storing unit when the detected data satisfies a predetermined condition;
an update information obtaining unit configured to obtain the update information from the first storing unit; and
an update data transferring unit configured to transfer, to the migration destination, the update data changed using the data detected by the detecting unit in the first memory area allocated to the virtual machine to be migrated using the update information obtained by the update information obtaining unit, wherein
only when the first memory area changed using the detected data and the first memory area stored in a second storing unit for storing the first memory area changed most recently are different, the update information is generated and stored in the first storing unit, and the changed first memory area is stored in the second storing unit.

12. The information processing device according to claim 11, wherein the update data transferring unit comprises
a first update data transferring unit configured to transfer the update data to the migration destination until the number of pieces of update information stored in the first storing unit becomes equal to or smaller than a predetermined value, and
a second update data transferring unit configured to transfer the update data to the migration destination after suspending an operation of the virtual machine to be migrated.

13. A migration method for migrating a virtual machine implemented by a first information processing device comprising a memory including a first memory area allocated to the virtual machine to a second information processing device communicatively coupled to the first information processing device, the migration method comprising:
implementing one or more virtual machine by using hardware resources;
directly transferring data to the first memory area from an input/output device for controlling a data input/output to/from an external device by mutually translating between a guest physical address of the first memory area and an host physical address of the first memory area;

obtaining data stored in the first memory area allocated to the virtual machine to be migrated, and of transferring the obtained data to the second information processing device;

detecting the data directly transferred from the input/output device to the first memory area allocated to the virtual machine;

generating update information about the first memory area changed using the detected data and of storing the update information in a first storing unit when the detected data satisfies a predetermined condition;

obtaining the update information from the first storing unit; and transferring, to the second information processing device, update data changed using the detected data in the first memory area allocated to the virtual machine to be migrated using the update information, wherein only when the first memory area changed using the detected data and the first memory area stored in a second storing unit for storing the first memory area changed most recently are different, the update information is generated and stored in the first storing unit, and the changed first memory area is stored in the second storing unit.

14. A non-transitory storage medium storing a program used to direct an arithmetic device to perform a process for migrating a virtual machine implemented by a first information processing device including a memory including a first memory area allocated to the virtual machine and an arithmetic device to a second information processing device communicatively coupled to the first information processing device, the process comprising:

implementing one or more virtual machines by using hardware resources;

directly transferring data to the first memory area from an input/output device for controlling a data input/output to/from an external device by mutually translating between a guest physical address of the first memory area and a host physical address of the first memory area;

obtaining data stored in the first memory area allocated to the virtual machine to be migrated, and of transferring the obtained data to the first information processing device;

detecting the data directly transferred from the input/output device to the first memory area allocated to the virtual machine;

generating update information about the first memory area changed using the detected data and of storing the update information in a first storing unit when the detected data satisfies a predetermined condition;

obtaining the update information from the first storing unit; and transferring, to the first information processing device, the update data changed using the data detected by the transfer data detecting process in the first memory area allocated to the virtual machine to be migrated using the update information obtained by the update information obtaining process, wherein only when the first memory area changed using the detected data and the first memory area stored in a second storing unit for storing the first memory area changed most recently are different, the update information is generated and stored in the first storing unit, and the changed first memory area is stored in the second storing unit.

* * * * *